(12) United States Patent
Komaba et al.

(10) Patent No.: US 10,044,040 B2
(45) Date of Patent: Aug. 7, 2018

(54) BINDER FOR LITHIUM CELL, COMPOSITION FOR PRODUCING ELECTRODE, AND ELECTRODE

(71) Applicants: WAKO PURE CHEMICAL INDUSTRIES, LTD., Osaka-shi, Osaka (JP); Tokyo University of Science Foundation, Tokyo (JP)

(72) Inventors: Shinichi Komaba, Tokyo (JP); Naoaki Yabuuchi, Tokyo (JP); Zhen-Ji Han, Tokyo (JP); Takeo Sasaki, Tokyo (JP); Shota Hashimoto, Tokyo (JP); Kuniaki Okamoto, Kawagoe (JP); Tsuneaki Maesawa, Kawagoe (JP)

(73) Assignees: TOKYO UNIVERSITY OF SCIENCE FOUNDATION, Tokyo (JP); WAKO PURE CHEMICAL INDUSTRIES, LTD., Osaka-shi (JP)

( * ) Notice: Subject to any disclaimer, the term of this patent is extended or adjusted under 35 U.S.C. 154(b) by 346 days.

(21) Appl. No.: 14/438,481

(22) PCT Filed: Oct. 25, 2013

(86) PCT No.: PCT/JP2013/078996
§ 371 (c)(1),
(2) Date: Apr. 24, 2015

(87) PCT Pub. No.: WO2014/065407
PCT Pub. Date: May 1, 2014

(65) Prior Publication Data
US 2015/0287993 A1    Oct. 8, 2015

(30) Foreign Application Priority Data

Oct. 26, 2012 (JP) .................................. 2012-237026
Mar. 28, 2013 (JP) .................................. 2013-069859

(51) Int. Cl.
*C08F 122/00* (2006.01)
*C08G 18/00* (2006.01)
(Continued)

(52) U.S. Cl.
CPC ........... *H01M 4/622* (2013.01); *C08F 122/02* (2013.01); *C08G 18/025* (2013.01); *C08G 59/40* (2013.01);
(Continued)

(58) Field of Classification Search
CPC ...... H01M 4/622; H01M 4/134; H01M 4/386; H01M 4/625; H01M 10/0525;
(Continued)

(56) References Cited

U.S. PATENT DOCUMENTS 6,194,512 B1 * 2/2001 Chen .................... C03C 25/285
523/139
2003/0149227 A1 * 8/2003 Okazaki .................. C08F 20/28
528/310

(Continued)

FOREIGN PATENT DOCUMENTS

JP    9-289022 A    11/1997
JP    2000-294247 A    10/2000
(Continued)

OTHER PUBLICATIONS

International Search Report dated Jan. 28, 2014, issued in corresponding application No. PCT/JP2013/078996.
(Continued)

*Primary Examiner* — Harold Y Pyon
*Assistant Examiner* — Danny N Kang
(74) *Attorney, Agent, or Firm* — Westerman, Hattori, Daniels & Adrian, LLP

(57) ABSTRACT

It is an object of the present invention to provide an electrode capable of maintaining superior capacity retention (Continued)

without destruction of an electrode structure, even in the case of using an active material including silicon.

The present invention relates to "a binder for a lithium cell, the binder comprising polyacrylic acid cross-liked by a cross-linking agent selected from the compounds described in the general formulae [1] to [13] and the polymer described in the general formula [14] (provided that the one which includes a functional group-containing vinylidene fluoride-based polymer is excluded)"; a "composition for producing an electrode of a lithium cell, the composition comprising 1) an active material containing silicon, 2) a conductive assistant and 3) a cross-linked-type polyacrylic acid (provided that the one containing a functional group-containing vinylidene fluoride-based polymer is excluded)"; and an "electrode for a lithium cell, the electrode comprising 1) an active material containing silicon, 2) a conductive assistant, 3) a cross-linked-type polyacrylic acid, and 4) a current collector (provided that the one containing a functional group-containing vinylidene fluoride-based polymer is excluded)".

22 Claims, 13 Drawing Sheets

(51) Int. Cl.
| | |
|---|---|
| *H01M 4/62* | (2006.01) |
| *C08G 59/40* | (2006.01) |
| *C08L 63/00* | (2006.01) |
| *H01M 4/134* | (2010.01) |
| *H01M 4/38* | (2006.01) |
| *C08G 18/02* | (2006.01) |
| *C08F 122/02* | (2006.01) |
| *H01M 10/0525* | (2010.01) |
| *C08L 33/02* | (2006.01) |
| *C08L 79/00* | (2006.01) |
| *H01M 10/052* | (2010.01) |
| *C08K 5/00* | (2006.01) |
| *H01M 4/02* | (2006.01) |

(52) U.S. Cl.
CPC .............. *C08L 63/00* (2013.01); *H01M 4/134* (2013.01); *H01M 4/386* (2013.01); *H01M 4/625* (2013.01); *H01M 10/0525* (2013.01); *C08K 5/0025* (2013.01); *C08L 33/02* (2013.01); *C08L 79/00* (2013.01); *H01M 10/052* (2013.01); *H01M 2004/027* (2013.01); *H01M 2220/20* (2013.01)

(58) Field of Classification Search
CPC .. H01M 10/052; C08F 122/02; C08G 18/025; C08G 59/40; C08L 63/00; C08L 33/02; C08L 79/00; C08K 5/0025
USPC ........................................................ 252/500
See application file for complete search history.

(56) References Cited

U.S. PATENT DOCUMENTS

| | | | |
|---|---|---|---|
| 2007/0092796 A1* | 4/2007 | Matsuda | ................ H01M 4/38 429/217 |
| 2012/0070737 A1* | 3/2012 | Son | .......................... C08F 8/14 429/217 |
| 2014/0234246 A1 | 8/2014 | Coan | |
| 2014/0322321 A1 | 10/2014 | Herry et al. | |
| 2015/0132550 A1 | 5/2015 | Kohno et al. | |
| 2016/0369210 A1 | 12/2016 | Fuchs et al. | |

FOREIGN PATENT DOCUMENTS

| | | |
|---|---|---|
| JP | 2006-339093 A | 12/2006 |
| JP | 2009-80971 A | 4/2009 |
| JP | 2009-140918 A | 6/2009 |
| JP | 4851092 B2 | 1/2012 |
| JP | 2012-64574 A | 3/2012 |
| JP | 2014-530827 A | 11/2014 |
| JP | 2015-500264 A | 1/2015 |
| JP | 2016-530351 A | 9/2016 |
| WO | 2011/122261 A1 | 10/2011 |
| WO | 2012-161096 A1 | 11/2012 |

OTHER PUBLICATIONS

Notification of Reason for Refusal dated Jun. 13, 2017, issued in counterpart Japanese application No. 2014-543363 with machine translation. (9 pages).

* cited by examiner

Figs. 8(a), (b) and (c)

Fig.9 (a), (b) and (c)

BINDER FOR LITHIUM CELL, COMPOSITION FOR PRODUCING ELECTRODE, AND ELECTRODE

TECHNICAL FIELD

The present invention relates to a binder, a composition for producing an electrode and an electrode to be used in a lithium cell which uses the one containing silicon as an active material.

BACKGROUND ART

A lithium ion cell, as a secondary cell, has been utilized as a power source of various portable devices such as a mobile phone, however, in recent years, research and development of large size batteries assuming automotive applications and the like has become active. Therefore, it has become indispensable to further increase energy density of an existing lithium ion cell. Accordingly, use of a high capacity silicon material has attracted the attention, as an active material, instead of a carbon-based material. High capacity of silicon is considered to be due to providing higher electric capacity, as compared with the case of using carbon, because silicon can cause an alloying reaction with lithium electrochemically at room temperature.

However, silicon has been known to cause large volume change (enlarge to 3 times or more) on charge-discharge, when used as an active material. And, this volume change generates destruction of an electrode structure in charge-discharge, and leads to destruction of an electrode. As a result, it had a problem of shortening of cycle characteristics (lifetime) or the like. In addition, it had also a problem of larger self-discharge or the like, as compared with a graphite electrode.

On the other hand, various attempts of using a binder have been made, aiming at increasing capacity or enhancing stability performance of a cell (PATENT LITERATURE 1 and 2). However, these targeted active materials were mainly carbon materials, and does not aim at resolving the above-described problems in the case of using silicon.

CITATION LIST

Patent Literature

PATENT LITERATURE 1: JP-A-2009-80971
PATENT LITERATURE 2: JP No. 4851092

SUMMARY OF INVENTION

Technical Problem

It is an object of the present invention to provide a binder superior in solving such a problem as described above, and an electrode using the same.

Solution to Problem

The present inventors have variously studied a method for using a polymeric binder, as a solution of the above-described problems, in the case where silicon was used as an active material. As a result, it has been discovered that, by using, as a binder, a cross-linked polymer, among them, a polymer cross-linked the polyacrylic acid by a specific cross-linking agent, superior capacity retention rate can be obtained, without destruction of an electrode structure, even in the case of using an active material containing silicon, and have thus completed the present invention.

That is, the present invention relates to (1)" the binder for a lithium cell comprising polyacrylic acid cross-liked by a cross-linking agent selected from the compounds described in the following general formulae [1] to [13] and the polymer described in the general formula [14] (provided that the one which includes a functional group-containing vinylidene fluoride-based polymer is excluded);

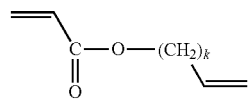

[1]

(wherein k represents an integer of 1 to 6.),

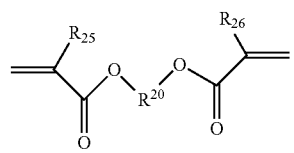

[2]

[wherein $R^{25}$ and $R^{26}$ each independently represent a hydrogen atom or a methyl group, $R^{20}$ represents an alkylene group having 1 to 20 carbon atoms, and a group represented by the following general formula [2-1],

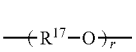

[2-1]

(wherein $R^{17}$ represents an alkylene group having 1 to 6 carbon atoms, r represents an integer of 1 to 6.), or the group represented by the following general formula [2-2]

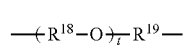

[2-2]

(wherein $R^{18}$ and $R^{19}$ each independently represent an alkylene group having 1 to 6 carbon atoms, t represents an integer of 1 to 12.)],

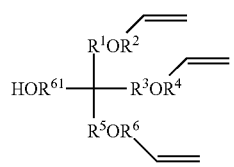

[3]

(wherein $R^1$ to $R^6$ and $R^{61}$ each independently represent an alkylene group having 1 to 3 carbon atoms.),

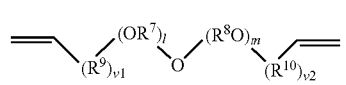

[4]

(wherein $R^7$ to $R^{10}$ each independently represent an alkylene group having 1 to 6 carbon atoms, l represents an integer of 1 to 6, m represents an integer of 0 to 6, v1 and v2 each independently represent an integer of 0 or 1.),

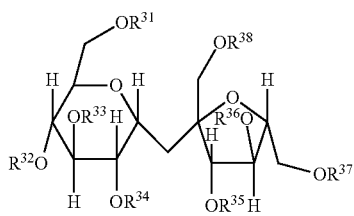
[5]

(wherein $R^{31}$ to $R^{38}$ each independently represent a hydrogen atom, a vinyl group or a vinylketone group, and at least two or more groups thereof are a vinyl group or a vinylketone group.),

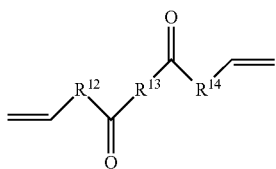
[6]

(wherein $R^{12}$ to $R^{14}$ each independently represent an alkylene group having 1 to 6 carbon atoms.),

[7]

(wherein $Ar^1$ represents an aryl group having 6 to 10 carbon atoms, $R^{15}$ represents an alkylene group having 1 to 6 carbon atoms, q represents an integer of 2 to 4.),

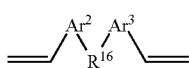
[8]

(wherein $Ar^2$ and $Ar^3$ each independently represent an arylene group having 6 to 10 carbon atoms, $R^{16}$ represents an alkylene group having 1 to 6 carbon atoms.),

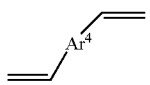
[9]

(wherein $Ar^4$ represent an arylene group having 6 to 10 carbon atoms.),

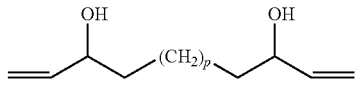
[10]

(wherein p represents an integer of 0 to 6.),

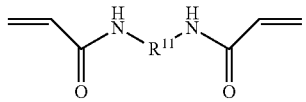
[11]

(wherein, $R^{11}$ represents an alkylene group having 1 to 6 carbon atoms.),

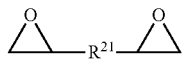
[12]

[wherein $R^{21}$ represents an alkylene group having 1 to 6 carbon atoms which has or does not have a substituent, an arylene group having 6 to 10 carbon atoms which has or does not have a substituent, or a group represented by the following general formula [12-A]

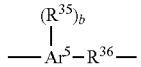
[12-A]

(wherein $R^{35}$ represents an alkyl group having 1 to 6 carbon atoms, $R^{36}$ represents an alkyl group having 1 to 6 carbon atoms, $Ar^5$ represents an arylene group having 6 to 10 carbon atoms which may have b pieces of $R^{35}$ as substituents, b represents an integer of 0 to 4.), or the group represented by the following general formula [12-B]

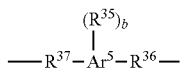
[12-B]

(wherein $R^{37}$ represents an alkylene group having 1 to 6 carbon atoms, $R^{35}$, $R^{36}$, $Ar^5$ and b are the same as described above.)],

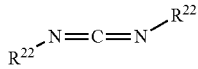
[13]

[wherein $R^{22}$ each independently represent an alkyl group having 1 to 6 carbon atoms which has or does not have a substituent, an aryl group having 6 to 10 carbon atoms which has or does not have a substituent, or the group represented by the following general formula [13-A]

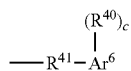

[13-A]

(wherein $R^{40}$ represents an alkyl group having 1 to 6 carbon atoms, $R^{41}$ represents an alkylene group having 1 to 6 carbon atoms, $Ar^6$ represents an arylene group having 6 to 10 carbon atoms which have c pieces of $R^{40}$ as substituents, and c represents an integer of 0 to 5.)],

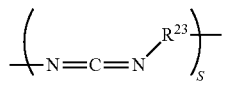

[14]

[wherein $R^{23}$ represents an alkylene group having or not having a substituent a substituent, and 1 to 6 carbon atoms, an arylene group having or not having a substituent a substituent, and carbon atoms of 6 to 10, or a group represented by the following general formula [14-A] or [14-B]

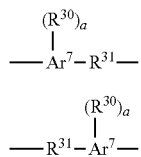

[14-A]

[14-B]

(wherein $R^{30}$ represents an alkyl group having 1 to 6 carbon atoms, $R^{31}$ represents an alkylene group having 1 to 6 carbon atoms, $Ar^7$ represents an arylene group having 6 to 10 carbon atoms which may have a piece of $R^{30}$ as substituents, a represents an integer of 0 to 4.), or the group following general formula [14-C]

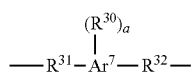

[14-C]

(wherein $R^{32}$ represents an alkylene group having 1 to 6 carbon atoms, $R^{30}$, $R^{31}$, $Ar^7$, and a are the same as described above.), s represents an integer of 10 to 10000.]", (2) "the composition for producing an electrode of a lithium cell comprising 1) an active material containing silicon, 2) a conductive assistant and 3) a cross-linked-type polyacrylic acid (provided that the one containing a functional group-containing vinylidene fluoride-based polymer is excluded)" and (3) "the electrode for a lithium cell comprising 1) an active material containing silicon, 2) a conductive assistant, 3) a cross-linked-type polyacrylic acid, and 4) a current collector (provided that the one containing a functional group-containing vinylidene fluoride-based polymer is excluded)".

Advantageous Effects of Invention

By producing a lithium electrode using the binder of the present invention, such an electrode that an electrode structure is not destroyed can be provided, even in the case of using an active material including silicon. In addition, said electrode makes possible to provide a cell which is capable of maintaining high capacity over a long period of time, because of exhibiting high capacity retention rate, even in the case of repeated charge-discharge. Further, said electrode exhibits high coulombic efficiency in the initial cycle, as well as exerts effect of early stabilization of coulombic efficiency in the $2^{nd}$ and the subsequent cycles.

DESCRIPTION OF EMBODIMENTS

Figure 1:
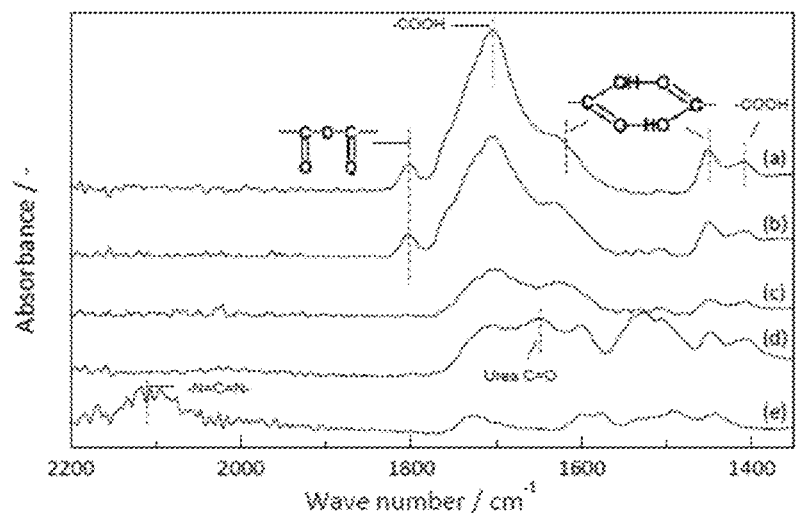
FIG. 1 represents an Attenuated Total Reflection Fourier Transform Infrared Spectroscopy (ATR-FTIR) spectrum as for various binders in Experiment Example 1.

Compounds Described in the General Formulae [1] to [13], and a Polymer Described in the General Formulae [14]

"k" in the general formula [1] pertaining to the present invention is usually 1 to 6, preferably 1 to 3, and more preferably 1.

Preferable specific examples of the group shown by the general formula [1] pertaining to the present invention include, for example, the groups shown by the following formulae [1-1] to [1-6],

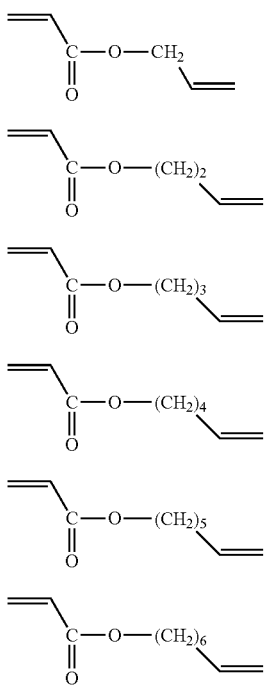

and the like, and the one represented by the formula [1-1] is particularly preferable.

The alkylene group having 1 to 20 carbon atoms in $R^{20}$ of the general formula [2] pertaining to the present invention may be a straight chain, a branched, or a cyclic group, and the straight chain group is preferable, the one having 1 to 12 carbon atoms is preferable. Specifically, they include, for example, a methylene group, an ethylene group, a n-propylene group, an isopropylene group, a n-butylene group, an isobutylene group, a sec-butylene group, a tert-butylene group, a n-pentylene group, an isopentylene group, a sec-pentylene group, a tert-pentylene group, a neopentylene group, a n-hexylene group, an isohexylene group, a sec-hexylene group, a tert-hexylene group, a n-heptylene group, an isoheptylene group, a sec-heptylene group, a tert-heptylene group, a n-octylene group, a sec-octylene group, a tert-octylene group, a nonylene group, a decylene group, an undecylene group, a dodecylene group, a tridecylene group, a tetradecylene group, a pentadecylene group, a hexadecylene group, a heptadecylene group, an octadecylene group, a nonadecylene group, an icosylene group, a cyclopropylene group, a cyclopentylene group, a cyclohexylene group a cycloheptylene group, a cyclooctylene group, a cyclononylene group, a cyclodecylene group, a cycloundecylene group, a cyclododecylene group, cyclotridecylene group, a cyclohexadecylene group, a cyclooctadecylene group, a cycloicosylene group, or the like, among them, a methylene group, an ethylene group, a n-propylene group, a n-butylene group, a n-pentylene group, a n-hexylene group, n-heptylene group, a n-octylene group, a nonylene group, a decylene group, an undecylene group, a dodecylene group, or the like are preferable.

The alkylene group having 1 to 6 carbon atoms in $R^{17}$, $R^{18}$ and $R^{19}$ of the general formula [2-1] or [2-2] pertaining to the present invention may be a straight chain, a branched, or a cyclic group, and the straight chain group is preferable. In addition, 1 to 3 carbon atoms are preferable, 2 to 3 carbon atoms are more preferable, and 2 carbon atoms are particularly preferable. Specifically, they include for example, a methylene group, an ethylene group, a trimethylene group, a propylene group, a methylmethylene group, a methylethylene, group, an ethylmethylene group, a tetramethylene group, a pentamethylene group, a hexamethylene group, a cyclopropylene group, a cyclopentylene group, a cyclohexylene group, or the like, and a methylene group, an ethylene group or a propylene group are preferable, and an ethylene group and a propylene group are more preferable.

"r" in the general formula [2-1] pertaining to the present invention is preferably an integer of 2 to 6, and more preferably an integer of 4 to 6.

"t" in the general formula [2-2] pertaining to the present invention is preferably an integer of 1 to 7, more preferably an integer of 1 to 5, and still more preferably 1 to 3.

Preferable specific examples of the group shown by the general formula [2-1] pertaining to the present invention include, for example, the groups represented by the following formulae [2-1-1] to [2-1-3],

 [2-1-1]

 [2-1-2]

 [2-1-3]

(wherein, r is the same as described above.) and the like, among them, the group shown by [2-1-2] is particularly preferable.

Preferable specific examples of the group shown by the general formula [2-2] pertaining to the present invention include, for example, the groups shown by the following formulae [2-2-1] to [2-2-3]

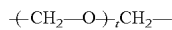  [2-2-1]

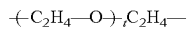  [2-2-2]

  [2-2-3]

(wherein t is the same as described above.) and the like.

Preferable specific examples of the group represented by the general formula [2] pertaining to the present invention include, for example, the groups represented by the following formulae [2-01] to [2-14], and among them, the general formulae [2-05] to [2-07] and [2-12] to [2-14] are preferable, the general formulae [2-06] and [2-13] are more preferable, and [2-06] is particularly preferable.

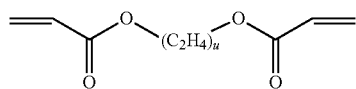  [2-01]

(wherein u represents an integer of 1 to 6, and 4 to 6 is preferable, and 6 are more preferable.)

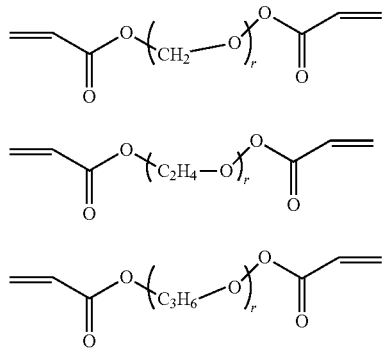

[2-02]

[2-03]

[2-04]

(wherein r is the same as described above.)

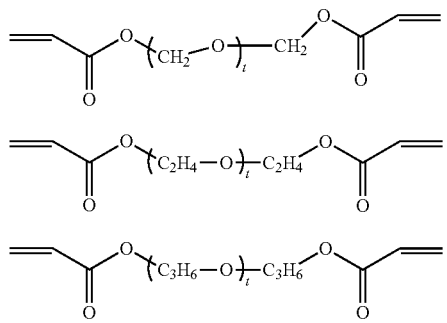

[2-05]

[2-06]

[2-07]

(wherein t is the same as described above.)

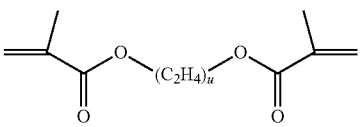  [2-08]

(wherein u represents an integer of 1 to 6, and 4 to 6 is preferable, and 6 are more preferable.)

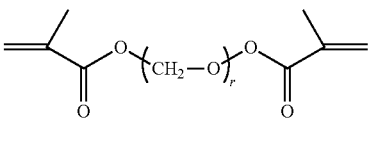

[2-09]

[2-10]

[2-11]

(wherein r is the same as described above.)

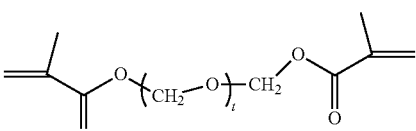

[2-12]

[2-13]

[2-14]

(wherein t is the same as described above.)

The alkylene group having 1 to 3 carbon atoms in $R^1$ to $R^6$, and $R^{61}$ of the general formula [3] pertaining to the present invention may be a straight chain or a branched group, and the straight chain group is preferable, the one having 1 to 2 carbon atoms is preferable, and 1 carbon number is more preferable. Specifically, there are included, for example, a methylene group, an ethylene group, a trimethylene group, or the like, a methylene group, and an ethylene group are preferable, and a methylene group is more preferable.

Preferable specific examples of the group represented by the general formula [3] pertaining to the present invention include, for example, the groups represented by the following formulae [3-1] to [3-3],

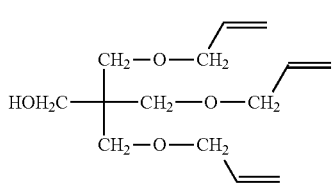
[3-1]

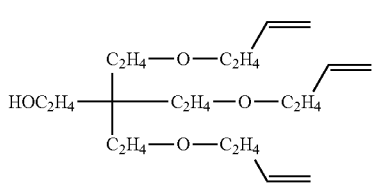
[3-2]

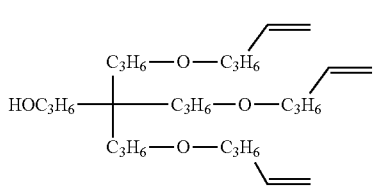
[3-3]

and the like, and the formula [3-1] is particularly preferable. The alkylene group having 1 to 6 carbon atoms in $R^7$ to $R^{10}$ of the general formula a [4] pertaining to the present invention includes the same one as the alkylene group having 1 to 6 carbon atoms in $R^{17}$ of the above-described general formula [2-1].

"l" represents an integer of 1 to 6, and integer of 1 to 4 is preferable. In the case where "l" is 2 or more, plural $R^7$ may be the same or different.

"m" represents an integer of 0 to 6, and integer of 1 to 3 is preferable, and 1 is more preferable. In the case where "l" is 2 or more, plural $R^7$ may be the same one or the different one. In the case where "m" is 2 or more, plural $R^8$ may be the same one or the different one. It should be noted that in the case where "m" is 0, —$R^8$O— represents a bond. That is, it represents direct binding of adjacent —O— and —(R10)$_{v2}$-. Hereafter, the "bond" represents similar meaning.

"v1" and "v2" each independently represents an integer of 0 or 1. It should be noted that in the case where "v1" is 0, —$R^9$— represents a bond, and in the case where "v2" is 0, —$R^{10}$— represents a bond.

Specific examples of the compound shown by the general formula [4] pertaining to the present invention include, for example, the following general formula [4'] or the general formula [4"], and particularly the general formula [4'] is preferable.

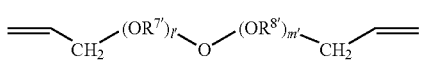
[4']

[wherein $R^{7'}$ and $R^{8'}$ represent a methylene group, an ethylene group, an n-propylene group (preferably, an ethylene group), l' represents an integer of 1 to 2, m' represents an integer of 0 to 2.]

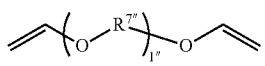
[4"]

(wherein $R^{7''}$ represents a methylene group, an ethylene group, an n-propylene group, an n-butylene group, an n-pentylene group, and an n-hexylene group, and l" represents an integer of 1 to 4.)

Preferable specific examples of the general formula [4] include, for example, the compounds shown by the following general formulae [4-1] to [4-10],

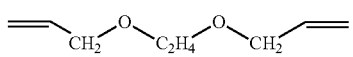
[4-1]

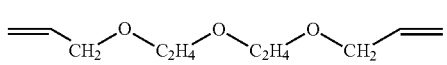
[4-2]

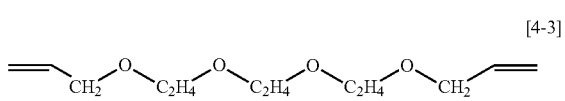
[4-3]

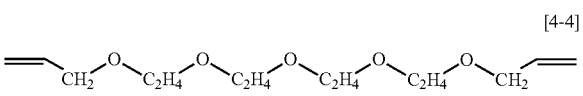
[4-4]

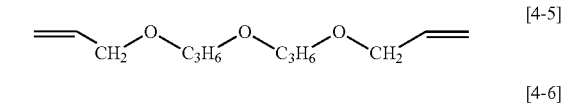
[4-5]

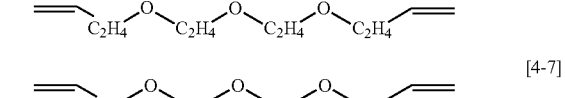
[4-6]

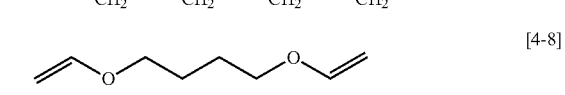
[4-7]

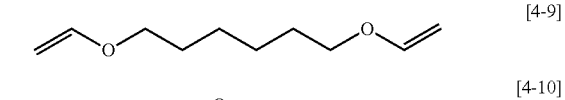
[4-8]

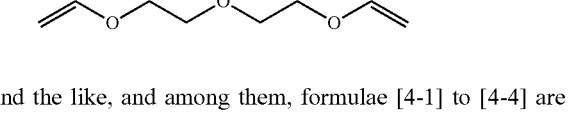
[4-9]

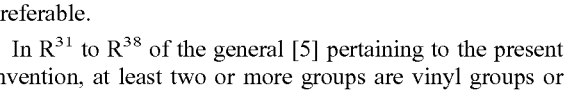
[4-10]

and the like, and among them, formulae [4-1] to [4-4] are preferable.

In $R^{31}$ to $R^{38}$ of the general [5] pertaining to the present invention, at least two or more groups are vinyl groups or vinylketone groups, 5 to 8 groups are preferably vinyl groups or vinylketone groups, and 5 to 7 groups are more preferably vinyl groups or vinylketone groups.

Preferable specific examples of the compound shown by the general formula [5] pertaining to the present invention include, for example, the compounds shown by the following general formulae [5-1] to [5-6]

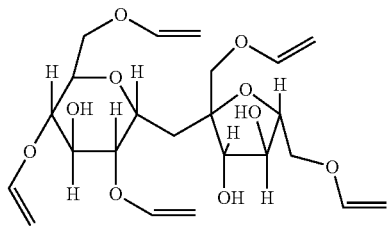
[5-1]

-continued

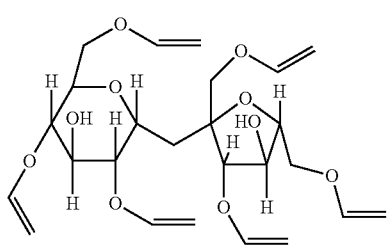
[5-2]

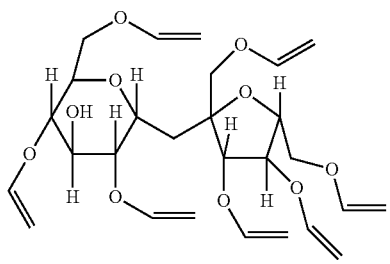
[5-3]

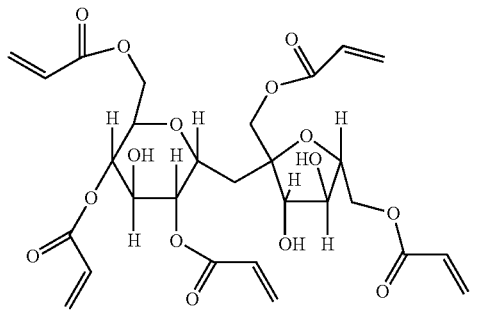
[5-4]

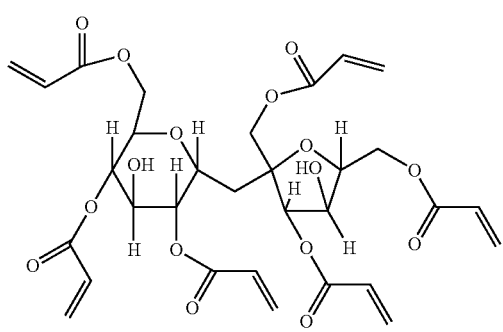
[5-5]

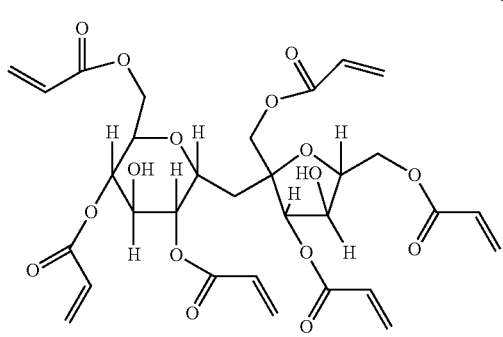
[5-5]

and the like.

The alkylene group having 1 to 6 carbon atoms in $R^{12}$ to $R^{14}$ of the general formula [6] pertaining to the present invention includes the same one as the alkylene group having 1 to 6 carbon atoms in $R^{12}$ of the above-described general formula [2-1]. As a preferable group in $R^{12}$ and $R^{14}$, a methylene group and an ethylene group are preferable, and an ethylene group is more preferable. In $R^{13}$, a cyclopentylene group and a cyclohexylene group are preferable, and a cyclohexylene group is more preferable.

Preferable specific examples of the compound shown by the general formula [6] pertaining to the present invention include, for example, the compounds represented by the following general formulae [6-1] to [6-3],

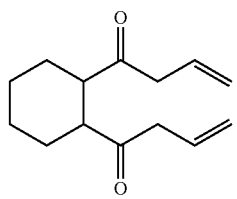
[6-1]

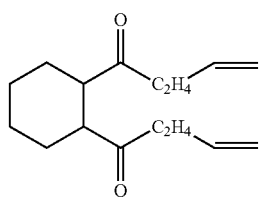
[6-2]

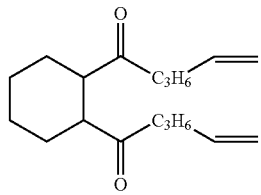
[6-3]

and the like, and among them, the formula [6-1] is preferable.

The alkylene group having 1 to 6 carbon atoms in $R^{15}$ of the general formula [7] pertaining to the present invention includes the same one as the alkylene group having 1 to 6 carbon atoms in $R^{17}$ of the above-described general formula [2-1]. As a preferable group, a methylene group and an ethylene group are preferable, and a methylene group is more preferable.

The aryl group in $Ar^1$ of the general formula [7] pertaining to the present invention includes usually the one having 6 to 10 carbon atoms, and preferably the one having carbon atoms of 6, specifically includes, for example, a phenyl group, a naphthyl group, and the like, and a phenyl group is preferable.

"q" represents an integer of 2 to 4, preferably is an integer of 3 to 4.

Preferable specific examples of the compound represented by the general formula [7] pertaining to the present invention include, for example, and the compounds shown by the following general formulae [7-1] to [7-2]

[7-1]

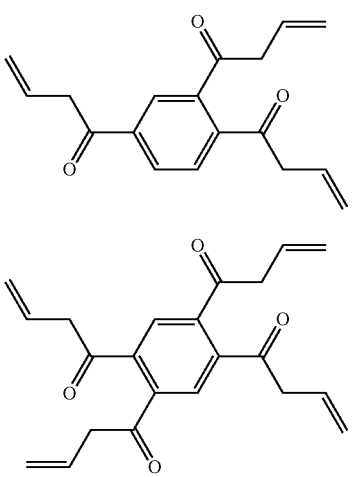

[7-2]

and the like.

The arylene group in Ar² or Ar³ of the general formula [8] pertaining to the present invention includes usually the one having 6 to 10 carbon atoms, preferably the one having 6 carbon atoms, specifically includes, for example, a phenylene group, a naphthylene group, or the like, and a phenylene group is preferable.

The alkylene group having 1 to 6 carbon atoms in $R^{16}$ of the general formula [8] pertaining to the present invention includes the same one as the alkylene group having 1 to 6 carbon atoms in $R^{17}$ of the above-described general formula [2-1]. As the preferable group, a methylene group or an ethylene group is preferable, and an ethylene group is more preferable.

Preferable specific examples of the compound represented by the general formula [8] pertaining to the present invention include, for example, and the compounds shown by the following general formulae [8-1] to [8-2],

[8-1]

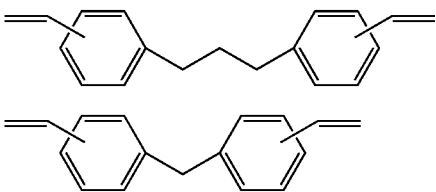

[8-2]

and the like, and the general formula [8-1] is preferable.

The arylene group in $Ar^4$ of the general formula [9] pertaining to the present invention includes the same one as the arylene group in $Ar^2$ or $Ar^3$ of the general formula [8], and the preferable one is also the same.

Preferable specific examples of the compound represented by the general formula [9] pertaining to the present invention include, for example, and the compounds represented by the following general formulae [9-1] to [9-2],

[9-1]

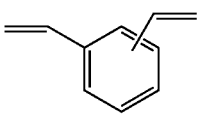

[9-2]

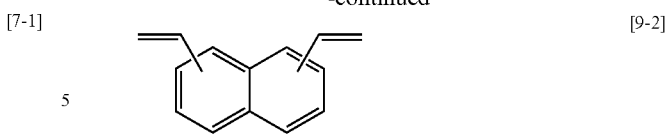

and the like, and the general formula [9-1] is preferable.

"p" in the general formula [10] pertaining to the present invention is preferably 0 to 2, and 0 is particularly preferable.

Preferable specific examples of the compound represented by the general formula [10] pertaining to the present invention include, for example, the compounds shown by the following general formulae [10-1] to [10-4],

[10-1]

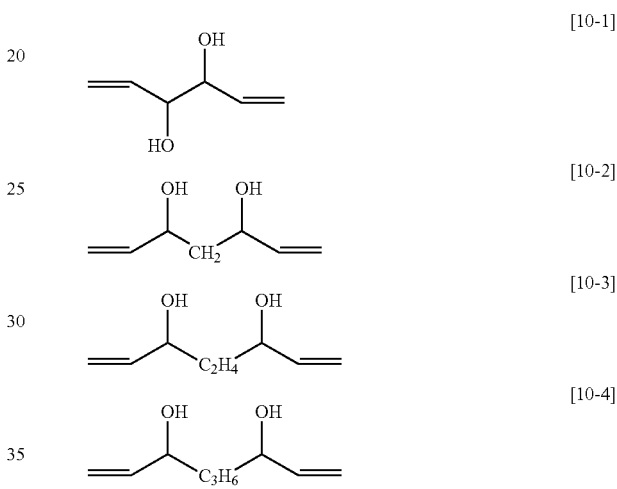

[10-2]

[10-3]

[10-4]

and the like, and the general formula [10-1] is preferable.

The alkylene group having 1 to 6 carbon atoms in $R^{11}$ of the general formula [11] pertaining to the present invention includes the same one as the alkylene group having 1 to 6 carbon atoms in $R^{17}$ of the above-described general formula [2-1]. As the preferable one, a methylene group, an ethylene group, and an n-propylene group are preferable, a methylene group is more preferable.

Preferable specific examples of the compound represented by the general formula [11] pertaining to the present invention include, for example, the compounds represented by the following general formulae [11-1] to [11-3],

[11-1]

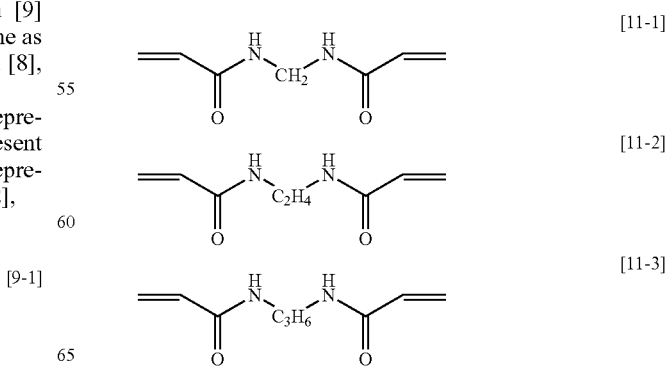

[11-2]

[11-3]

and the like, and the general formula [11-1] is preferable.

The alkylene group having 1 to 6 carbon atoms in $R^{21}$ of the general formula [12] pertaining to the present invention may be any of a straight chain, a branched or a cyclic group, and includes, specifically, for example, a methylene group, an ethylene group, a trimethylene group, a propylene group, a methylmethylene group, a methylethylene group, an ethylmethylene group, a tetramethylene group, a pentamethylene group, a hexamethylene group, a cyclopropylene group, a cyclopentylene group, a cyclohexylene group, or the like.

The arylene group having 6 to 10 carbon atoms in $R^{21}$ of the general formula [12] pertaining to the present invention includes the one having 6 carbon atoms preferably, and specifically includes, for example, a phenylene group, a naphthylene group, or the like, and a phenylene group is preferable.

The alkyl group having 1 to 6 carbon atoms in $R^{35}$ of the general formulae [12-A] and [12-B] pertaining to the present invention may be any of a straight chain, a branched or a cyclic group, and the straight chain group is preferable. Specifically, for example, they include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, or the like.

As the alkylene group having 1 to 6 carbon atoms in $R^{36}$ of the general formulae [12-A] and [12-B] pertaining to the present invention, it includes the same alkylene group having 1 to 6 carbon atoms in the above-described $R^{21}$.

As the arylene group having 6 to 10 carbon atoms in $Ar^5$ of the general formulae [12-A] and [12-B] pertaining to the present invention, it includes the same arylene group having 6 to 10 carbon atoms in the above-described $R^{21}$.

"b" in the general formulae [12-A] and [12-B] pertaining to the present invention represents an integer of 0 or 1. In the case where b is 0, it means that the arylene group of $Ar^5$ does not have a substituent.

As the alkylene group having 1 to 6 carbon atoms in $R^{37}$ of the general formula [12-B] pertaining to the present invention, it includes the same alkylene group having 1 to 6 carbon atoms in the above-described $R^{21}$.

Preferable specific examples of the general formula [12] include the following general formulae [12-1] to [12-4]

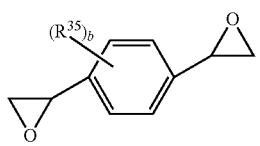

[12-1]

(wherein $R^{35}$ and b are the same as described above.)

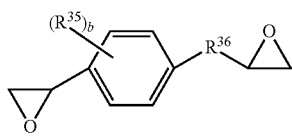

[12-2]

(wherein $R^{35}$, $R^{36}$ and b are the same as described above.)

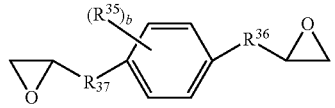

[12-3]

(wherein $R^{35}$, $R^{36}$, $R^{37}$ and b are the same as described above.)

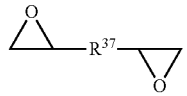

[12-4]

(wherein $R^{37}$ is the same as described above.) and the like.

As the alkyl group having 1 to 6 carbon atoms in $R^{22}$ of the general formula [13] pertaining to the present invention, it includes the same alkyl group having 1 to 6 carbon atoms in the above-described $R^{35}$ of the general formula [12-A] pertaining to the above-described present invention.

As the aryl group having 6 to 10 carbon atoms in $R^{22}$ of the general formula [13] pertaining to the present invention, it includes the same aryl group having 6 to 10 carbon atoms in the $Ar^1$ of the general formula [7] pertaining to the above-described present invention, and also the substituent includes the same one.

As the alkyl group having 1 to 6 carbon atoms in $R^{40}$ of the general formula [13-A] pertaining to the present invention, it includes the same alkyl group having 1 to 6 carbon atoms in the $R^{35}$ of the general formula [12-A].

As the alkylene group having 1 to 6 carbon atoms in $R^{41}$ of the general formula [13-A] pertaining to the present invention, it includes the same alkylene group having 1 to 6 carbon atoms in the above-described $R^{21}$.

As the aryl group having 6 to 10 carbon atoms in $Ar^6$ of the general formula [13-A] pertaining to the present invention, it includes the same aryl group having 6 to 10 carbon atoms in the above-described $R^{22}$.

"c" in the general formula [13-A] pertaining to the present invention represents an integer of 0 to 5, and preferably 0 to 2. In the case where c is 0, it means that the aryl group of $Ar^6$ does not have a substituent.

Preferable specific examples of the general formula [13] include, for example, the compounds represented by the following general formulae [13-1], [13-2] and the like.

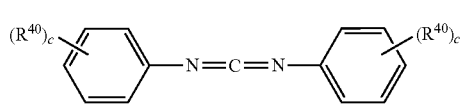

[13-1]

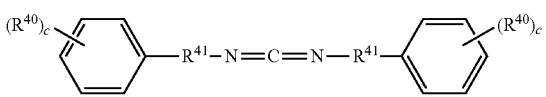

[13-2]

(wherein $R^{40}$ represents the alkyl group having 1 to 6 carbon atoms, and c represents an integer of 0 to 4.), among them, the general formula [13-1] is preferable. Among the general formula [13-1], $R^{40}$ is preferably a methyl group, an ethyl group, an n-propyl group, an isopropyl group, or the like, and an isopropyl group is more preferable. Among the general formula [13-1], the one in which c is an integer of 1 to 3 is preferable, and 2 is more preferable.

The alkylene group having 1 to 6 carbon atoms in $R^{23}$ of the general formula [14] pertaining to the present invention includes the same alkylene group having 1 to 6 carbon atoms in $R^{21}$ of the general formula [12] pertaining to the above-described present invention, and also the substituent includes the same one.

The arylene group having 6 to 10 carbon atoms in $R^{23}$ of the general formula [14] pertaining to the present invention includes the same arylene group having 6 to 10 carbon atoms in $R^{21}$ of the general formula [12] pertaining to the above-described present invention, and also the substituent includes the same one.

The alkyl group having 1 to 6 carbon atoms in $R^{30}$ of the general formulae [14-A] to [14-C] pertaining to the present invention includes the same alkyl group having 1 to 6 carbon atoms in $R^{35}$ of the general formula [12-A].

The alkylene group having 1 to 6 carbon atoms in $R^{31}$ of the general formulae [14-A] to [14-C] pertaining to the present invention includes the same alkylene group having 1 to 6 carbon atoms in the above-described $R^{21}$.

The arylene group having 6 to 10 carbon atoms in $Ar^7$ of the general formulae [14-A] to [14-C] pertaining to the present invention includes the same arylene group having 6 to 10 carbon atoms in the above-described $R^{21}$.

"a" in the general formulae [14-A] to [14-C] pertaining to the present invention represents an integer of 0 or 1. In the case where a is 0, it means that the aryl group of $Ar^7$ does not have a substituent.

The alkylene group having 1 to 6 carbon atoms in $R^{32}$ of the general formula [14-C] pertaining to the present invention includes the same alkylene group having 1 to 6 carbon atoms in the above-described $R^{21}$.

$R^{23}$ of the general formula [14] pertaining to the present invention is preferably the alkylene group having a substituent and carbon atoms of 1 to 6, the alkylene group having no substituent and carbon atoms of 1 to 6, the arylene group having a substituent and carbon atoms of 6 to 10, or the arylene group having no substituent and carbon atoms of 6 to 10, and in particular, the arylene group having a substituent and carbon atoms of 6 to 10 is more preferable, and the arylene group having an alkyl group as a substituent and carbon atoms of 6 to 10 is particularly preferable.

"s" in the general formula [14] pertaining to the present invention is usually 10 to 10000, preferably 10 to 1000, and more preferably 10 to 100.

Preferable specific examples of the general formula [14] include, for example, and the following general formulae [14-1] to [14-5]

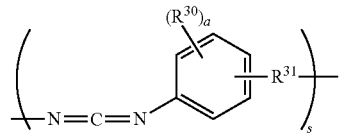

[14-1]

(wherein $R^{30}$ represents the alkyl group having 1 to 6 carbon atoms, and a represents an integer of 0 to 4, and s is the same as described above.)

[14-2]

(wherein $R^{31}$ represents the alkylene group having 1 to 6 carbon atoms. $R^{30}$, a and s are the same as described above.)

[14-3]

(wherein $R^{30}$, $R^{31}$, a and s are the same as described above.)

[14-4]

(wherein $R^{30}$, $R^{31}$, a and s are the same as described above. However, two $R^{31}$ are each independent and may be different groups.)

$+N=C=N-R^{33}+_s$ [14-5]

(wherein $R^{33}$ represents the alkylene group having 1 to 6 carbon atoms, and s is the same as described above), among them, the general formula [14-1] is preferable, and more specifically, include, the following general formulae [14-1-1] to [14-1-3]

[14-1-1]

[14-1-2]

[14-1-3]

(wherein s is the same as described above) and the like, and the general formula [14-1-1] is preferable.

As the cross-linking agent pertaining to the present invention, among compounds described in the general formulae [1] to [13] and the polymer described in the general formula [14], compounds described in the general formula [2], the general formula [3], the general formula [4], the general formula [9], the general formula [10] and the general formula [11], as well as the polymer described in the general formula [14] are preferable, compounds described in the general formula [2], the general formula [3], the general formula [4] and the general formula [10] are more preferable, and among them, the compound described in the general formula [4] is preferable.

[Binder for Lithium Cell]

The binder for a lithium cell of the present invention is the one composed of polyacrylic acid (hereafter it may be abbreviated as the cross-linked-type polyacrylic acid pertaining to the present invention) cross-linked by a cross-linking agent selected from compounds described in the above-described general formulae [1] to [13] and the polymer described in the general formula [14]. It should be noted that the binder for a lithium cell of the present invention includes also the one composed of polyacrylic acid which is not cross-linked in storage, and is cross-linked in usage by a cross-linking agent selected from the compound described in the above-described general formula [12] and the general formula [13] and the polymer described in the general formula [14].

Cross-linked-type polyacrylic acid pertaining to the present invention may be neutralized. In other words, a part or all of the carboxyl groups in the cross-linked-type polyacrylic acid may be a salt. As the neutralized cross-linked-type polyacrylate, the one neutralized with an alkaline metal such as sodium hydroxide, lithium hydroxide, potassium hydroxide is preferable, and the one neutralized with sodium hydroxide is more preferable. Specifically, cross-linked-type poly(sodium acrylate), cross-linked-type poly(lithium acrylate), cross-linked-type poly(potassium acrylate) or the like is preferable, and among them, cross-linked-type poly(sodium acrylate) is more preferable. Use of such a neutralized cross-linked-type polyacrylic acid makes possible to further enhance electric characteristics of an electrode. Degree of neutralization in this case is usually 60 to 100%, preferably 70 to 100%, and more preferably 70 to 90%. In addition, the cross-linked-type polyacrylate is obtained by neutralizing the polyacrylic acid which is subjected to polymerization reaction and cross-linking reaction, or the polyacrylic acid which is subjected to a cross-linking reaction. Alternatively, it is also obtained, after neutralization of straight chain (not cross-linked) acrylic acid, by subjecting it to a polymerization reaction and a cross-linking reaction, or after neutralization of straight chain (not cross-linked) acrylic acid, by subjecting it to a cross-linking reaction. Among them, it is preferable to neutralize polyacrylic acid which is subjected to a polymerization reaction and a cross-linking reaction or polyacrylic acid which is subjected to a cross-linking reaction. It should be noted that the cross-linked-type polyacrylate may be prepared in accordance with a neutralization method known per se.

As for viscosity of the cross-linked-type polyacrylic acid pertaining to the present invention, the lower limit thereof is usually 30 mPa·S and preferably 40 mPa·S under 60 rpm of a rotational viscometer, and the upper limit thereof is 800000 mPa·S, preferably 450000 mPa·S and more preferably 400000 mPa·S under 0.6 rpm of a rotational viscometer. It should be noted that the upper limit viscosity under 60 rpm of the rotational viscometer is 10000 mPa·S, and the lower limit viscosity under 0.6 rpm of the rotational viscometer is 10000 mPa·S. Said viscosity is a value measured at 20 to 25° C. with a B-type viscometer on a dispersed (suspended) solution of the cross-linked-type polyacrylic acid in water in a concentration of 1% by weight.

As the binder for a lithium cell of the present invention, the one in which cross-linked-type polyacrylic acid is dissolved or dispersed in a solvent is preferable, and said solvent includes, for example, N-methyl-2-pyrrolidone (NMP), dimethylformamide, dimethylacetamide, methylformamide, dimethylsulfoxide, acetonitrile, tetrahydrofuran, γ-butyronitrile, toluene, methyl ethyl ketone, ethyl acetate, dioxane, or the like, and among them, NMP is preferable. Concentration of the cross-linked-type polyacrylic acid in the binder for a lithium cell may be set as appropriate according to the concentration to be used in electrode preparation, and usually it is 1 to 30 mg/mL, preferably 1 to 10 mg/mL.

The cross-linked-type polyacrylic acid pertaining to the present invention can be prepared by subjecting acrylic acid and the compounds of the general formulae [1] to [11] to polymerization reaction and cross-linking reaction, or by subjecting polyacrylic acid and the compound of the general formula [12], the compound of the general formula [13], or a polymer of the general formula [14] to a cross-linking reaction. Said polymerization reaction and cross-linking reaction may be performed in accordance with a method known per se, and in the case where they are subjected to the polymerization reaction and the cross-linking reaction, the polymerization reaction and the cross-linking reaction may be performed in two stages, or the polymerization reaction and the cross-linking reaction may be performed at the same time. In addition, depending on a kind of a polymerization initiator or a cross-linking agent, or a method of polymerization or cross-linking, it may be prepared by subjecting them to the reaction by performing heating or ultraviolet ray irradiation. Reaction time, in which heating is not applied in the cross-linking reaction, is usually 0.1 to 10 hours and preferably, 0.1 to 5 hours. In addition, when heating is applied in the cross-linking reaction, it is reacted usually at 30 to 200° C., preferably at 70 to 180° C., and more preferably at 100 to 160° C., for usually 0.1 to 10 hours and preferably 0.1 to 5 hours. In the case of neutralizing the cross-linked-type polyacrylic acid, it may be neutralized with NaOH, LiOH, KOH or the like, after the cross-linking reaction.

The cross-linked-type polyacrylic acid pertaining to the present invention is prepared, specifically, as described below.

That is, it is prepared by dissolving or dispersing acrylic acid and the above-described compounds of the general formulae [1] to [11] in a suitable solvent, in the presence of the polymerization initiator, and subjecting them to a reaction for 0.1 to 10 hours, if necessary, under heating at 30 to 200° C., or cooling at 20 to −80° C. In addition, by further adding 0.6 to 1 mol of NaOH, LiOH, KOH or the like, to 1 mol of the carboxyl group of the obtained cross-linked-type polyacrylic acid, it may be converted to the cross-linked-type polyacrylate. As a solvent to be used in this reaction, a solvent which dissolves or disperses the above-described cross-linked-type polyacrylic acid, or the like is included. The polymerization initiator is not especially limited as long as it is the well-known one, and includes, for example, a radical polymerization initiator such as potassium persulfate, ammonium persulfate, sodium persulfate, t-butylhydroperoxide, hydrogen peroxide, 2,2'-azobisisobutyronitrile, 4,4'-azobis(4-cyanopentanoic acid), 2,2'-azobis(2-methylbutyronitrile), 2,2'-azobis(2,4-dimethylvaleronitrile), triethylborane; and an ionic polymerization initiator such as n-butyl lithium, s-butyl lithium, t-butyl lithium, or the like. Use amount of the polymerization initiator may be set appropriately from a range of 0.001 to 1 g, to 1 mol of acrylic acid. In addition, use amount of compounds of the general formulae [1] to [11] is usually 0.001 to 10% by mol, preferably 0.01 to 1% by mol, more preferably 0.05 to 0.5% by mol, and still more preferably 0.1 to 0.3% by mol, to 1 mol of acrylic acid. After that, in the case of neutralizing polyacrylic acid, neutralization processing is performed by adding, for example, 60 to 100% by mole of sodium hydroxide, to 1 mol of the carboxylic acid in polyacrylic acid.

In addition, the cross-linked-type polyacrylic acid pertaining to the present invention is prepared by dissolving or dispersing polyacrylic acid and the compound of the general formula [12] or [13], or the polymer of the general formula [14], in a suitable solvent, and subjecting them to a reaction for 0.1 to 10 hours, if necessary, under heating at 30 to 200° C. As the solvent to be used here, the same solvent as used in the above-described preparation method is included. Use amount of the compound of the general formulae [12] to [13], or the polymer of the general formula [14] is usually, 0.01 to 40% by weight, preferably 0.01 to 20% by weight and more preferably 0.1 to 10% by weight, to weight of polyacrylic acid. Weight average molecular weight of polyacrylic acid to be used in this reaction is usually 1,000 to Ser. No. 10/000,000, and preferably 10,000 to 5,000,000. After that, in the case of neutralizing polyacrylic acid, neutralization processing is performed by adding, for example, 60 to 100% by mole of sodium hydroxide, to 1 mol of the carboxylic acid in polyacrylic acid.

[Active Material Containing Silicon]

The active material pertaining to the present invention contains silicon, and the active material other than silicon includes carbon, germanium, tin, lead, zinc, aluminum, indium, or the like, and among them, carbon is preferable.

The above-described silicon includes, in addition to silicon, a silicon oxide such as SiO, silicon bound to a metal (SiM: M is a metal such as magnesium, iron, calcium, cobalt, nickel, or boron), or the like.

The above-described carbon includes, for example, a graphite-based carbon material (graphite) such as natural graphite, artificial graphite, expanded graphite; carbon black, activated carbon, carbon fiber, cokes, soft carbon, hard carbon, or the like. The preferable one includes the graphite such as natural graphite, artificial graphite, and expanded graphite. Said natural graphite includes, for example, scale-like graphite, bulk graphite, or the like. Said artificial graphite includes bulk graphite, vapor phase epitaxy graphite, scale-like graphite, or fibrous graphite.

Average particle size of the active material pertaining to the present invention differs depending on a kind of the active material. It is usually 1 nm to 100 μm, preferably 1 nm to 50 μm and more preferably 1 nm to 20 μm.

Content of silicon in the active material pertaining to the present invention is usually 10 to 60% by weight, and preferably 20 to 50% by weight.

[Conductive Assistant]

The conductive assistant pertaining to the present invention includes, for example, carbon black such as acetylene black, Ketjen black, furnace black, thermal black, and among them, acetylene black and Ketjen black are preferable, and acetylene black is more preferable.

[Composition for Producing Electrode]

The composition for producing an electrode of the present invention comprises 1) the active material containing silicon pertaining to the present invention, 2) the conductive assistant pertaining to the present invention and 3) the cross-linked-type polyacrylic acid pertaining to the present invention, and does not comprising a functional group-containing vinylidene fluoride-based polymer. Said composition may be for preparation of positive electrode, or for preparation of negative electrode, and it is preferable to be for preparation of negative electrode.

Content of the active material containing silicon pertaining to the present invention, in the composition for producing an electrode of the present invention, is 60 to 98% by weight, more preferably 70 to 98% by weight, and still more preferably 80 to 98% by weight, to weight of the composition for producing an electrode not including a solvent.

Content of the conductive assistant pertaining to the present invention, in the composition for producing an electrode of the present invention, is 1 to 20% by weight, more preferably 1 to 15% by weight, and still more preferably 1 to 10% by weight, to weight of the composition for producing an electrode not including a solvent.

Content of the cross-linked-type polyacrylic acid pertaining to the present invention, in the composition for producing an electrode of the present invention, is 1 to 30% by weight, more preferably 1 to 20% by weight, still more preferably 1 to 15% by weight, and still further preferably 1 to 10% by weight to weight of the composition for producing an electrode not including a solvent. By making the cross-linked-type polyacrylic acid contained within this range, the active material and the conductive assistant can be dispersed uniformly on a current collector in producing of an electrode, as well as destruction of an electrode structure can be prevented, even on silicon expansion.

The composition for producing an electrode of the present invention may comprise, for example, a supporting salt, an ion conductive polymer, a binder (excluding the cross-linked-type polyacrylic acid pertaining to the present invention), and the like, other than the active material containing silicon, the conductive assistant and the cross-linked-type polyacrylic acid pertaining to the present invention. Said supporting salt includes $Li(C_2F_5SO_2)_2N$ (LiBETI), $LiPF_6$, $LiBF_4$, $LiClO_4$, $LiAsF_6$, $LiCF_3SO_3$, or the like. Said ion conductive polymer includes, for example, polyethylene oxide (PEO)-based, and polypropylene oxide (PPO)-based polymers. The above-described binder includes, for example, polyfluorovinylidene (PVDF), polytetrafluoroethylene (PTFE), carboxymethylcellulose (CMC), styrene-butadiene copolymer (SBR), an acrylonitrile-butadiene copolymer (NBR), polyacrylonitrile (PAN), ethylene-vinyl alcohol copolymer (EVOH), polyurethane, polyacrylate, polyvinyl ether, polyimide, or the like. Content of these supporting salt, ion conductive polymer, and binder may be set in accordance with amount to be used usually in this field.

The composition for producing an electrode of the present invention is obtained by mixing the active material containing silicon pertaining to the present invention, the conductive assistant pertaining to the present invention, and the cross-linked-type polyacrylic acid pertaining to the present invention, in a suitable solvent, so as to attain the above-described concentration range. Said solvent includes, for example, N-methyl-2-pyrrolidone (NMP), dimethylformamide, dimethylacetamide, methylformamide, dimethylsulfoxide, acetonitrile, tetrahydrofuran, γ-butyrolactone toluene, methyl ethyl ketone, ethyl acetate, dioxane, or the like, and NMP is preferable.

In the case where the compound shown by the general formula [12] or [13], or the polymer of the general formula [14] is used, as the cross-linking agent of polyacrylic acid, the composition for producing an electrode of the present invention may be produced by dispersing or dissolving the active material containing silicon pertaining to the present invention, the conductive assistant pertaining to the present invention, and polyacrylic acid, as well as the compound represented by the general formula [12] or [13], or the polymer shown by the general formula [14], in a suitable solvent as described above, and then by subjecting them to a cross-linking reaction. That is, the composition for producing an electrode may be produced at the same time as cross-linking of polyacrylic acid by the cross-linking agent (the compound shown by the general formula [12] or [13], or the polymer shown by the general formula [14]). As for condition or the like of the above-described cross-linking reaction, the same one as described in the preparation method for the cross-linked-type polyacrylic acid pertaining to the present invention of [Binder for lithium cell] is included. Weight average molecular weight of polyacrylic acid to be used in this occasion is usually 1,000 to Ser. No. 10/000,000, and preferably 10,000 to 5,000,000. Use amount of polyacrylic acid in this case may be set appropriately, so that the obtained cross-linked-type polyacrylic acid is within the above-described range. In addition, use amount of the cross-linking agent is usually 0.01 to 40% by weight, preferably 0.01 to 20% by weight, and more preferably 0.1 to 10% by weight, to said polyacrylic acid. In addition, in the case of neutralizing the cross-linked-type polyacrylic, acid in the above-described method, the composition for producing an electrode of the present invention may be produced by using polyacrylic acid neutralized in advance, instead of polyacrylic acid.

[Current Collector]

A current collector pertaining to the present invention is composed of a foil, a mesh, an expanded grid (an expanded metal), a punched metal or the like using a conductive material such as nickel, copper, stainless steel (SUS), or the like. Sieve opening of the mesh, wire diameter, number of the mesh, and the like are not especially limited, and the one known in prior art can be used. Preferable thickness of the current collector is 5 to 30 µm. However, the current collector having thickness outside this range may be used.

Size of the current collector is determined depending on the use applications of a cell. In the case of producing a large size electrode to be used in a large size cell, the current collector having large area is used. In the case of manufacturing a small size electrode to be used in a small size cell, the current collector having small area is used.

[Electrode of the Present Invention]

The electrode of the present invention comprises 1) the active material containing silicon pertaining to the present invention, 2) the conductive assistant pertaining to the present invention, 3) the cross-linked-type polyacrylic acid pertaining to the present invention, and 4) the current collector pertaining to the present invention, and does not comprise a functional group-containing vinylidene fluoride-based polymer. Specifically, it comprises the current collector pertaining to the present invention, and the active material layer (the composition for producing an electrode pertaining to the present invention) including, the active material containing silicon pertaining to the present invention, the conductive assistant pertaining to the present invention and the cross-linked-type polyacrylic acid pertaining to the present invention, formed at the surface thereof. The electrode of the present invention can be used either as a negative electrode or a positive electrode, and, it is preferable to be used as a negative electrode.

In the above-described active material layer, the electrode of the present invention is superior in reversibility because the cross-linked-type polyacrylic acid disperses uniformly the active material containing silicon and the conductive assistant, and maintains good covering property. Further, the electrode of the present invention is also superior in cycle characteristics because the cross-linked-type polyacrylic acid significantly increases binding strength between the active materials themselves or binding strength between the active material and the current collector, due to suitable cross-linking degree.

Thickness (thickness of the coating layer) of the active material layer is usually 1 to 500 µm, preferably 1 to 300 µm and more preferably 1 to 150 µm.

The electrode of the present invention can be produced in accordance with the method known per se, except for using the above-described composition for producing an electrode of the present invention, and it can be produced for example, by coating the above-described composition (which includes 1) the active material containing silicon, 2) the conductive assistant, and 3) the cross-linked-type polyacrylic acid) for producing an electrode pertaining to the present invention, on the current collector, drying, and then pressing. The composition for producing an electrode pertaining to the present invention is enough to be used in an amount for attaining the above-described thickness after drying. It should be noted that, in the case of using the compound shown by the general formula [12] or [13], or the polymer of the general formula [14], as the cross-linking agent of polyacrylic acid, the electrode of the present invention may be produced by coating a solution including polyacrylic acid and these cross-linking agents, instead of the cross-linked-type polyacrylic acid, onto the current collector, subjecting it to cross-linking on the current collector, drying and pressing. Or, cross-linking degree may be increased by coating the composition for producing an electrode including the cross-linked-type polyacrylic acid with lower cross-linking degree, onto the current collector, and making the cross-linking reaction promoted.

As a method for coating the composition for producing an electrode of the present invention, on the current collector, for example, an self-propelled coater, an ink jet method, a doctor blade method, a spray method, or a combination thereof can be used, and, a doctor blade method or an ink jet method, which can form a thin layer, is preferable, and a doctor blade method is more preferable.

Drying may be performed in accordance with a method known per se, and, it is performed usually by heating treatment. Drying condition (necessity of vacuum, drying time, drying temperature) in heating may be set appropriately depending on coating amount or volatilization speed of the composition for producing an electrode of the present invention.

Press method may also be performed in accordance with a method known per se, and, includes, for example, a calender roll method, a flat plate press or the like, and a calender roll method is preferable.

The above-described electrode of the present invention can be used in a lithium cell, and can be used in any of a usual cell as long as it is composed of a positive electrode, an electrolyte and a negative electrode.

As said electrolyte, the one having an additive such as vinylene carbonate, fluorovinylene carbonate, methylvinylene carbonate, fluoromethylvinylene carbonate, ethylvinylene carbonate, propylvinylene carbonate, butylvinylene carbonate, dipropylvinylene carbonate, 4,5-dimethylvinylene carbonate, 4,5-diethylvinylene carbonate, vinylethylene carbonate, divinylethylene carbonate, phenylethylene carbonate, diallyl carbonate, fluoroethylene carbonate (FEC), catechol carbonate, 1,3-propane sultone, and butane sultone is preferable, and among them, the one having fluoroethylene carbonate (FEC) is particularly preferable. Content of the additives in the electrolyte is usually 0.5% to 15%, and preferably 0.5 to 5%.

Explanation will be given below in detail on the present invention with reference to Examples, however, the present invention should not be limited thereto.

EXAMPLES

Example 1 Producing of Cell Using the Electrode of the Present Invention (1) Synthesis of Polycarbodiimide (PCD)

PCD was synthesized according to the method described in the paper of J. Appl. Polym. Sci., 21, 1999 (1977). That is, a mixture of 5.00 g of tolylene-2,4-diisocyanate (28 mmol; produced by Tokyo Chemical Industry Co., Ltd.) and 50 mg of 3-methyl-1-phenyl-3-phospholene-1-oxide (produced by Tokyo Chemical Industry Co., Ltd.) (1.0% by mol to tolylene-2,4-diisocyanate) was refluxed in 20 mL of tetrahydrofuran (THF) under nitrogen for 2 hours at 80° C., and was subsequently filtered to remove indissolvable gel. The filtrate was dried under reduced pressure to remove the solvent. White powder obtained in this way was purified as below: (i) dissolving completely the powder into minimum amount of THF, (ii) pouring the THF solution into 1000 ml of hexane to precipitate a polymer, and (iii) filtering the polymer, picking it up and drying it under reduced pressure. After repeating this procedure (i) to (iii) twice, 1.03 g of white PCD powder was obtained finally (yield: 27%). In addition, molecular weight of the obtained PCD was 4000 in Mn (number average molecular weight), and 11000 in Mw (weight average molecular weight).

(2) Producing of Composition for Producing Electrode

Using a planet ball mill (Pulverisette 7, produced by Fristsch Inc.), 18 mg of nano-sized silicon powder (particle size: 100 nm, produced by Sigma-Aldrich Co. LLC.), 30 mg of natural graphite (particle size: 3 μm, produced by SEC Carbon Ltd.), and 6 mg of Ketjen Black (KB, produced by Lion Co.) were sufficiently mixed for 12 hours under 600 rpm. The obtained mixture (Si:graphite:KB=30:50:10, in weight ratio) was used as an electrode material. Next, polyacrylic acid (PAH, Mw=1250000, produced by Sigma-Aldrich Co. LLC.) was dissolved in N-methyl pyrrolidone (NMP). Into the above-described electrode material, firstly the NMP solution of PAH was added and mixed sufficiently, and it was further diluted with NMP to prepare slurry. Next, the NMP solution containing the predetermined amount of polycarbodiimide (PCD) was added to the slurry and mixed at room temperature for 20 minutes to produce slurry (composition) for producing three kinds of electrodes. In said slurry for producing the electrode, 18 mg of silicon, 30 mg of graphite and 6 mg of KB are included in 900 μL of the NMP solution. In addition, total amount of PAH and PCD in the slurry for producing three kinds of electrodes was set constant at 6 mg, and PCD amount was 0.3 mg, 0.6 mg and 0.9 mg, respectively, and PHA amount was 5.7 mg, 5.4 mg and 5.1 mg, respectively. That is, by coating the slurry for producing an electrode on the current collector, and then drying it, it became the one containing 30% by weight of silicon, 50% by weight of graphite, 10% by weight of KB, 0.95% by weight, 0.9% by weight or 0.85% by weight of PAH, and 0.5% by weight, 1.0% by weight or 1.5% by weight of PCD.

(3) Production of Negative Electrode for Lithium Cell

The above-described composition for producing an electrode was coated on a copper current collector using a doctor blade. After that, it was dried in air at 80° C. and then dried under vacuum at 150° C. for 24 hours. It should be noted that it was pressed using a roll before use to make an electrode. Thickness of a membrane on the current collector was about 9 to 10 μm by measurement using a micrometer (produced by Mitutoyo Corp.).

(4) Production of Coin-Type Cell

A coin-type cell was assembled in a glove box filled with argon. Here, a coin-type cell composed of the electrode obtained in (3), lithium foil electrode, an ethylene carbonate (EC)/dimethyl carbonate (DMC) (1:1 in volume ratio) solution of 1 mol dm$^{-3}$ LiPF$_6$ and a separator, was assembled.

Comparative Example 1 Producing of Negative Electrode for Lithium Cell Using PAH as Binder A composition for producing an electrode (a composition for producing an electrode including 10% by weight of PAH) was prepared by a similar method as in Example 1 (1) to (3), except for changing PCD concentration to 0% in Example 1 (2), to produce a negative electrode for a lithium cell (hereafter abbreviated as a lithium cell electrode (PAH) or Aldrich PAH).

Comparative Example 2 Production of Negative Electrode for Lithium Cell Using PVDF as Binder A composition for producing an electrode was prepared similarly as in Comparative Example 1, and a lithium cell electrode was produced, except for using polyvinylidene fluoride (PVDF, produced by Polysciences Inc.), instead of polyacrylic acid in Comparative Example 1.

Experiment Example 1 Measurement of Characteristics of Various Binders Using Attenuated Total Reflection-Fourier Transform Infrared Spectrometer (NICOLET6700 for ATR-FTIR, Produced by Thermo Scientific KK.)

In order to examine a reaction between PAH and PCD, PAH and PCD were mixed in NMP at room temperature for 20 minutes, so as to attain the predetermined concentration [(a) PAH 10 wt %, PCD 0 wt %, (b) PAH 9.5 wt %, PCD 0.5 wt %, (c) PAH 9.0 wt %, PCD 1.0 wt %, and (d) PAH 5 wt %, PCD 5 wt %] (without using electrode materials such as the active material, the conductive assistant). Next, the NMP solution was cast on micro slide glass, dried similarly as in Example 1 (3) to prepare a cast film bound with a binder.

On the obtained 4 kinds of cast films (a) to (d), ATR-FTIR spectra were measured. Results thereof are described in FIG. 1. In addition, as comparison, ATR-FTIR spectrum of PCD powder is described in FIG. 1 as (e). The horizontal axis of FIG. 1 represents wave number and the vertical axis represents absorbance, respectively.

From this result, it was found that the carboxyl group was present in three different states, in PAH not containing PCD. That is, it was found that it was present in three different states of (i) a free carboxyl group (—COOH) at 1710 and 1410 cm$^{-1}$, (ii) a carboxyl group associated by hydrogen bond at 1620 and 1460 cm$^{-1}$ and (iii) a carboxylic anhydride group having C=O symmetric stretching and contraction at 1800 cm$^1$. These results show that main chains of PAH aggregated by formation of hydrogen bonds among partially dehydrated carboxyl groups, caused by drying in vacuum at 150° C. On the other hand, clear change was observed in IR spectrum of a cast film, when PCD is added into an NMP solution of PAH (when PAH forms a cross-linking structure). The IR peak of the carboxylic anhydride group became not observed when PCD concentration of (c) was 1.0% by weight, and formation of N-acyl urea (1650 cm$^{-1}$) was confirmed when PCD concentration of (d) was 5.0% by weight. That is, with increase in the addition amount of PCD to PAH (with increase in cross-linking degree), absorption of the free carboxyl group became weak, and the carboxylic anhydride group disappeared in the IR spectrum, showing that all of the carboxyl groups react with sufficient amount of PCD. Accordingly, a chemically cross-linked structure of PAH by the addition of PCD was clarified from IR observation.

That is, it was found that cross-link bonding of PAH by the addition of PCD is generated by a cross-linking reaction with the carboxyl group in PAH, and hydrogen bond between the carboxyl groups is partially destroyed, resulting in dissociation of a PAH polymer aggregated in NMP. Accordingly, it is considered that slurry behaves suitable rheology, gives better dispersion between the active material and the conductive assistant, which gives influence on interaction between the carboxyl group and the active material.

Experiment Example 2 Various Performance Tests (1) Measurement of 90 Degree Peeling Strength On electrodes having PCD content of 1.0% by weight among electrodes obtained in Example 1 (3), and the electrode obtained in Comparative Example 1, a 90 degree peeling test was performed using a single column-type tensile-compression testing machine (STA-1150, produced by A&D Co., Ltd.).

As the result, peeling strength of the electrode having 1.0% by weight of PCD was 0.32 Ncm$^{-1}$, and peeling strength of the electrode composed of polyacrylic acid was 0.04 Ncm$^{-1}$, respectively.

That is, it was found that by cross-linking a polymer by the addition of PCD, peeling strength enhances largely.

In addition, it was also clarified that peeling strength of the electrode having 1.0% by weight of PCD is equal to or higher than peeling of the electrode.

(2) Comparison Between Image of an Optical Microscope and that of a Scanning Electron Microscope Three kinds of electrodes obtained in Example 1 (3) and the electrode obtained in Comparative Example 1 were observed using an optical microscope having low magnification (50 times) and a scanning electron microscope having high magnification (10000 times) (SEM, SUPRA40, produced by Carl Zeiss AG). Images thereof were shown in FIG. 2. It should be noted that, in FIG. 2, (a) to (d) represent observation results using the optical microscope, and (e) to (h) represent observation results using SEM. In addition, (a) and (e) represent figures of the electrode obtained in Comparative example 1, (b) and (f) represent figures of the electrode having a PCD content of 0.5% by weight (PAH 9.5% by weight) in Example 1 (3), (c) and (g) represent figures of the electrode having a PCD content of 1.0% by weight (PAH 9.0% by weight) in Example 1 (3), and (d) and (h) represent figures of the electrode having a PCD content of 5% by weight (PAH 5% by weight) in Example 1 (3).

Figure 2:
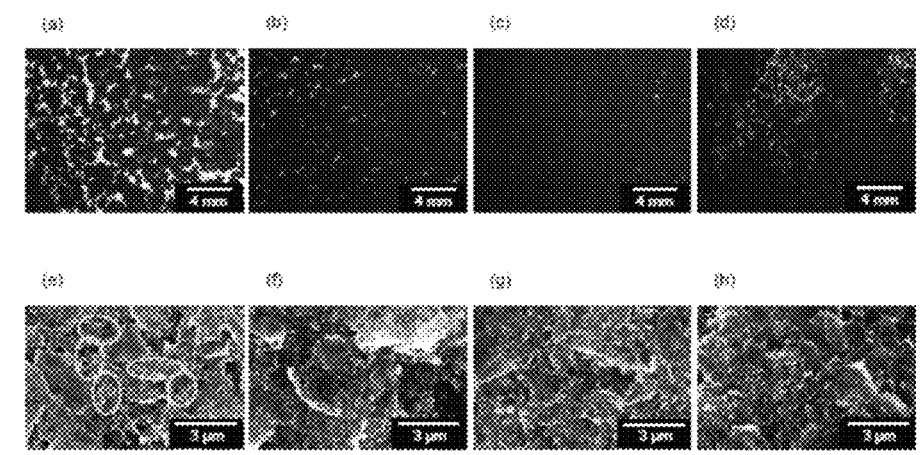
FIG. 2 represents images of various electrodes, observed by an optical microscope and a scanning electron microscope in Experiment Example 2 (2).

From this result, in PAH slurry not having PCD, a copper foil at the lower of the electrode layer was clearly observed using an optical microscope with a magnification of 50 times ((a) in FIG. 2). Accordingly it was found that the PAH slurry not having PCD became a not uniform and rough form on the copper foil. On the other hand, in the case where 1.0% by weight of PCD was added to the slurry, a smooth and uniform form was found, and it was found that the copper foil was completely covered with the slurry layer ((c) in FIG. 2). In addition, it was also found that by the addition of 1.0% by weight of PCD (by cross-linking polyacrylic acid), dispersion of the active material is greatly improved.

(3) Examination of Electrochemical Characteristics

Using three kinds of electrodes obtained in Example 1 (3) (the electrodes having a PCD content of 0.5% by weight, 1.0% by weight, and 1.5% by weight), and the electrode obtained in Comparative Example 1 (the electrode using not cross-linked polyacrylic acid as the binder), experiments were performed on characteristics of the initial charge-discharge, a differential capacity plot, and cycle characteristics. As for cycle characteristics, an experiment was performed also on the electrode obtained in Comparative Example 2 (using a vinylidene fluoride polymer as the binder).

Figure 3:
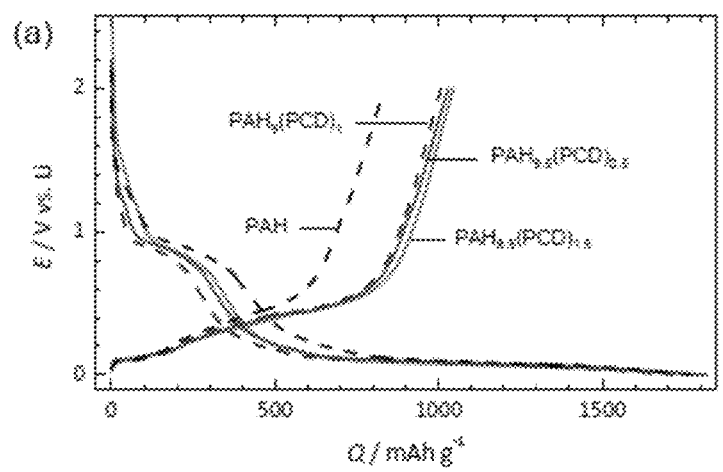
FIG. 3 represents charge-discharge curves of the first cycle of various electrodes in Experiment Example 2 (3).
Figure 4:
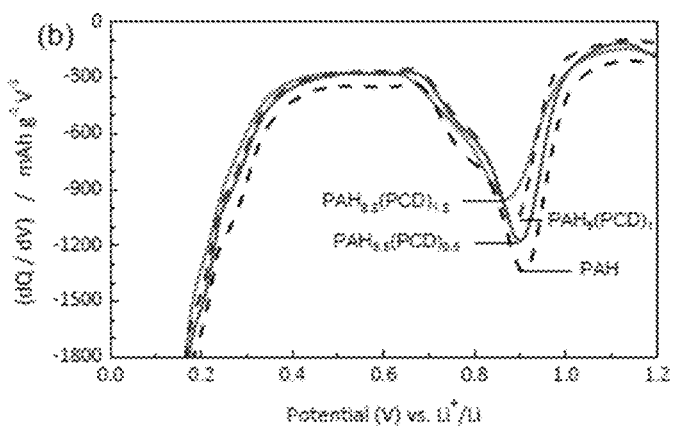
FIG. 4 represents differential capacity plots of various electrodes in Experiment Example 2 (3).
Figure 5:
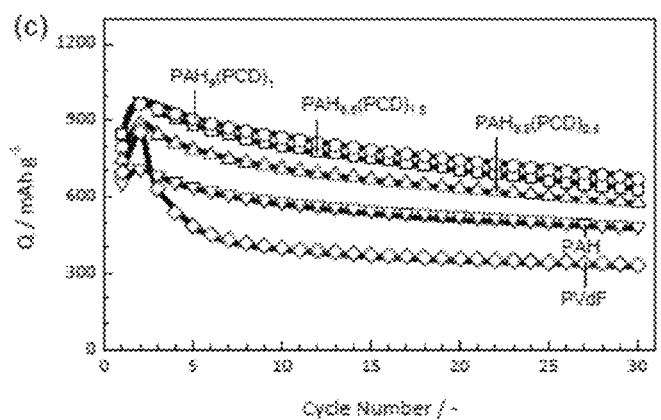
FIG. 5 represents cycle characteristic figures of various electrodes in Experiment Example 2 (3).

Results (a charge-discharge curve of the first cycle) of initial charge-discharge, result of a differential capacity plot, and result of cycle characteristics are shown in FIG. 3, FIG. 4, and FIG. 5, respectively. It should be noted that, in FIGS. 3 to 5, PAH, PAH$_{9.5}$(PCD)$_{0.5}$, PAH$_9$(PCD)$_1$ and PAH$_{8.5}$(PCD)$_{1.5}$ represent result using the electrode obtained in Comparative Example 1, result using the electrode (PCD content: 0.5% by weight) obtained in Example 1 (3), result using the electrode (PCD content: 1.0% by weight) obtained in Example 1 (3), and result using the electrode (PCD content: 1.5% by weight) obtained in Example 1 (3), respectively. PVDF in FIG. 5 represents result using the electrode obtained in Comparative Example 2.

As shown in the above-described FIG. 3, although the initial oxidation (delithiation) capacity of PAH not having PCD was 800 mAh/g, it increased to about 1000 mAh/g, in PAH cross-linked with PCD. As the result, the initial reduction/oxidation efficiency was largely improved from 47% in PAH to 60% in PAH cross-linked with 1% by weight of PCD.

From the differential dQ/dV plot in FIG. 4, irreversible voltage plateau was observed at about 0.8 V, in initial reduction (lithiation) process, in the electrode using PAH not having PCD. This is considered to be caused by decomposition of the electrolyte. On the other hand, in the case of the electrode using PAH cross-linked with PCD, it was found that an irreversible voltage plateau, relating to decomposition of the electrolyte at 0.8 V, decreases.

As is clear from the result of FIG. 5, capacity maintenance of the PAH-type electrode using or not using PCD was far better than that of PVDF. In addition, although the initial reversible capacity was largely influenced by dispersion of the active material, in any of the electrodes using PAH cross-linked with PCD, high capacity retention was observed. It was found that capacity retention rate to PAH: PCD=9.0:1.0 [PAH$_9$(PCD)$_1$] maintains 75% even after a test of 30 cycles.

From the above-described results, it was found that by using the cross-linked-type polyacrylic acid as the binder, electrode performance of a silicon-based material can be enhanced largely. That is, by using the cross-linked-type polyacrylic acid, dispersion of the electrode material in slurry can be improved largely adjusting a polymer stereostructure and rheology property of slurry in NMP. Further, chemical bonding by cross-linking of PAH suppresses distortion caused by volume expansion of silicon, and also improves stability of a composite electrode. Furthermore, the electrode having cross-linked PAH has good capacity retention, and can provide a reversible capacity of over 1000 mAh/g.

Accordingly, the cross-linked PAH exerts superior effect as the binder, and can widely apply to various electrode materials accompanying large volume change in charge-discharge.

Comparative Example 3 Producing of Electrode for Lithium Cell Using PAH as Binder (1) Production of Slurry for Producing of an Electrode Using a planet ball mill (Pulverisette 7, produced by Fristsch Inc.), 0.3 g of silicon powder (particle size: <100 nm, produced by Sigma-Aldrich Co. LLC.), 0.5 g of natural graphite (particle size: 3 µm, produced by SEC Carbon Co., Ltd.), and 0.1 g of acetylene black (AB, produced by Strem Chemicals Inc.) were sufficiently mixed for 12 hours under 600 rpm. The obtained mixture (Si:graphite:AB=30:50:10, in weight ratio) was used as an electrode material. Next, using straight chain polyacrylic acid (produced by Wako Pure Chemical Industries, Ltd.), as the binder, 1 g of said polyacrylic acid (CLPHA-01) was dissolved in 99 g of ion exchanged water. Into 0.5 g of an aqueous solution of 1% by weight of polyacrylic acid, 0.045 g of the above-described electrode material was added and mixed sufficiently, and it was further diluted with ion exchanged water to prepare slurry. In said slurry for producing the electrode, 15 mg of silicon, 45 mg of graphite, 5 mg of AB and 5 mg of CLPHA-01 are included, respectively. That is, after coating said slurry for producing the electrode on the current collector, by drying it, it became to contain 30% by weight of silicon, 50% by weight of graphite, 10% by weight of AB and 10% by weight of polyacrylic acid.

(2) Producing of Electrode for Lithium Cell

The above-described slurry for producing an electrode was coated on a copper current collector using a doctor blade. After that, it was dried in air at 80° C. and then under vacuum at 150° C. for 24 hours. It should be noted that it was pressed using a roll before use to make an electrode (CLPAH-01 electrode). It should be noted that thickness of a membrane on the current collector was about 10 to 15 µm by observation using a composite beam process observation apparatus (JIB-4500, produced by JEOL Ltd.).

Comparative Example 4 Producing of Electrode for Lithium Cell Using Carbopol as Binder (Carbopol Electrode)

Slurry for producing an electrode was prepared similarly as in Comparative Example 3, except for using Carbopol 980 (produced by Japan Chemicals Sales Co., Ltd.), instead of straight chain polyacrylic acid, instead of the straight chain polyacrylic acid (hereafter this electrode is abbreviated as Carbopol electrode).

Example 2 Producing of Electrode for Lithium Cell Using Cross-Linked PAH as Binder (CLPAH-02 Electrode)

Slurry for producing an electrode was prepared similarly as in Comparative Example 3, except for using cross-linked polyacrylic acid (CLPAH-02) obtained by polymerization under containing of 0.007% by mol of diethylene glycol diallyl ether in the polymer, instead of the straight chain polyacrylic acid (hereafter this electrode is abbreviated as CLPAH-02 electrode).

Example 3 Producing of Electrode for Lithium Cell Using Cross-Linked PAH as Binder (CLPAH-03 Electrode)

Slurry for producing an electrode was prepared similarly as in Comparative Example 3, except for using cross-linked polyacrylic acid (CLPAH-03) obtained by polymerization under containing of 0.07% by mol of diethylene glycol diallyl ether in the polymer, instead of the straight chain polyacrylic acid (hereafter this electrode is abbreviated as CLPAH-03 electrode).

Example 4 Producing of Electrode for Lithium Cell Using Cross-Linked PAH as Binder (CLPAH-00 Electrode)

Slurry for producing an electrode was prepared similarly as in Comparative Example 3, except for using cross-linked polyacrylic acid (CLPAH-00) obtained by polymerization under containing of 0.7% by mol of diethylene glycol diallyl ether in the polymer, instead of the straight chain polyacrylic acid (hereafter this electrode is abbreviated as CLPAH-00 electrode).

Example 5 Producing of an Electrode for a Lithium Cell Using Cross-Linked PAH as a Binder (CLPAH-07 Electrode)

Slurry for producing an electrode was prepared similarly as in Comparative Example 3, except for using cross-linked polyacrylic acid (CLPAH-07) obtained by polymerization under containing of 0.14% by mol of diethylene glycol diallyl ether in the polymer instead of the straight chain polyacrylic acid (hereafter this electrode is abbreviated as CLPAH-07 electrode).

Example 6 Producing of an Electrode for a Lithium Cell Using Cross-Linked PAH as a Binder (CLPAH-11 Electrode)

Slurry for producing an electrode was prepared similarly as in Comparative Example 3, except for using cross-linked polyacrylic acid (CLPAH-11) obtained by polymerization under containing of 0.2% by mol of diethylene glycol diallyl ether in the polymer instead of the straight chain polyacrylic acid (hereafter this electrode is abbreviated as CLPAH-11 electrode).

Example 7 Producing of an Electrode for a Lithium Cell Using Cross-Linked PAH as a Binder (CLPAH-14 Electrode)

Slurry for producing an electrode was prepared similarly as in Comparative Example 3, except for using cross-linked polyacrylic acid (CLPAH-14) obtained by polymerization under containing of 0.45% by mol of diethylene glycol diallyl ether in the polymer instead of the straight chain polyacrylic acid (hereafter this electrode is abbreviated as CLPAH-14 electrode).

Experiment Example 3 Charge-Discharge Test
Using Various Electrodes

Using the CLPAH-01 electrode, the CLPAH-02 electrode, the CLPAH-03 electrode, and the CLPAH-00 electrode, a constant current charge-discharge test was performed under the following condition.
   Counter electrode: Li foil
   Electrolytic solution: mixed solution of EC/DMC (1:1 in volume ratio) containing 1 M $LiPF_6$
   Measuring device: TOSCAT-3000U charge-discharge test equipment (produced by Toyo System Co., Ltd.)
   Potential and current density
   The first cycle
   Potential range 2.0 to 0.0 V (vs. $Li/Li^+$)
   Current density 50 mAh/g
   The $2^{nd}$ and the subsequent cycle
   Potential range 2.0 to 0.0 V (vs. $Li/Li^+$)
   Current density 100 mAh/g
   Result of the initial charge-discharge, change of discharge capacity by charge-discharge cycle, change of coulombic efficiency by charge-discharge cycle, and change of coulombic efficiency by charge-discharge cycle ($2^{nd}$ to $10^{th}$), by each electrode are represented in FIG. 6 (a) to (d), respectively [(a): result of the initial charge-discharge, (b): change of discharge capacity, (c): change of coulombic efficiency, (d): change of coulombic efficiency ($2^{nd}$ to $10^{th}$ cycles)].

Figure 6:
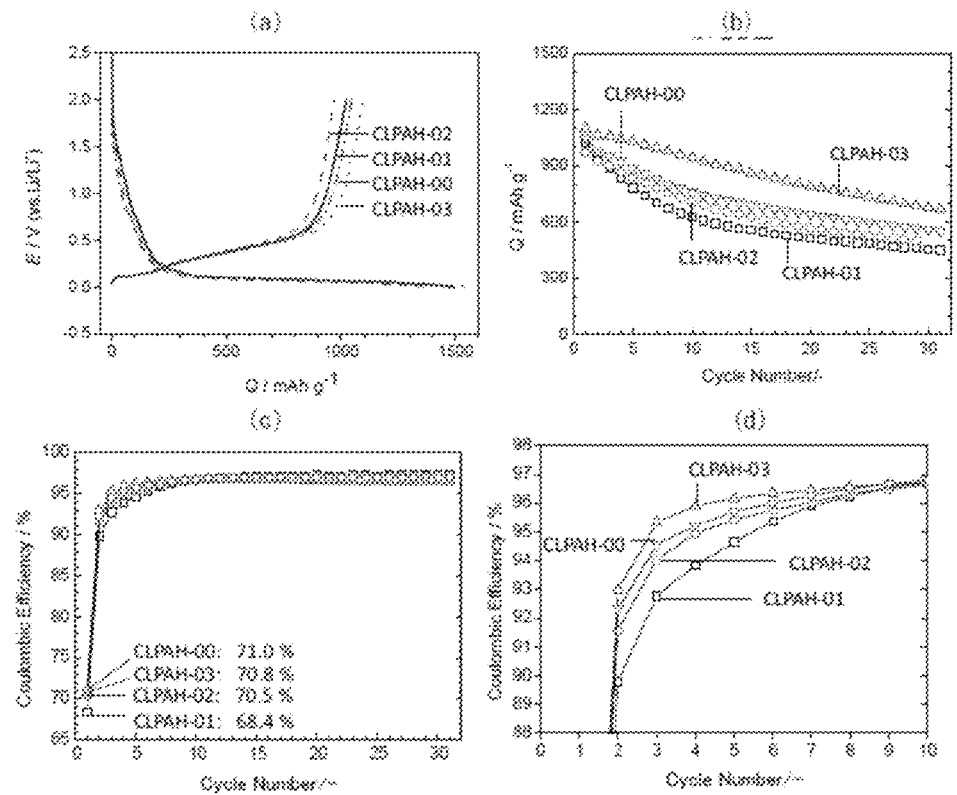
FIG. 6 represents (a) result of the initial charge-discharge, (b) change of discharge capacity by charge-discharge cycle, (c) change of coulombic efficiency by charge-discharge cycle and (d) change of coulombic efficiency ($2^{nd}$ to $10^{th}$) by charge-discharge cycle by various electrodes in Experiment Example 3.

From the results of FIG. 6, it was found that the initial discharge capacity showed a value near about 1000 mAh/g, even in using any electrodes, regardless of cross-linking degree.

In addition, as for reversible capacity during cycle, any of the electrodes using cross-linked PAH (hereafter they may be abbreviated as polyacrylic acid PAH electrodes) showed higher value, as compared with the not cross-linked straight chain PAH electrode (it may be abbreviated as the not cross-linked type PAH electrode; the CLAPA-01 electrode). In particular, it was found that the electrode using the CLAPA-03 electrode (an amount of the cross-linking agent, 0.07% by mol) shows very higher reversible capacity and capacity retention rate, as compared with other electrodes.

As for the initial coulombic efficiency, the binder using PAH having the higher cross-linking degree showed the higher value, although difference was very small. The not cross-linked-type PAH electrode (the CLPAH-01 electrode) showed lower value by 2 to 3%, as compared with the three cross-linked-type PAH electrodes.

In addition, as for coulombic efficiency from $2^{nd}$ to $10^{th}$ cycles [FIG. 6 (d)], it was found that any of the cross-linked-type PAH electrodes showed faster rising and stabilization, as compared with the not cross-linked-type PAH electrodes. The CLPAH-03 electrode showed the highest coulombic efficiency in the initial cycle, and the CLPAH-00 electrode showed a little better coulombic efficiency, as compared with the CLPAH-02 electrode.

It should be noted that when the result of the Aldrich electrode prepared similarly as in the CLPAH-01 electrode, using not cross-linked-type PAH, having a molecular weight of 1,250,000 (produced by Sigma-Aldrich Co. LLC.), is compared with the above-described result, it showed reversible capacity only about the same degree as that of the not cross-linked-type PAH electrode (the CLPAH-01 electrode), and largely lower reversible capacity, as compared with the CLPAH-03 electrode. Further, the initial coulombic efficiency was also the lowest among the four electrodes.

From these results, cross-linking of PAH is effective in improving electrochemical characteristics of the electrode, and among them optimum amount of the cross-linking agent of a polymer as the binder was estimated to be between CLPAH-02 (amount of the cross-linking agent, 0.007% by mol) and CLPAH-00 (amount of the cross-linking agent, 0.7% by mol), and around CLPAH-03 (amount of the cross-linking agent, 0.07% by mol).

Experiment Example 4 Charge-Discharge Test
Using Various Electrodes

Using the Aldrich electrode, the CLPAH-07 electrode, the CLPAH-11 electrode, the CLPAH-14 electrode, and the Carbopol electrode, a constant current charge-discharge test was performed similarly as in Experiment Example 3. As for result of the initial charge-discharge, result of the $10^{th}$ time charge-discharge, and result of the $30^{th}$ time charge-discharge, for each electrode, charge-discharge capacity thereof, coulombic efficiency and retention ratio thereof are shown in Table 1 below. In addition, results for the CLPAH-01 electrode, the CLPAH-02 electrode, the CLPAH-03 electrode, and the CLPAH-00 electrode (results of Experiment Example 3) are also shown together.

TABLE 1

| Type | | Amount of cross-linking agent mol % | Charging capacity (mAh/g) | Discharging capacity (mAh/g) | coulombic efficiency % | Retention rate % |
|---|---|---|---|---|---|---|
| | | | Initial charge-discharge | | | |
| Aldrich | straight chain | 0 | 1495 | 971 | 65.0 | — |
| CLPAH-01 | straight chain | 0 | 1495 | 1023 | 68.4 | — |
| CLPAH-02 | cross-linked | 0.007 | 1379 | 972 | 70.5 | — |
| CLPAH-03 | cross-linked | 0.07 | 1549 | 1098 | 70.8 | — |
| CLPAH-07 | cross-linked | 0.14 | 1480 | 1076 | 72.7 | — |
| CLPAH-11 | cross-linked | 0.2 | 1559 | 1096 | 70.3 | — |
| CLPAH-14 | cross-linked | 0.45 | 1589 | 1122 | 70.6 | — |
| CLPAH-00 | cross-linked | 0.7 | 1473 | 1046 | 71.0 | — |
| Carbopol | cross-linked | — | 1760 | 1128 | 64.1 | — |
| | | | $10^{th}$ time charge-discharge | | | |
| Aldrich | straight chain | 0 | 636 | 614 | 96.6 | 63.3 |
| CLPAH-01 | straight chain | 0 | 647 | 626 | 96.7 | 61.2 |
| CLPAH-02 | cross-linked | 0.007 | 733 | 708 | 96.6 | 72.9 |
| CLPAH-03 | cross-linked | 0.07 | 974 | 942 | 96.7 | 85.8 |
| CLPAH-07 | cross-linked | 0.14 | 897 | 867 | 96.6 | 80.5 |
| CLPAH-11 | cross-linked | 0.2 | 827 | 797 | 96.3 | 72.7 |

TABLE 1-continued

| | Type | Amount of cross-linking agent mol % | Charging capacity (mAh/g) | Discharging capacity (mAh/g) | coulombic efficiency % | Retention rate % |
|---|---|---|---|---|---|---|
| CLPAH-14 | cross-linked | 0.45 | 796 | 765 | 96.1 | 68.1 |
| CLPAH-00 | cross-linked | 0.7 | 786 | 761 | 96.8 | 72.7 |
| Carbopol | cross-linked | — | 759 | 731 | 96.3 | 64.8 |
| | | | $30^{th}$ time charge-discharge | | | |
| Aldrich | straight chain | 0 | 449 | 437 | 97.2 | 45.0 |
| CLPAH-01 | straight chain | 0 | 468 | 455 | 97.4 | 44.5 |
| CLPAH-02 | cross-linked | 0.007 | 507 | 492 | 97.1 | 50.6 |
| CLPAH-03 | cross-linked | 0.07 | 703 | 679 | 96.5 | 61.8 |
| CLPAH-07 | cross-linked | 0.14 | 639 | 618 | 96.7 | 57.4 |
| CLPAH-11 | cross-linked | 0.2 | 566 | 548 | 96.8 | 50.0 |
| CLPAH-14 | cross-linked | 0.45 | 543 | 525 | 96.6 | 46.8 |
| CLPAH-00 | cross-linked | 0.7 | 577 | 560 | 97.0 | 53.5 |
| Carbopol | cross-linked | — | 504 | 489 | 97.1 | 43.4 |

From the results of Table 1, it was found that the initial discharge capacity shows a value near about 1000 mAh/g, in the case of using any electrode, regardless of cross-linking degree. However, the initial coulombic efficiency was around 65% in the not cross-linked-type PAH electrodes (the Aldrich electrode and the CLPA-01 electrode), or the electrode using a commercial Carbopol, while it was equal to or higher than 70% in the cross-linked-type PAH electrodes (CLAPA-02, 03, 07, 11, 14 and 00). From this result, it was found that the cross-linked-type PAH electrode of the present invention is capable of suppressing decomposition or the like of a solvent, not derived from a cell reaction.

In addition, it was found that charge-discharge capacity and retention ratio at the $10^{th}$ and $30^{th}$ cycle, in using the cross-linked-type PAH electrodes (CLPA-02, 03, 07, 11, 14, and 00), showed higher value, as compared with the not cross-linked-type PAH electrodes (the Aldrich electrode and the CLPA-01 electrode), or the Carbopol electrode.

From these results, it was found that use of cross-linked PAH as the binder enhances electrochemical characteristics of the electrode, as compared with the case of using the not cross-linked one. In addition, it was found that optimum amount of the cross-linking agent of a polymer as the binder is between CLPAH-02 (amount of the cross-linking agent, 0.007% by mol) and CLPAH-00 (amount of the cross-linking agent, 0.7% by mol), and particularly around CLPAH-03 (amount of the cross-linking agent, 0.07% by mol) is suitable.

Comparative Example 5 Production of Electrode for Lithium Cell Using Neutralized PAH (CLPAH$_{0.2}$Na$_{0.8}$-01) as Binder Into 230 ml of water, 2.3 g of straight chain polyacrylic acid (produced by Wako Pure Chemical Industries, Ltd.) was added and dispersed by stirring for 2 hours. Into the obtained dispersed solution, 18% sodium hydroxide solution was added to adjust pH to 6.8 to obtain an aqueous solution of 1% by weight of neutralized polyacrylic acid (CLPAH$_{0.2}$Na$_{0.8}$-01).

Slurry for producing an electrode was prepared similarly as in Comparative Example 3, except for using said solution, instead of the aqueous solution of 1% by weight of polyacrylic acid, to produce the electrode for a lithium cell. The obtained electrode was referred to as the CLPAH$_{0.2}$Na$_{0.8}$-01 electrode.

Comparative Example 6 Production of Electrode for Lithium Cell Using Neutralized Polyacrylic Acid, Produced by Aldrich Co., Ltd., as Binder An aqueous solution of 1% by weight of neutralized polyacrylic acid (Aldrich$_{0.2}$Na$_{0.8}$) was obtained by similarly processing as in Comparative Example 5, except for using 2.3 g of polyacrylic acid produced by Sigma-Aldrich Co. LLC. (PAH, Mw=1250000, produced by Sigma-Aldrich Co. LLC.), instead of 2.3 g of straight chain polyacrylic acid (produced by Wako Pure Chemical Industries, Ltd.). Next, slurry for producing an electrode was prepared similarly as in Comparative Example 3, except for using said solution, instead of the aqueous solution of 1% by weight of polyacrylic acid, to produce the electrode for a lithium cell. The obtained electrode was referred to as the AldrichH$_{0.2}$Na$_{0.8}$ electrode.

Comparative Example 7 Producing of Electrode for Lithium Cell Using Neutralized Carbopol as Binder An aqueous solution of 1% by weight of neutralized Carbopol (Carbopol H$_{0.2}$Na$_{0.8}$) was obtained by similarly processing as in Comparative Example 5, except for using 2.3 g of Carbopol 980 (produced by Japan Chemicals Sales Co., Ltd.), instead of 2.3 g of straight chain polyacrylic acid. Next, slurry for producing an electrode was prepared similarly as in Comparative Example 3, except for using said solution, instead of the aqueous solution of 1% by weight of polyacrylic acid, to produce the electrode for a lithium cell. The obtained electrode was referred to as the CarbopolH$_{0.2}$Na$_{0.8}$ electrode.

Example 8 Producing of Electrode for Lithium Cell Using Neutralized and Cross-Linked PAH (CLPAH$_{0.2}$Na$_{0.8}$-02) as Binder An aqueous solution of 1% by weight of neutralized polyacrylic acid (CLPAHH$_{0.2}$Na$_{0.8}$-02) was obtained by similarly processing as in Comparative Example 5, except for using 2.3 g of cross-linked polyacrylic acid obtained by polymerization under containing of 0.007% by mol of diethylene glycol diallyl ether in the polymer, instead of 2.3 g of the straight chain polyacrylic acid. It should be noted that as diethylene glycol diallyl ether, the one synthesized in accordance with a method described in J. V. Crivello, S. K. Rajaraman, J. Polymer Science, Part A: Polymer Chemistry (1997), 35(8), 1593-1604 was used. Next, slurry for producing an electrode was prepared similarly as in Comparative Example 3, except for using said solution, instead of the aqueous solution of 1% by weight of polyacrylic acid, to produce the electrode for a lithium cell. The obtained electrode was referred to as the $CLPAH_{0.2}Na_{0.8}$-02 electrode.

Example 9 Producing of Electrode for Lithium Cell Using Neutralized and Cross-Linked PAH ($CLPAH_{0.2}Na_{0.8}$-03) as Binder An aqueous solution of 1% by weight of neutralized polyacrylic acid ($CLPAHH_{0.2}Na_{0.8}$-03) was obtained by similarly processing as in Comparative Example 5, except for using 2.3 g of cross-linked polyacrylic acid obtained by polymerization under containing of 0.07% by mol of diethylene glycol diallyl ether in the polymer, instead of 2.3 g of the straight chain polyacrylic acid. Next, slurry for producing an electrode was prepared similarly as in Comparative Example 3, except for using said solution, instead of the aqueous solution of 1% by weight of polyacrylic acid, to produce the electrode for a lithium cell. The obtained electrode was referred to as the $CLPAH_{0.2}Na_{0.8}$-03 electrode.

Example 10 Producing of Electrode for Lithium Cell Using Neutralized and Cross-Linked PAH ($CLPAH_{0.2}Na_{0.8}$-07) as Binder An aqueous solution of 1% by weight of neutralized polyacrylic acid ($CLPAHH_{0.2}Na_{0.8}$-07) was obtained by similarly processing as in Comparative Example 5, except for using, 2.3 g of cross-linked polyacrylic acid obtained by polymerization under containing of 0.14% by mol of diethylene glycol diallyl ether in the polymer, instead of 2.3 g of the straight chain polyacrylic acid. Next, slurry for producing an electrode was prepared similarly as in Comparative Example 3, except for using said solution, instead of the aqueous solution of 1% by weight of polyacrylic acid, to produce the electrode for a lithium cell. The obtained electrode was referred to as the $CLPAH_{0.2}Na_{0.8}$-07 electrode.

Example 11 Producing of Electrode for Lithium Cell Using Neutralized and Cross-Linked PAH ($CLPAH_{0.2}Na_{0.8}$-00) as Binder An aqueous solution of 1% by weight of neutralized polyacrylic acid ($CLPAHH_{0.2}Na_{0.8}$-00) was obtained by similarly processing as in Comparative Example 5, except for using, 2.3 g of cross-linked polyacrylic acid obtained by polymerization under containing of 0.7% by mol of diethylene glycol diallyl ether in the polymer, instead of 2.3 g of the straight chain polyacrylic acid. Next, slurry for producing an electrode was prepared similarly as in Comparative Example 3, except for using said solution, instead of the aqueous solution of 1% by weight of polyacrylic acid, to produce the electrode for a lithium cell. The obtained electrode was referred to as the $CLPAH_{0.2}Na_{0.8}$-00 electrode.

Example 12 Producing of an Electrode for Lithium Cell Using Neutralized and Cross-Linked PAH ($CLPAH_{0.2}Na_{0.8}$-11) as Binder An aqueous solution of 1% by weight of neutralized polyacrylic acid ($CLPAHH_{0.2}Na_{0.8}$-11) was obtained by similarly processing as in Comparative Example 5, except for using, 2.3 g of cross-linked polyacrylic acid obtained by polymerization under containing of 0.2% by mol of diethylene glycol diallyl ether in the polymer, instead of 2.3 g of the straight chain polyacrylic acid. Next, slurry for producing an electrode was prepared similarly as in Comparative Example 3, except for using said solution, instead of the aqueous solution of 1% by weight of polyacrylic acid, to produce the electrode for a lithium cell. The obtained electrode was referred to as the $CLPAH_{0.2}Na_{0.8}$-11 electrode.

Example 13 Producing of an Electrode for Lithium Cell Using Neutralized and Cross-Linked PAH ($CLPAH_{0.2}Na_{0.8}$-14) as Binder An aqueous solution of 1% by weight of neutralized polyacrylic acid ($CLPAHH_{0.2}Na_{0.8}$-14) was obtained by similarly processing as in Comparative Example 5, except for using, 2.3 g of cross-linked polyacrylic acid obtained by polymerization under containing of 0.45% by mol of diethylene glycol diallyl ether in the polymer, instead of 2.3 g of the straight chain polyacrylic acid. Next, slurry for producing an electrode was prepared similarly as in Comparative Example 3, except for using said solution, instead of the aqueous solution of 1% by weight of polyacrylic acid, to produce the electrode for a lithium cell. The obtained electrode was referred to as the $CLPAH_{0.2}Na_{0.8}$-14 electrode.

Experiment Example 5 Charge-Discharge Test Using Various Electrodes

A constant current charge-discharge test was performed similarly as in Experiment Example 3, except for using the $CLPAH_{0.2}Na_{0.8}$-01 electrode, the $CLPAH_{0.2}Na_{0.8}$-02 electrode, the $CLPAH_{0.2}Na_{0.8}$-03 electrode, and the $CLPAH_{0.2}Na_{0.8}$-07 electrode, as electrodes.

Figure 7:
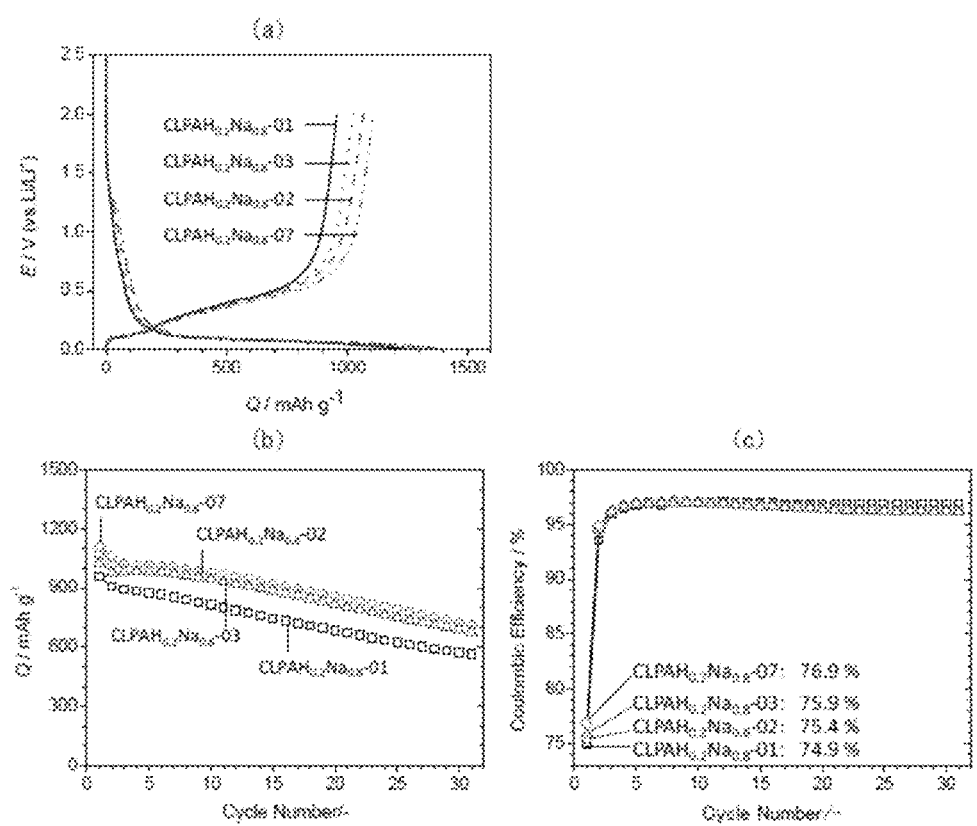
FIG. 7 represents (a) result of the initial charge-discharge, (b) change of discharge capacity by charge-discharge cycle, and (c) change of coulombic efficiency by charge-discharge cycle by various electrodes in Experiment Example 5.

Result of the initial charge-discharge, change of discharge capacity by charge-discharge cycle, and change of coulombic efficiency by charge-discharge cycle by each electrode are shown in FIG. 7 (a) to (c), respectively [(a): result of the initial charge-discharge, (b): change of discharge capacity, (c): change of coulombic efficiency].

From the results of FIG. 7, it was found that the initial capacity showed a value near about 1000 mAh/g, regardless of cross-linking degree, however, capacity retention of all electrodes increased significantly, by performing neutralization. It was found that, although there was no significant change observed accompanying with change of cross-linking degree, capacity retention is better in the $CLPAH_{0.2}Na_{0.8}$-02 electrode, the $CLPAH_{0.2}Na_{0.8}$-03 electrode, and the $CLPAH_{0.2}Na_{0.8}$-07 electrode, which are the cross-linked-type PAH electrodes, as compared with the not cross-linked-type PAH electrode (CLPAH-01). In addition, the $CLPAH_{0.2}Na_{0.8}$-07 electrode showed the highest reversible capacity in the first cycle. The $CLPAH_{0.2}Na_{0.8}$-02 electrode and the $CLPAH_{0.2}Na_{0.8}$-03 electrode showed very similar behavior.

As for the initial coulombic efficiency, the binder having the higher cross-linking degree showed the higher value, although difference was small, and any of the cross-linked-type PAH electrodes showed higher value by about 5%, as compared with the $CLPAH_{0.2}Na_{0.8}$-01 electrode. In particular, the $CLPAH_{0.2}Na_{0.8}$-07 electrode also showed the highest initial coulombic efficiency. In addition, as for the $2^{nd}$ time and the subsequent cycle, the $CLPAH_{0.2}Na_{0.8}$-02 electrode, and the 03 electrode showed a little faster rising, as compared with the CLPAH-01 electrode without cross-linking.

From these results, it can be said that means of neutralization, cross-linking or the like of a polymer are effective to improve electrochemical characteristics of the Si-based electrode. In particular, it was found that the CLPAH$_{0.2}$Na$_{0.8}$-07 showed superior effect as the binder.

Experiment Example 6 Charge-Discharge Test Using Various Electrodes

A constant current charge-discharge test was performed similarly as in Experiment Example 3, except for using, as the electrode, the AldrichH$_{0.2}$Na$_{0.8}$ electrode, the CLPAH$_{0.2}$Na$_{0.8}$-11 electrode, the CLPAH$_{0.2}$Na$_{0.8}$-14 electrode, the CLPAH$_{0.2}$Na$_{0.8}$-00 electrode, or the Carbopol H$_{0.2}$Na$_{0.8}$ electrode.

As for result of the initial charge-discharge, result of the 10$^{th}$ time charge-discharge, and result of the 30$^{th}$ time charge-discharge, for each electrode, charge-discharge capacity, coulombic efficiency and retention ratio thereof are shown in the following Table 2. In addition, results for the CLPAH$_{0.2}$Na$_{0.8}$-01 electrode, the CLPAH$_{0.2}$Na$_{0.8}$-02 electrode, the CLPAH$_{0.2}$Na$_{0.8}$-03 electrode and the CLPAH$_{0.2}$Na$_{0.8}$-07 electrode (results of Experiment Example 5) are also shown together in Table 2.

observed somewhat decrease in coulombic efficiency, it was found that charge-discharge capacity and retention ratio are enhanced.

In addition, as for the initial coulombic efficiency, the neutralized and cross-linked-type PAH electrodes (the CLPAH$_{0.2}$Na$_{0.8}$-02 electrode, -03 electrode, -07 electrode, -11 electrode, -14 electrode and -00 electrode) showed higher value by 5% or more, as compared with the neutralized AldrichH$_{0.2}$Na$_{0.8}$ electrode or the neutralized Carbopol electrode.

In addition, it was found that discharge capacity and retention ratio at the 10$^{th}$ and the 30$^{th}$ cycle are largely enhanced in many of the cross-linked-type PAH electrodes (the CLPAH$_{0.2}$Na$_{0.8}$-02 electrode, -03 electrode, -07 electrode, -11 electrode, and -14 electrode), as compared with the not cross-linked-type PAH electrode (CLPAH-01), and the electrode using Carbopol. In particular, the CLPAH$_{0.2}$Na$_{0.8}$-07 electrode and the CLPAH$_{0.2}$Na$_{0.8}$-11 electrode showed a discharge capacity at the 30$^{th}$ cycle of 800 mAh/g or higher, a retention ratio of 70% or higher, and the highest capacity retention. On the other hand, the CLPAH$_{0.2}$Na$_{0.8}$-14 electrode and the CLPAH$_{0.2}$Na$_{0.8}$-00 electrode, which used a large quantity of a cross-linking agent, had lower discharge capacity and retention ratio, as compared with the CLPAH$_{0.2}$Na$_{0.8}$-07 electrode and the

TABLE 2

| | Type | Amount of cross-linking agent mol % | Charging capacity (mAh/g) | Discharging capacity (mAh/g) | coulombic efficiency % | Retention rate % |
|---|---|---|---|---|---|---|
| | | | Initial charge-discharge | | | |
| AldrichH0.2Na0.8 | straight chain | 0 | 1442 | 971 | 67.3 | — |
| CLPAH0.2Na0.8-01 | straight chain | 0 | 1282 | 960 | 74.9 | — |
| CLPAH0.2Na0.8-02 | cross-linked | 0.007 | 1416 | 1068 | 75.4 | — |
| CLPAH0.2Na0.8-03 | cross-linked | 0.07 | 1351 | 1025 | 75.9 | — |
| CLPAH0.2Na0.8-07 | cross-linked | 0.14 | 1446 | 1112 | 76.9 | — |
| CLPAH0.2Na0.8-11 | cross-linked | 0.2 | 1542 | 1177 | 76.3 | — |
| CLPAH0.2Na0.8-14 | cross-linked | 0.45 | 1535 | 1145 | 74.6 | — |
| CLPAH0.2Na0.8-00 | cross-linked | 0.7 | 1387 | 1045 | 75.3 | — |
| Carbopol ® H0.2Na0.8 | cross-linked | — | 1551 | 1076 | 69.4 | — |
| | | | 10$^{th}$ time charge-discharge | | | |
| AldrichH0.2Na0.8 | straight chain | 0 | 869 | 837 | 96.3 | 86.2 |
| CLPAH0.2Na0.8-01 | straight chain | 0 | 840 | 815 | 97.0 | 84.9 |
| CLPAH0.2Na0.8-02 | cross-linked | 0.007 | 1007 | 977 | 97.1 | 91.5 |
| CLPAH0.2Na0.8-03 | cross-linked | 0.07 | 975 | 946 | 97.0 | 92.3 |
| CLPAH0.2Na0.8-07 | cross-linked | 0.14 | 1094 | 1063 | 97.2 | 95.7 |
| CLPAH0.2Na0.8-11 | cross-linked | 0.2 | 1165 | 1126 | 96.7 | 95.7 |
| CLPAH0.2Na0.8-14 | cross-linked | 0.45 | 1071 | 1039 | 97.0 | 90.7 |
| CLPAH0.2Na0.8-00 | cross-linked | 0.7 | 888 | 861 | 97.0 | 82.4 |
| Carbopol ® H0.2Na0.8 | cross-linked | — | 840 | 813 | 96.9 | 75.6 |
| | | | 30$^{th}$ time charge-discharge | | | |
| AldrichH0.2Na0.8 | straight chain | 0 | 654 | 630 | 96.4 | 64.9 |
| CLPAH0.2Na0.8-01 | straight chain | 0 | 594 | 575 | 96.8 | 59.9 |
| CLPAH0.2Na0.8-02 | cross-linked | 0.007 | 751 | 724 | 96.3 | 67.8 |
| CLPAH0.2Na0.8-03 | cross-linked | 0.07 | 715 | 688 | 96.3 | 67.1 |
| CLPAH0.2Na0.8-07 | cross-linked | 0.14 | 849 | 816 | 96.2 | 73.4 |
| CLPAH0.2Na0.8-11 | cross-linked | 0.2 | 891 | 851 | 95.5 | 72.3 |
| CLPAH0.2Na0.8-14 | cross-linked | 0.45 | 824 | 792 | 96.2 | 69.2 |
| CLPAH0.2Na0.8-00 | cross-linked | 0.7 | 659 | 635 | 96.4 | 60.8 |
| Carbopol ® H0.2Na0.8 | cross-linked | — | 586 | 567 | 96.7 | 52.6 |

From the results of Table 2, it was found that by using the neutralized and cross-linked polymer, the initial coulombic efficiency value is enhanced, as compared with the not neutralized and cross-linked polymer. In addition, also as for charge-discharge at the 10$^{th}$ cycle, all of charge-discharge capacity, coulombic efficiency and retention ratio thereof are enhanced, and as for the 30$^{th}$ time cycle, although there was CLPAH$_{0.2}$Na$_{0.8}$-11 electrode, and thus it was found that the more increased amount of the cross-linking agent does not necessarily enhances these values, and the case where an amount of the cross-linking agent of 0.1 to 0.3% by mol is most suitable for the binder.

From these results, it was found that neutralization and cross-linking of a polymer, in designing a binder, are effective to enhance electrochemical characteristics of the Si-based electrode. Among them, it was found that $CLPAH_{0.2}Na_{0.8}$-07 and $CLPAH_{0.2}Na_{0.8}$-11 show superior effect as the binder.

Experiment Example 7 180 Degree Peeling Strength Test

On $CLPAH_{0.2}Na_{0.8}$-07 and $CLPAH_{0.2}Na_{0.8}$-08, peeling strength was measured.

Firstly, an aqueous solution of polyacrylic acid containing 61 mg (solid content) of $CLPAH_{0.2}$ $Na_{0.8}$-07 or $CLPAH_{0.2}Na_{0.8}$-08, and 450 mg of natural graphite (CGB-20) were mixed to prepare slurry for producing two kinds of electrodes for measuring peeling strength. Each of the obtained slurry was uniformly coated on a copper foil with a thickness of 10 µm, so as to attain a film thickness after drying of 100 µm, dried under vacuum at 130° C. for 2 hours, to prepare two kinds of electrodes for measurement of peeling strength.

A 180 degree peeling strength test was performed on the two kinds of electrodes (the electrode for measuring peeling strength of $CLPAH_{0.2}Na_{0.8}$-07, and the electrode for measuring peeling strength of $CLPAH_{0.2}Na_{0.8}$-08) in accordance with JIS K 6854-2. Specifically, by fixing a graphite side and peeling a copper foil, using a rigid adherent for the graphite side, and a flexible adherent for the copper foil side, a 180 degree peeling test was performed, in the following conditions.

Test piece: SUS (stainless steel) plate+double sided pressure sensitive adhesive tape+graphite layer/20 µm copper foil Peeling width: 25 mm Test condition: test speed; 100 mm/min, test temperature; 23° C.

Testing machine: Universal material testing machine, 5582-type, produced by Instron Japan Co., Ltd.

As the result, peeling strength of $CLPAH_{0.2}Na_{0.8}$-07 was 18.2 gf/mm, and peeling strength of $CLPAH_{0.2}Na_{0.8}$-08 was 15.7 gf/mm. In consideration of the result that peeling strength obtained by using a known functional group-containing vinylidene fluoride polymer is 3.8 gf/mm (JP Pat No. 4851092), it was found that the binder of the present invention shows binding strength equivalent to or higher than the above, and in particular, the neutralized binder can strongly bind to the electrode.

Example 14 Producing of Cell Using Electrolytic Solution Added with or not Added with FEC A coin-type cell was assembled in a glove box filled with argon. Specifically, a coin-type cell (without 2% FEC) was assembled using the $CLPAH_{0.2}Na_{0.8}$-03 electrode and a lithium foil electrode as an electrode, using a solution of ethylene carbonate (EC)/dimethyl carbonate (DMC) (1:1 in volume ratio) of 1 mol dm$^{-3}$ LiPF$_6$ as an electrolytic solution, and using a micro-porous membrane made of a polyolefin as a separator.

In addition, a coin-type cell (with 2% FEC) of an FEC added electrolytic solution was also assembled similarly, except for using a mixed solution of ethylene carbonate (EC)/dimethyl carbonate (DMC) (1:1 in volume ratio) of 1 mol dm$^{-3}$ LiPF$_6$ and a fluoroethylene carbonate solution in 98:2, as an electrolytic solution.

Experiment Example 8 Charge-Discharge Test of Cell Using Electrolytic Solution Added with or not Added with FEC Using the coin-type cell (without 2% FEC) and the coin-type cell (with 2% FEC), a charge-discharge test was performed similarly as in Experiment Example 3. It should be noted that as for the coin-type cell (with 2% FEC), result of a charge-discharge test, in the case where a charging time was 9 hours, is shown together.

Figure 8:
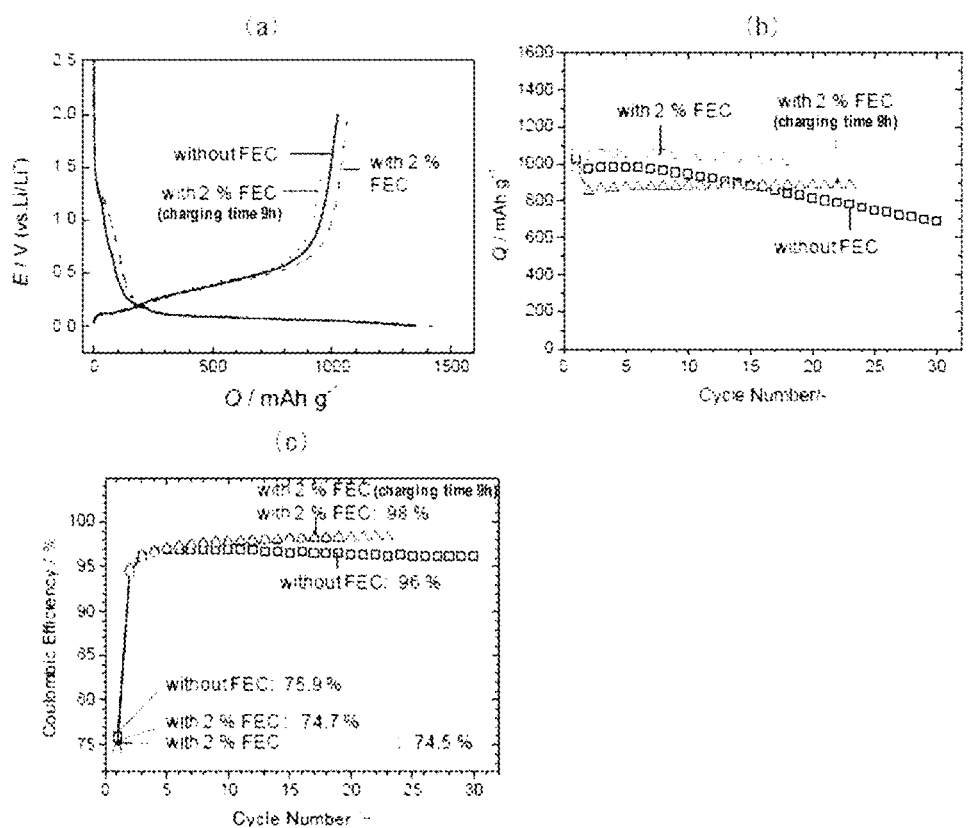
FIG. 8 represents (a) result of the initial charge-discharge, (b) change of discharge capacity by charge-discharge cycle, and (c) change of coulombic efficiency by charge-discharge cycle by a cell using an electrolytic solution added with or not added with FEC in Experiment Example 8.

Results thereof are shown in FIG. 8. FIG. 8, show (a) result of the initial charge-discharge, (b) change of discharge capacity by charge-discharge cycle, and change of coulombic efficiency by charge-discharge cycle, respectively.

From the results of FIG. 8, it was found that capacity retention rate and coulombic efficiency during cycle are enhanced in the coin-type cell (with 2% FEC), although about 20 cycles, as compared with the coin-type cell (without 2% FEC).

Experiment Example 9 Dispersion Property Coating Property of Various Slurry, as Well as Surface State of the Electrodes Slurry and the electrodes were observed with an optical microscope to examine influence of cross-linking of the binder on disperon property or coating property of slurry, and a surface state of the electrodes.

(1) Photographing of Slurry with an Optical Microscope

Firstly, each slurry of CLPAH-01, $CLPAH_{0.2}Na_{0.8}$-01, CLPAH-02, $CLPAH_{0.2}Na_{0.8}$-02, CLPAH-03, and $CLPAH_{0.2}Na_{0.8}$-03, obtained in producing various electrodes was diluted to 15 times with ion exchanged water. After that, each of the 50 µL of the obtained solution was dropped onto a preparate and covered with cover glass for observation with transmission light under a magnification of 50 times. It should be noted that as an apparatus for observation, Moticam 2300/2500 (produced by Shimadzu Rika Corp.) was used.

Figure 9:
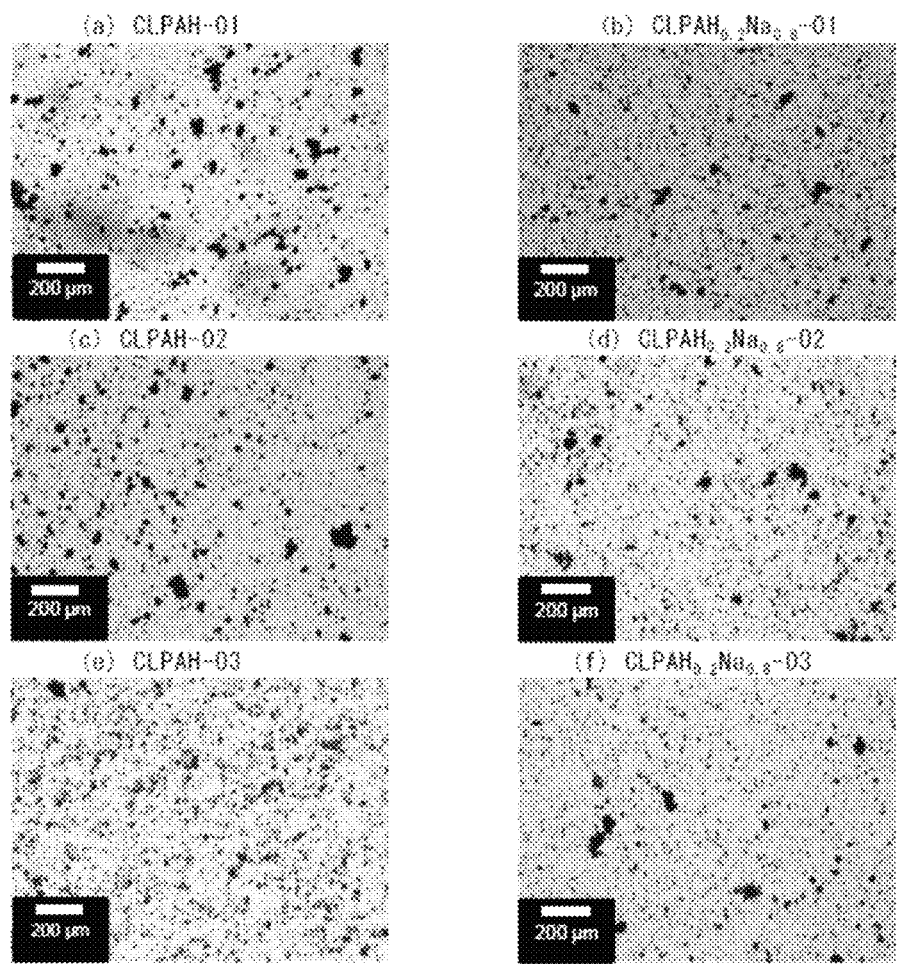
FIG. 9 represents (a) observation result of slurry of CLPAH-01, (b) observation result of slurry of CLPAH$_{0.2}$Na$_{0.8}$-01, (c) observation result of slurry of CLPAH-02, (d) observation result of slurry of CLPAH$_{0.2}$Na$_{0.8}$-02, (e) observation result of slurry of CLPAH-03, and (f) observation result of slurry of CLPAH$_{0.2}$Na$_{0.8}$-03 in Experiment Example 9 (1).

Results thereof are shown in FIG. 9. FIGS. 9 (a), (b), (c), (d), (e) and (f) show observation result of slurry of CLPAH-01, observation result of slurry of $CLPAH_{0.2}Na_{0.8}$-01, observation result of slurry of CLPAH-02, observation result of slurry of $CLPAH_{0.2}Na_{0.8}$-02, observation result of slurry of CLPAH-03, and observation result of slurry of $CLPAH_{0.2}Na_{0.8}$-03, respectively.

From the results of FIG. 9, in not cross-linked CLPAH-01 and cross-linked-type CLPAH-02, many aggregates of an active material with a size of several tens µm were observed, showing dispersion property in nearly the same degree. On the other hand, it was found that cross-linked-type CLPAH-03 had a little better dispersion property of slurry, as compared with CLPAH-01 and CLPAH-02.

In addition, in the $PAH_{0.2}Na_{0.8}$ type (neutralized type), there was observed little change of dispersion property of slurry by change of cross-linking degree, and any slurry showed better dispersion property, as compared with the PAH type.

(2) Photographing of the Electrode

Figure 10:
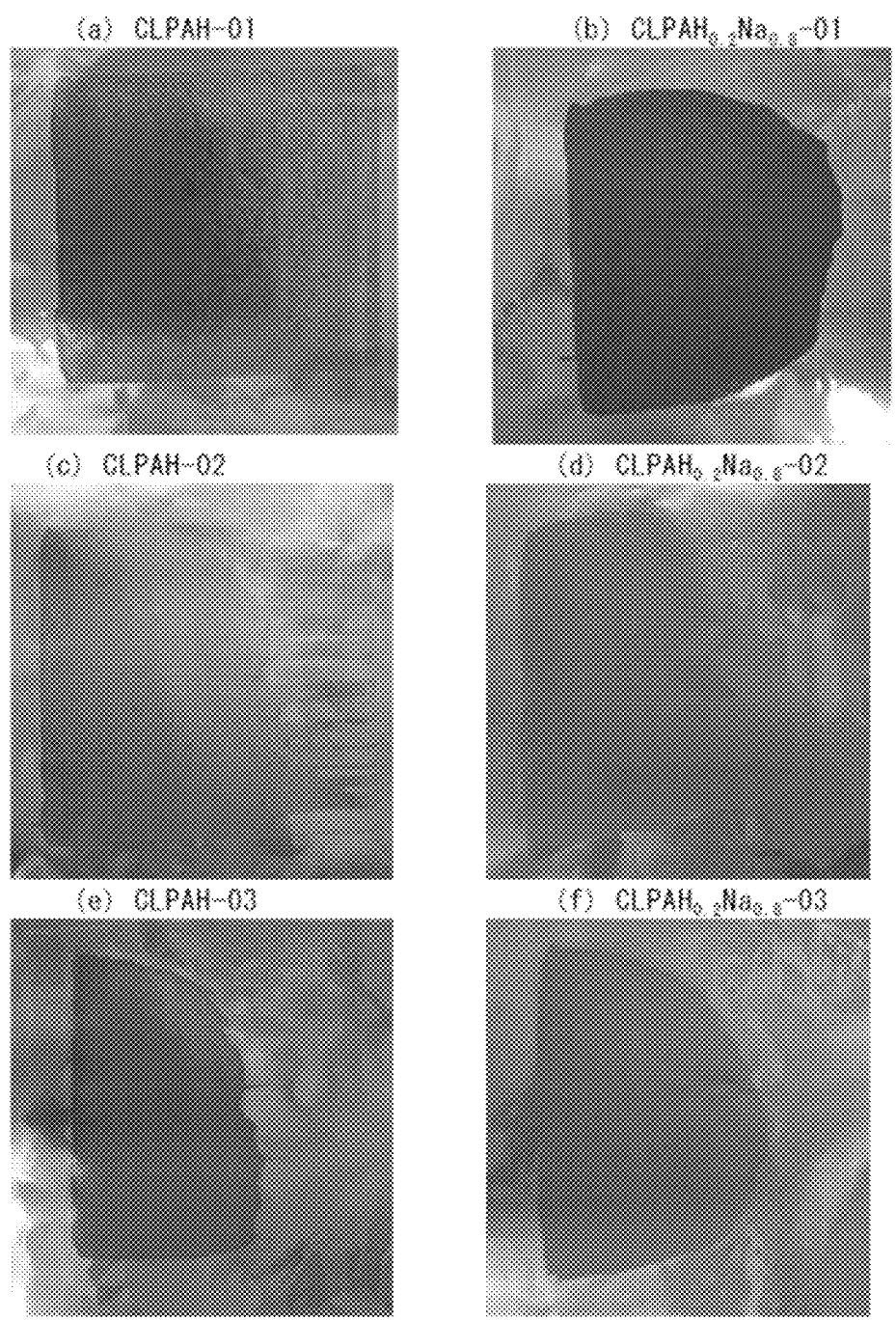
FIG. 10 represents (a) observation result of slurry of CLPAH-01, (b) observation result of slurry of CLPAH$_{0.2}$Na$_{0.8}$-01, (c) observation result of slurry of CLPAH-02, (d) observation result of slurry of CLPAH$_{0.2}$Na$_{0.8}$-02, (e) observation result of slurry of CLPAH-03, and (f) observation result of slurry of CLPAH$_{0.2}$Na$_{0.8}$-03 in Experiment Example 9 (2).

In addition, after coating six kinds of slurry used in (1) onto a copper foil, and the dried one was subjected to photographing. The obtained results are shown in FIG. 10. FIGS. 10 (a), (b), (c), (d), (e) and (f) show photographing result of slurry of CLPAH-01, photographing result of slurry of $CLPAH_{0.2}Na_{0.8}$-01, photographing result of slurry of CLPAH-02, photographing result of slurry of $CLPAH_{0.2}Na_{0.8}$-02, photographing result of slurry of CLPAH-03, and photographing result of slurry of CLPAH$_{0.2}$Na$_{0.8}$-03, respectively.

From the results of FIG. 10, it was found that in the PAH type, not cross-linked CLPAH-01 provided very uneven coating. It was found that in CLPAH-02 and -03, with increase in cross-linking degree, a coating state is improved little by little.

In the PAH$_{0.2}$Na$_{0.8}$ type, cross-linked CLPAH$_{0.2}$Na$_{0.8}$-02, and 03 showed a more uniformly coated state, as compared with not cross-linked CLPAH$_{0.2}$Na$_{0.8}$-01. The CLPAH$_{0.2}$Na$_{0.8}$ type showed more uniform coating with any binder, as compared with the PAH type.

(3) Photographing of the Electrode with an Optical Microscope

Figure 11:
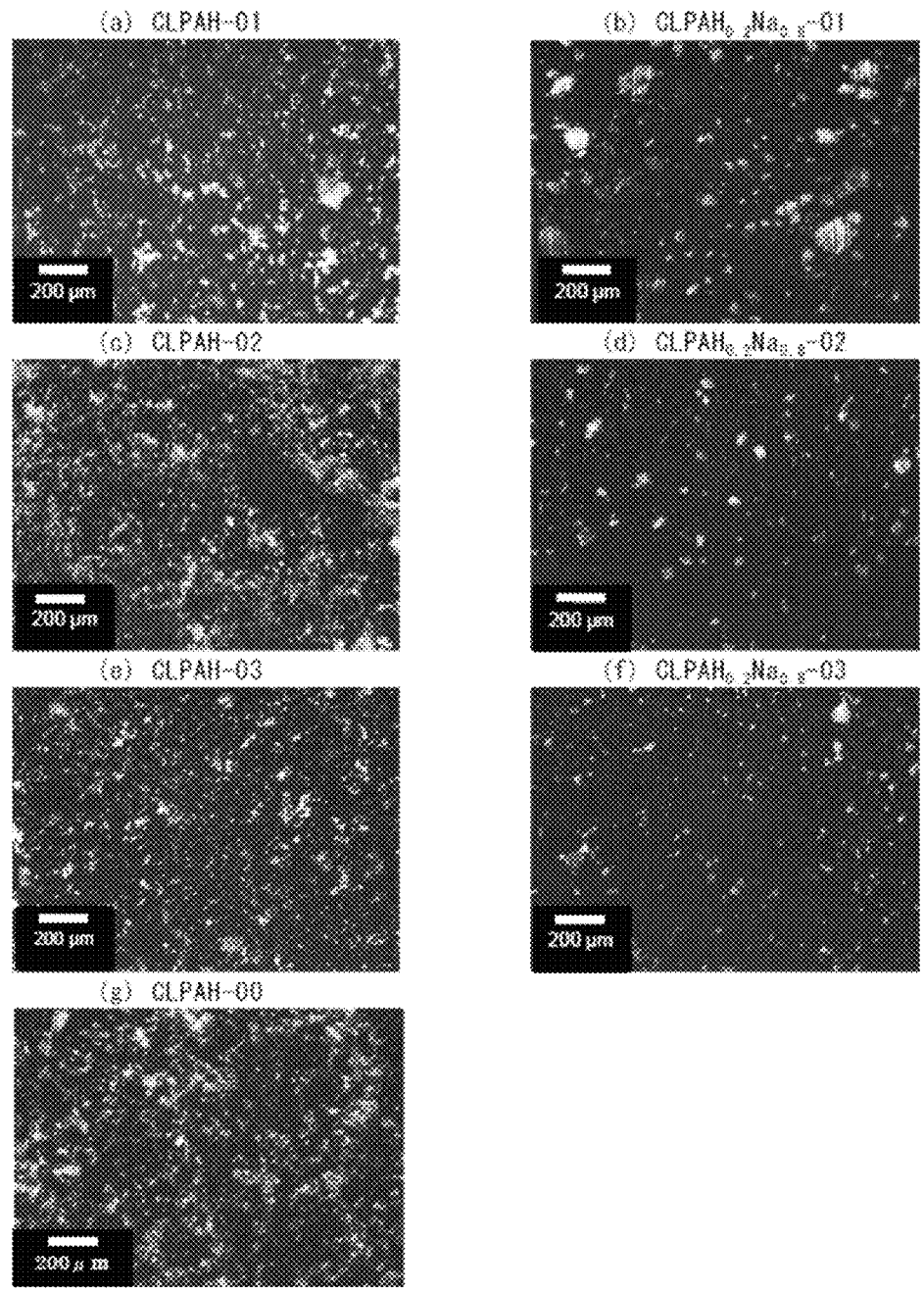
FIG. 11 represents (a) observation result of slurry of CLPAH-01, (b) observation result of slurry of CLPAH$_{0.2}$Na$_{0.8}$-01, (c) observation result of slurry of CLPAH-02, (d) observation result of slurry of CLPAH$_{0.2}$Na$_{0.8}$-02, (e) observation result of slurry of CLPAH-03, (f) observation result of slurry of CLPAH$_{0.2}$Na$_{0.8}$-03 and (g) observation result of slurry of CLPAH-00 in Experiment Example 9 (3).

As for various the electrodes (the CLPAH-01 electrode, the CLPAH$_{0.2}$Na$_{0.8}$-01 electrode, the CLPAH-02 electrode, the CLPAH$_{0.2}$Na$_{0.8}$-02 electrode, the CLPAH-03 electrode, the CLPAH$_{0.2}$Na$_{0.8}$-03 electrode and the CLPAH-00 electrode), surfaces thereof were observed using reflection light under a magnification of 50 times. The obtained results are shown in FIG. 11. FIGS. 11 (a), (b), (c), (d), (e), (f) and (g) show photographing result of the CLPAH-01 electrode, photographing result of the CLPAH$_{0.2}$Na$_{0.8}$-01 electrode, photographing result of the CLPAH-02 electrode, photographing result of the CLPAH$_{0.2}$Na$_{0.8}$-02 electrode, photographing result of the CLPAH-03 electrode, photographing result of the CLPAH$_{0.2}$Na$_{0.8}$-03 electrode, and photographing result of the CLPAH-00 electrode, respectively.

From the results of FIG. 11, in the not cross-linked PAH type, there were many portions where a copper foil was observed, and thus was a rough and not uniform surface state. By cross linking a polymer, the surface form is improved and the CLPAH-03 electrode showed a relatively good surface form. However, the CLPAH-00 electrode, having further increased cross-linking degree, showed a not uniform surface form. This is considered, from the results of FIG. 10, that fluidity of the binder (viscosity) gives influence on an electrode form.

In the PAH$_{0.2}$Na$_{0.8}$ type, the cross-linked CLPAH$_{0.2}$Na$_{0.8}$-02, and 03 electrodes had a more uniform surface state, as compared with the not cross-linked CLPAH$_{0.2}$Na$_{0.8}$-01 electrode. It should be noted that, as for the CarbopolH$_{0.2}$Na$_{0.8}$ electrode also, a photograph was taken using an optical microscope, and similarly as in the not cross-linked PAH type, there was a portion where a copper foil was observed, and thus was a not uniform surface form.

Accordingly, in consideration of other results together, it was considered that this uniform surface state and enhancement of dispersion property of slurry contribute to improvement of electrode characteristics.

(4) Observation of Electrode Cross-Section

As for various electrodes (the CLPAH-01 electrode, the CLPAH$_{0.2}$Na$_{0.8}$-01 electrode, the CLPAH-02 electrode, the CLPAH$_{0.2}$Na$_{0.8}$-02 electrode, the CLPAH-03 electrode, the CLPAH$_{0.2}$Na$_{0.8}$-03 electrode, and the CLPAH-00 electrode), after coating the electrode surface with carbon, using a composite beam fabrication observation apparatus (JIB-4500, produced by JEOL Ltd.), it was processed using FIB (ion source: gallium liquid metal ion source, acceleration voltage: 30 kV). The obtained electrode surface was observed using SEM.

Figure 12:
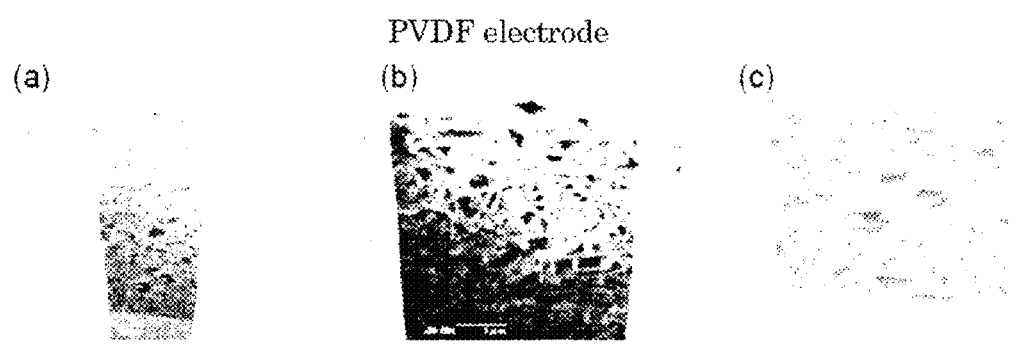
FIG. 12 represents observation result of an electrode cross-section of a PVDF electrode in Experiment Example 9 (4).
Figure 13:
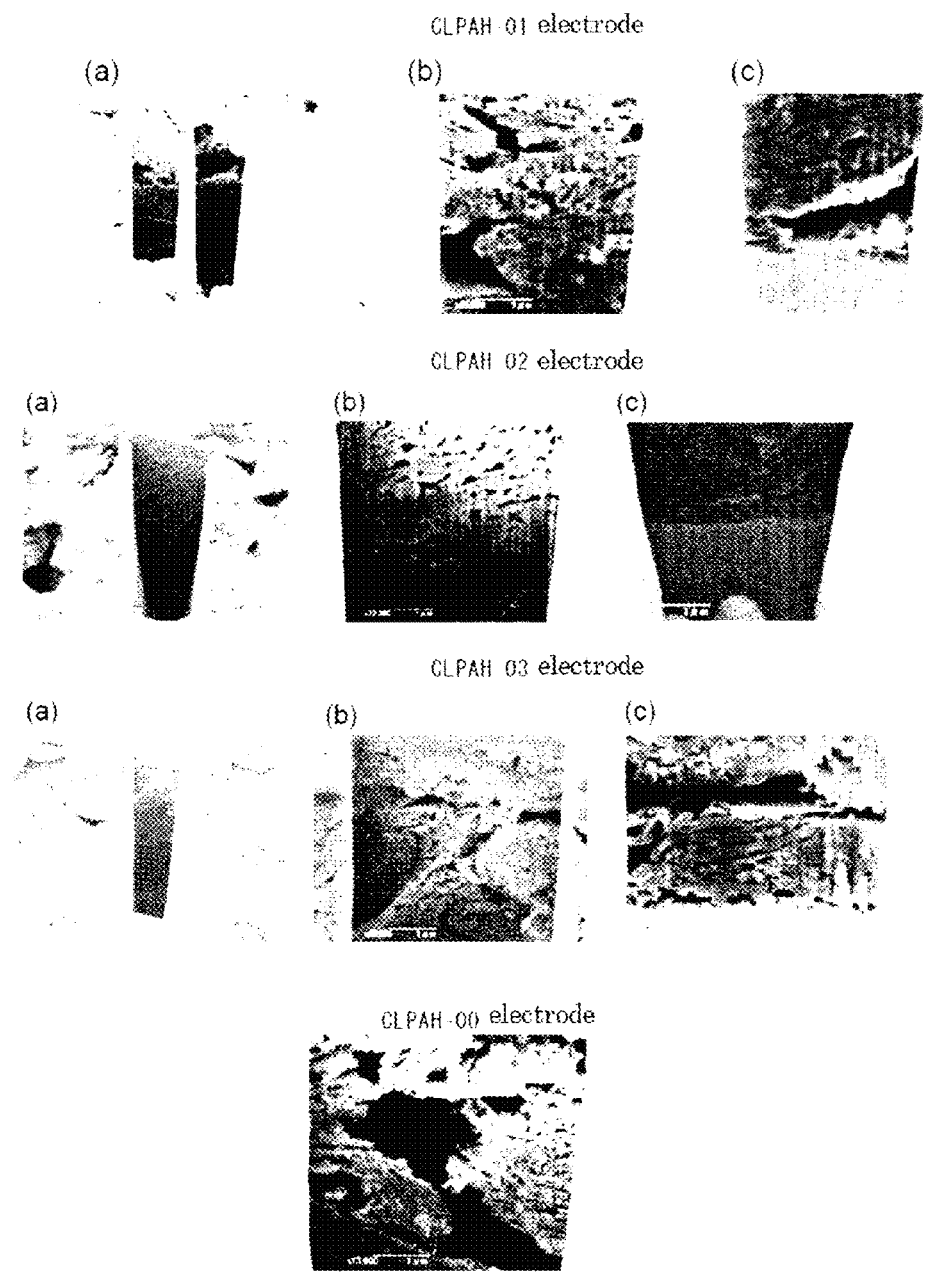
FIG. 13 represents observation result of electrode cross-sections of the CLPAH-01 electrode, the CLPAH-02 electrode, the CLPAH-03 electrode, and the CLPAH-00 electrode, in Experiment Example 9 (4).
Figure 14:
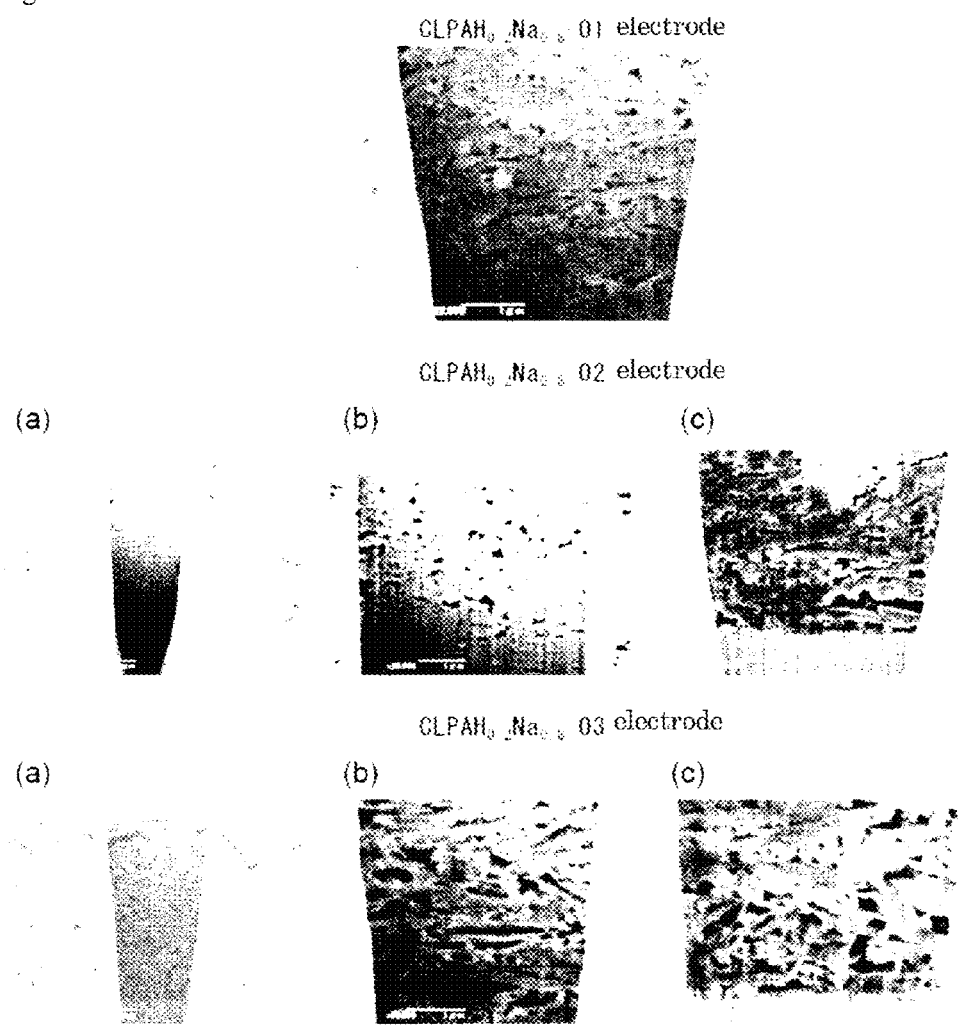
FIG. 14 represents observation result of electrode cross-sections of the $CLPAH_{0.2}Na_{0.8}$-01 electrode, the $CLPAH_{0.2}Na_{0.8}$-02 electrode and the $CLPAH_{0.2}Na_{0.8}$-03 electrode in Experiment Example 9 (4).

As for observation result, result on the CLPA-type electrode is shown in FIG. 13, and result on the H$_{0.2}$Na$_{0.8}$-type electrode is shown in FIG. 14. It should be noted that result on the PVDF electrode is shown in FIG. 12 as comparison. In FIGS. 12 to 14, (a), (b) and (c) represent observation result of electrode thickness, observation result of an inner structure of the electrode, and observation result of interface with the current collector (binding of the current collector and a mixture), respectively. For the observation, magnification was arbitrary set within a range of 5000 to 9500 times in the case of (a), 20000 to 25000 times in the case of (b), and 22000 to 35000 times in the case of (c).

In the PVDF electrode of FIG. 12, it was found that graphite is commingled disorderly. In addition, it showed a structure having many gaps. On the other hand, the CLPA electrode had a closer electrode structure, as compared with PVDF.

In the PAH type, it was found that, although many large voids with a size of several μm were observed in the CLPAH-01 electrode having no cross-linking, in the CLPAH-03 electrode having increased cross-linking degree, such large voids decrease, and uniformity of the electrode enhances. In addition, in the CLPAH-00 electrode having further increased cross-linking degree, large voids were observed again inside the electrode.

In the PAH$_{0.2}$Na$_{0.8}$ type, large cracks were decreased in any cross-linking degree, as compared with PAH. In addition, the PAH$_{0.2}$Na$_{0.8}$ electrode of CLPAH-03 had a porous structure. Such a porous structure has been known to mitigate influence of volume change in the silicon-based electrode, and is effective to enhance cycle characteristics. Accordingly, reason for the PAH$_{0.2}$Na$_{0.8}$-03 electrode to show high cycle characteristics is considered to be related to such a uniform and porous electrode structure.

Experiment Example 10 Measurement of Fluidity of Binder

Fluidity of the binders used in various electrodes was measured.

Specifically, flow curve measurement was performed using HAAKE MARS III (produced by Thermo Scientific Co., Ltd.) to measure fluidity of each aqueous solution of 1% by weight of polyacrylic acid of CLPAH-01, CLPAH-02, CLPAH-03, CLPAH$_{0.2}$Na$_{0.8}$-01, CLPAH$_{0.2}$Na$_{0.8}$-02, and CLPAH$_{0.2}$Na$_{0.8}$-03. That is, after coating an aqueous solution of 1% by weight of polyacrylic acid on to a sample stand with a diameter of 35 mm, so as to attain each uniform thickness, a sensor was descended so as to attain a distance of 0.3 mm between the sample stand and the sensor. During the measurement, temperature was maintained at 20° C., and range of sheer rate at 0.01 to 1833 s$^{-1}$, to measure in 100 steps.

Figure 15:
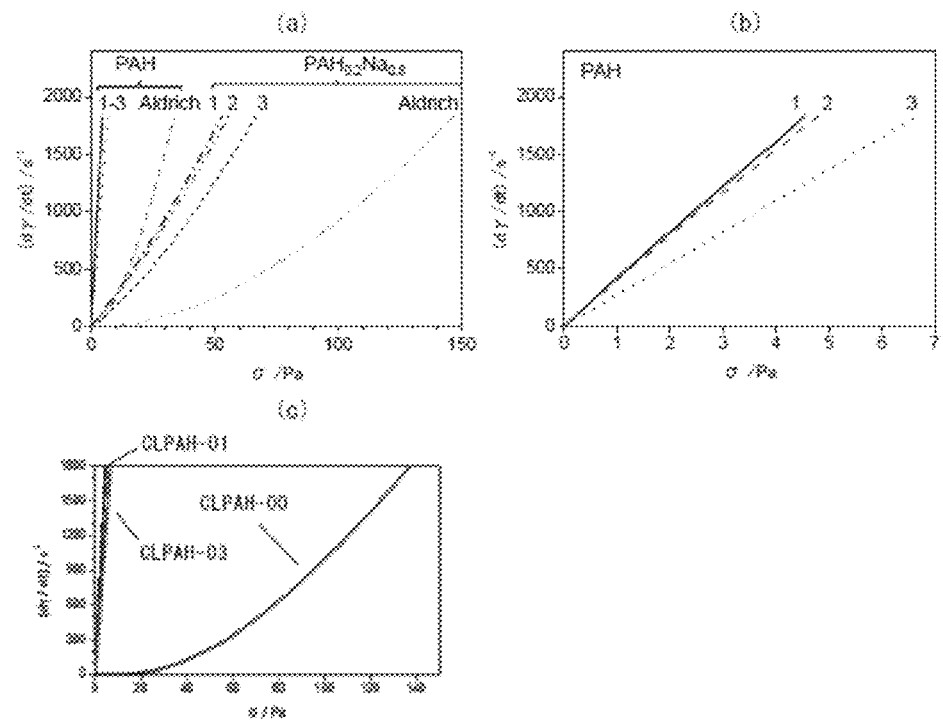
FIG. 15 is graphs representing (a) measurement result of viscosity of each slurry of CLPAH-01, CLPAH-02, CLPAH-03, $CLPAH_{0.2}Na_{0.8}$-01, $CLPAH_{0.2}Na_{0.8}$-02, and $CLPAH_{0.2}Na_{0.8}$-03, (b) measurement result of viscosity, under reduced scale, on CLPAH-01, CLPAH-02, and CLPAH-03 and (c) measurement result of viscosity of slurry on CLPAH-01, CLPAH-03, and CLPAH-00 in Experiment Example 10.

Results thereof are shown in FIG. 15. It should be noted that FIG. 15 (a) shows fluidity of each aqueous solution of polyacrylic acid of CLPAH-01, CLPAH-02, CLPAH-03, CLPAH$_{0.2}$Na$_{0.8}$-01, CLPAH$_{0.2}$Na$_{0.8}$-02, and CLPAH$_{0.2}$Na$_{0.8}$-03. It should be noted that, as comparison, fluidity PAH of Aldrich with no cross-linking and having a molecular weight of 1,250,000, and PAH$_{0.2}$Na$_{0.8}$ of Aldrich was also shown. FIG. 15 (b) is the result shown by a magnified horizontal axis scale of FIG. 15 (a), as for CLPAH-01, CLPAH-02, and CLPAH-03. FIG. 15 (c) is the results showing fluidity of CLPAH-02, CLPAH-03 and CLPAH-00.

The horizontal axis of the graph in FIG. 15 is sheer stress and the vertical axis is sheer rate. The addition of sheer stress onto fluid incurs a certain relation between sheer rate and sheer stress. In this time, the one divided sheer stress by sheer rate is called viscosity. In FIG. 15, reciprocal number of the inclination is viscosity. It is understood that, in any of PAH and PAH$_{0.2}$Na$_{0.8}$, with increase in cross-linking degree, viscosity increases.

In CLPAH-01 to 03, there is proportional relationship between sheer stress and sheer rate, and viscosity is constant regardless of sheer rate. Such flow is called Newtonian flow, and water or low viscosity silicon oil and the like shows this type of flow. Reason for not a good coating state of the CLPA binder, as shown in FIG. 8, was considered that CLPA shows Newtonian flow.

A coating liquid usually has property that apparent viscosity decreases with increase in sheer rate, and this phenomenon is called thixotropy. This tendency is observed also in an aqueous starch solution or latex. PAH of Aldrich and $PAH_{0.2}Na_{0.8}$ of Aldrich, shown in FIG. 15 (a), increase the inclination of a graph accompanying with increase in sheer rate, that is, decrease in viscosity, and are thus thixotropic.

From FIG. 15 (c), it was found that not cross-linked CLPAH-01 showed low viscosity, and increase in viscosity was only a little, even in cross-linking degree of CLPAH-03, however, in CLPAH-00, having far increased amount of a cross-linking agent, viscosity increased largely. In addition, in CLPAH-00, it was found that fluidity changes from Newtonian flow to thixotropic flow.

Experiment Example 11 Viscosity Measurement of Various Polyacrylic Acids

From various polyacrylic acids ($AldrichH_{0.2}Na_{0.8}$, $CLPAH_{0.2}Na_{0.8}$-01, $CLPAH_{0.2}Na_{0.8}$-02, $CLPAH_{0.2}Na_{0.8}$-03, $CLPAH_{0.2}Na_{0.8}$-07, $CLPAH_{0.2}Na_{0.8}$-11, $CLPAH_{0.2}Na_{0.8}$-14, $CLPAH_{0.2}Na_{0.8}$-00, or Carbopol $H_{0.2}Na_{0.8}$), 1% by weight of polyacrylic acid slurry was prepared, to measure viscosity thereof at 20° C. using a B-type viscometer (88 L, produced by Tokyo Keiki Co., Ltd.). As rotation speed, values described in Table 3 were used in response to a kind of polyacrylic acid.

TABLE 3

| Type | | Amount of cross-linking agent mol % | Viscosity 0.6 rpm mPa·s | Viscosity 60 rpm mPa·s |
|---|---|---|---|---|
| AldrichH0.2Na0.8 | straight chain | 0 | — | 6,050 |
| CLPAH0.2Na0.8-01 | straight chain | 0 | — | 21 |
| CLPAH0.2Na0.8-02 | cross-linked | 0.007 | — | 44 |
| CLPAH0.2Na0.8-03 | cross-linked | 0.07 | — | 75 |
| CLPAH0.2Na0.8-07 | cross-linked | 0.14 | — | 272 |
| CLPAH0.2Na0.8-11 | cross-linked | 0.2 | — | 1,430 |
| CLPAH0.2Na0.8-14 | cross-linked | 0.45 | 367,000 | — |
| CLPAH0.2Na0.8-00 | cross-linked | 0.7 | 709,300 | — |
| Carbopol H0.2Na0.8 | cross-linked | — | 494,000 | — |

From the results of Table 3, it was found that with increase in amount of the cross-linking agent, viscosity increases. As for cross-linked polyacrylic acid, lower limit of viscosity thereof was 30 mPa·s at the least under a rotation speed of 60 rpm, and upper limit of viscosity thereof was 800000 mPa·s at least under a rotation speed of 0.6 rpm. In addition, from the result of Experiment Example 6 (Table 2), it was found that the $CLPAH_{0.2}Na_{0.8}$-07 electrode and the $CLPAH_{0.2}Na_{0.8}$-11 electrode are preferable as the binder, and in the $CLPAH_{0.2}Na_{0.8}$-00 electrode, effect thereof is a little weakened, therefore, preferable viscosity range thereof was considered to be from 30 mPa·s to 10000 mPa·s of the upper limit of the apparatus at 60 rpm, and from 10000 mPa·s of the lower limit of the apparatus to 450000 mPa·s at 0.6 rpm.

Experiment Example 12 Self-Discharge Test

Figure 16:
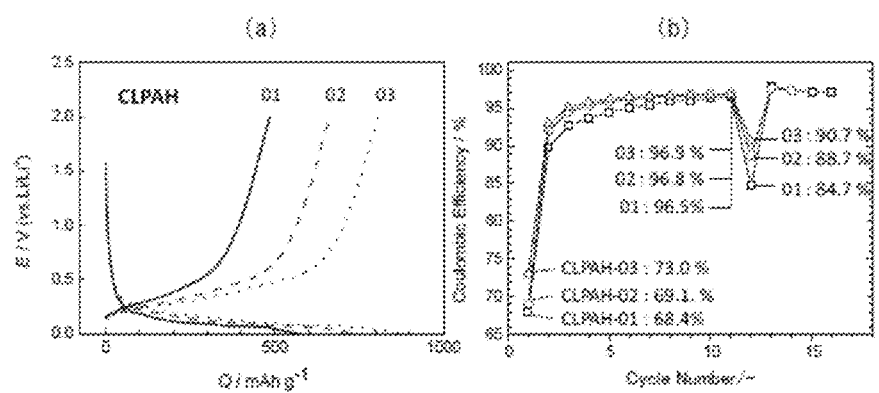
FIG. 16 represents results in which a self-discharge test was performed using the CLPAH-01 electrode, the CLPAH-02 electrode, and the CLPAH-03 electrode in Experiment Example 12.

Using the CLPAH-01 electrode, the CLPAH-02 electrode, and the CLPAH-03 electrode, a self-discharge test was performed. That is, after charging at the $12^{th}$ cycle, they were left to stand for 10 days in a fully charged state, and charging was performed again to perform a charge-discharge test at that time. Specifically, a constant current charge-discharge test was performed under the following condition. The obtained result is shown in FIG. 16. FIG. 16 (a) represents a charge-discharge curve at the $12^{th}$ cycle, and (b) represents change of coulombic efficiency by charge cycle number.

Figure 17:
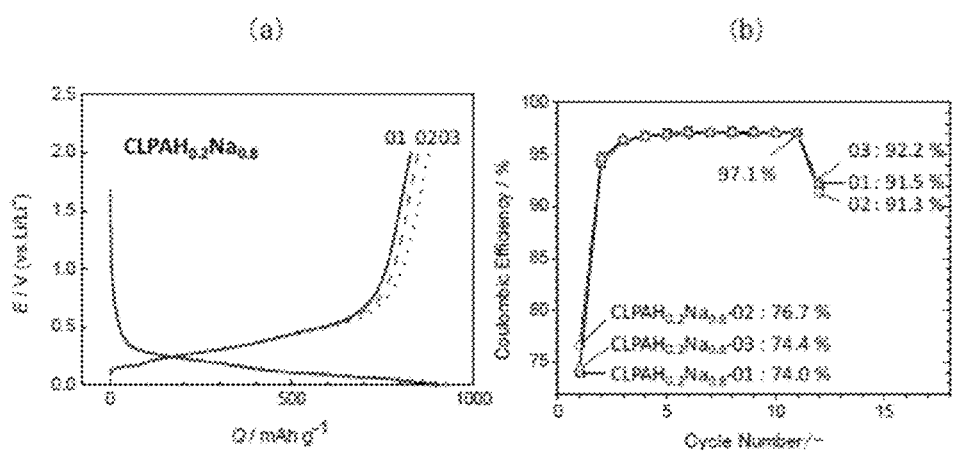
FIG. 17 represents results in which a self-discharge test was performed using the $CLPAH_{0.2}Na_{0.8}$-01 electrode, the $CLPAH_{0.2}Na_{0.8}$-02 electrode, and the $CLPAH_{0.2}Na_{0.8}$-03 electrode in Experiment Example 12.

In addition, using the $CLPAH_{0.2}Na_{0.8}$-01 electrode, the $CLPAH_{0.2}Na_{0.8}$-02 electrode, and the $CLPAH_{0.2}Na_{0.8}$-03 electrode as the electrode, a constant current charge-discharge test was performed under the following condition similarly. The result obtained is shown in FIG. 17. FIG. 17 (a) represents a charge-discharge curve at the $12^{th}$ cycle, and (b) represents change of coulombic efficiency by charge cycle number.

[Measurement Condition]
Working electrode: Si(<100 nm): SNO3:AB:binder=3:5:1:1 electrode
Counter electrode: Li foil
Electrolytic solution: EC/DMC (1:1 in volume ratio) solution containing 1 M $LiPF_6$
Constant current charge-discharge test
The first cycle (CC)
Potential range 2.0 to 0.0 V (vs. $Li/Li^+$)
Current density 50 mAh/g
The $2^{nd}$ and the subsequent cycle
Potential range 2.0 to 0.0 V (vs. $Li/Li^+$)
Current density 100 mAh/g
It should be noted that, after fully charging at the $12^{th}$ cycle, they were left to stand for 10 days, and then charge-discharge was performed for further 5 cycles (from the $13^{th}$ to the $17^{th}$ cycles).

From the results of FIG. 17, it was found that as for the PAH type, with increase in cross-linking degree, decrease in coulombic efficiency was suppressed. In addition, from this result, it was estimated that with increase in cross-linking degree, covering property to the active material of PAH enhanced. On the other hand, from the results of FIG. 16, it was found that as for the $PAH_{0.2}Na_{0.8}$-type (neutralized-type), there was not observed large difference of decrease in coulombic efficiency.

Example 15 Producing of Electrode for Lithium Cell Using Neutralized and Cross-Linked PAH (5μ Si-$CLPAH_{0.2}Na_{0.8}$-03) as Binder and Silicon with Size of 5 μm Slurry for producing an electrode was prepared similarly as in Example 9, except for using 0.3 g of silicon powder having a particle size of 5 μm, instead of 0.3 g of silicon powder with a particle size of less than 100 μm, to produce the electrode for a lithium cell (hereafter this electrode is abbreviated as the 5μ Si-$CLPAH_{0.2}Na_{0.8}$-03 electrode).

Experiment Example 13 Charge-Discharge Test of the 5 Si-$CLPAH_{0.2}Na_{0.8}$-03 Electrode A constant current charge-discharge test was performed under the following condition, except for using the 5μ Si-$CLPAH_{0.2}Na_{0.8}$-03 electrode obtained in Example 15, and changing potential range from 2.0 to 0.0 V to 1.0 to 0.0 V.

Figure 18:
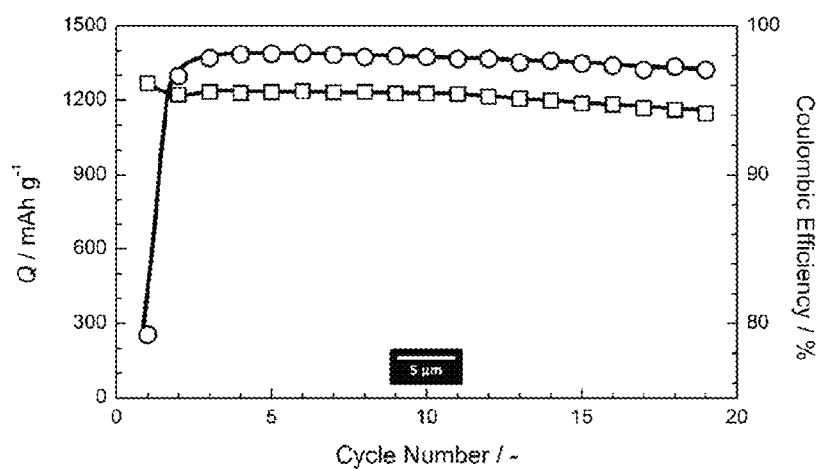
FIG. 18 represents results of a charge-discharge test using an electrode for a lithium cell using silicon with a size of 5 μm in Experiment Example 13.

Counter electrode: Li foil
Electrolytic solution: EC/DMC mixed solution (1:1 in volume ratio) containing 1 M LiPF$_6$
Measuring device: TOSCAT-3000U charge-discharge test equipment (produced by Toyo System Co., Ltd.)
Potential and current density
The first cycle
  Potential range 1.0 to 0.0 V (vs. Li/Li$^+$)
  Current density 50 mAh/g
The 2$^{nd}$ and the subsequent cycle
  Potential range 1.0 to 0.0 V (vs. Li/Li$^+$)
Current density 100 mAh/g Results thereof are shown in FIG. 18. In FIG. 18, -□- represents charge capacity (Q/mAh/g) and -○- represents coulombic efficiency, each representing change by charge cycle number.

From the results of FIG. 18, it was found that in the case of using silicon with a particle size of 5 μm, even after the 20$^{th}$ cycle, a high reversible capacity of about 1200 mAh/g can be maintained, as well as high coulombic efficiency was shown. That is, it was shown that CLPAH$_{0.2}$Na$_{0.8}$-03 was an effective binder not only to nano-size silicon but also to micro-size silicon.

EXPLANATION OF REFERENCE CODES

In FIGS. 3 to 5, PAH, PAH$_{9.5}$(PCD)$_{0.5}$, PAH$_9$(PCD)$_1$ and PAH$_{8.5}$(PCD)$_{1.5}$ represent result using the electrode obtained in Comparative Example 1, result using the electrode obtained in Example 1 (3) (PCD content: 0.5% by weight), result using the electrode obtained in Example 1 (3) (PCD content: 1.0% by weight), and result using the electrode obtained in Example 1 (3) (PCD content: 1.5% by weight), respectively. PVDF in FIG. 5 represents result using the electrode obtained in Comparative Example 2.

Example 16 Producing of an Electrode for Lithium Cell Using, as Binder, Cross-Linked PAH Produced by Using Various Cross-Linking Agents An aqueous solution of 1% by weight of neutralized polyacrylic acid was obtained by similarly experimenting as in Comparative Example 5, except for using, instead of 2.3 g of the straight chain polyacrylic acid, 2.3 g of 6 kinds of cross-linked polyacrylic acids obtained by cross-linking under containing of 0.14% by mol of any of the 6 kinds of cross-linking agents described in the following Table 4, in polyacrylic acid, instead of 2.3 g of straight chain polyacrylic acids. Next, slurry for producing an electrode was prepared similarly as in Comparative Example 3, except for using each solution, instead of the aqueous solution of 1% by weight of polyacrylic acid, to produce 6 kinds of electrodes for a lithium cell.

It should be noted that as for diethylene glycol diacrylate in the Table, the one synthesized in accordance with a method described in B. H. Kim, E. J. Jeong, G T. Hwang, N. Venkatesan, Synthesis (2001), 14, 2191-2202 was used. In addition, as for ethylene glycol diallyl ether and tetraethylene glycol diallyl ether, those synthesized in accordance with a method described in J. V. Crivello, S. K. Rajaraman, J. Polymer Science, Part A: Polymer Chemistry (1997), 35(8), 1593-1604 were used.

TABLE 4

| Cross-linking agent | Structural formula | Electrode Name |
|---|---|---|
| methylenebisacrylamide (produced by Wako Pure Chemical Industries, Ltd.) | (structure shown) | CLPAH$_{0.2}$Na$_{0.8}$—C1 Electrode |
| 1,5-hexadiene-3,4-diol (produced by Tokyo Chemical Industries, Ltd.) | (structure shown) | CLPAH$_{0.2}$Na$_{0.8}$—C2 Electrode |
| divinyl benzene (produced by Wako Pure Chemical Industries, Ltd.) | (structure shown) | CLPAH$_{0.2}$Na$_{0.8}$—C3 Electrode |
| pentaerythritol triallyl ether (produced by Daiso Co., Ltd.) | (structure shown) | CLPAH$_{0.2}$Na$_{0.8}$—C4 Electrode |
| diethylene glycol diacrylate | (structure shown) | CLPAH$_{0.2}$Na$_{0.8}$—C5 Electrode |

TABLE 4-continued

| Cross-linking agent | Structural formula | Electrode Name |
|---|---|---|
| ethylene glycol diallyl ether | (structure) | CLPAH$_{0.2}$Na$_{0.8}$—C6 Electrode |
| tetraethylene glycol diallyl ether | (structure) | CLPAH$_{0.2}$Na$_{0.8}$—C7 Electrode |

Experiment Example 14 Charge-Discharge Test Using CLPAH$_{0.2}$Na$_{0.8}$-C1 to CLPAH$_{0.2}$Na$_{0.8}$-C7 Electrodes A constant current charge-discharge test was performed similarly as in Experiment Example 4, except for using the CLPAH$_{0.2}$Na$_{0.8}$-C1 electrode, the CLPAH$_{0.2}$Na$_{0.8}$-C2 electrode, the CLPAH$_{0.2}$Na$_{0.8}$-C3 electrode, the CLPAH$_{0.2}$Na$_{0.8}$-C4 electrode, the CLPAH$_{0.2}$Na$_{0.8}$-C5 electrode, the CLPAH$_{0.2}$Na$_{0.8}$-C6 electrode, and the CLPAH$_{0.2}$Na$_{0.8}$-C7 electrode, as the electrode.

As for result of the initial charge-discharge and result of the 10$^{th}$ time charge-discharge using each electrode, charge-discharge capacity, coulombic efficiency and retention ratio thereof are shown in the following Table 5. It should be noted that, as reference, results of the CLPAH$_{0.2}$Na$_{0.8}$-07 electrode and the Carbopol H$_{0.2}$Na$_{0.8}$ electrode are shown together in Table 5.

Experiment Example 15 Viscosity Measurement of CLPAH$_{0.2}$Na$_{0.8}$-C1 to CLPAH$_{0.2}$Na$_{0.8}$-C7 Slurry Various polyacrylic acids (CLPAH$_{0.2}$Na$_{0.8}$-C1 to CLPAH$_{0.2}$Na$_{0.8}$-C7) were converted to 1% by weight polyacrylic acid slurry, to measure viscosity at 20° C. using a B-type viscometer (B8L, produced by Tokyo Keiki Co., Ltd.). Rotation speed was set at 60 rpm in measurement. The result thereof is shown in the following Table 5.

TABLE 6

| No. | Type | Amount of cross-linking agent (mol %) | Viscosity 60 rpm (mPa · s) |
|---|---|---|---|
| CLPAH$_{0.2}$Na$_{0.8}$-C1 | cross-linked | 0.14 | 960 |
| CLPAH$_{0.2}$Na$_{0.8}$-C2 | cross-linked | 0.14 | 70 |

TABLE 5

| | Initial charge-discharge | | | 10$^{th}$ time charge-discharge | | | |
|---|---|---|---|---|---|---|---|
| No. | Charging capacity (mAh/g) | Discharging capacity (mAh/g) | coulombic efficiency % | Charging capacity (mAh/g) | Discharging capacity (mAh/g) | coulombic efficiency % | Retention rate % |
| CLPAH0.2Na0.8-C1 | 1381 | 1042 | 75.5 | 967 | 932 | 96.4 | 89.4 |
| CLPAH0.2Na0.8-C2 | 1570 | 1124 | 71.6 | 1118 | 1075 | 96.2 | 95.6 |
| CLPAH0.2Na0.8-C3 | 1358 | 1030 | 75.8 | 964 | 930 | 96.5 | 90.3 |
| CLPAH0.2Na0.8-C4 | 1489 | 1107 | 74.3 | 1064 | 1025 | 96.3 | 92.6 |
| CLPAH0.2Na0.8-05 | 1505 | 1120 | 74.4 | 1052 | 1020 | 97.0 | 91.1 |
| CLPAH0.2Na0.8-C6 | 1534 | 1135 | 74.0 | 1080 | 1045 | 96.8 | 92.1 |
| CLPAH0.2Na0.8-C7 | 1484 | 1125 | 75.8 | 1088 | 1055 | 97.0 | 93.8 |
| CLPAH0.2Na0.8-07 | 1446 | 1112 | 76.9 | 1094 | 1063 | 97.2 | 95.7 |
| Carbopol H0.2Na0.8 | 1551 | 1076 | 69.4 | 840 | 813 | 96.9 | 75.6 |

From the results of Table 5, it was found that the initial discharge capacity showed a value near about 1100 mAh/g not depending on a kind of the cross-linking agent. In addition, coulombic efficiency was 70% or higher, and it was high value in any of them, as compared with the electrode using Carbopol. In addition, discharge capacity or retention ratio at the 10$^{th}$ cycle became about 1000 mAh/g and about 90%, respectively, not depending on a kind of a cross-linking agent, and it was very high value, as compared with the electrode using Carbopol. In particular, the CLPAH$_{0.2}$Na$_{0.8}$-C2 electrode, the CLPAH$_{0.2}$Na$_{0.8}$-C4 electrode, the CLPAH$_{0.2}$Na$_{0.8}$-C5 electrode, the CLPAH$_{0.2}$Na$_{0.8}$-C6 electrode, and the CLPAH$_{0.2}$Na$_{0.8}$-C7 electrode showed high capacity retention rate equivalent to that of the CLPAH$_{0.2}$Na$_{0.8}$-07 electrode, as for discharge capacity or retention ratio at the 10$^{th}$ cycle.

From these results, it was shown that means of neutralization, and cross-linking of a polymer, in designing a binder, are effective to enhance electrochemical characteristics of the Si-based electrode.

TABLE 6-continued

| No. | Type | Amount of cross-linking agent (mol %) | Viscosity 60 rpm (mPa · s) |
|---|---|---|---|
| CLPAH$_{0.2}$Na$_{0.8}$-C3 | cross-linked | 0.14 | 240 |
| CLPAH$_{0.2}$Na$_{0.8}$-C4 | cross-linked | 0.14 | 230 |
| CLPAH$_{0.2}$Na$_{0.8}$-C5 | cross-linked | 0.14 | 300 |
| CLPAH$_{0.2}$Na$_{0.8}$-C6 | cross-linked | 0.14 | 250 |
| CLPAH$_{0.2}$Na$_{0.8}$-C7 | cross-linked | 0.14 | 320 |

From the results of the above-described Table 6, it was found that viscosity value differs depending on a kind of a cross-linking agent, however, any polymers have viscosity within a preferable range shown in the above-described Table 3.

Example 17 Producing of Electrode for Lithium Cell Using Cross-Linked Polyacrylic Acid with Degree of Neutralization of 70%, as Binder Into 230 mg of water, 2.3 g of cross-linked polyacrylic acid, obtained by cross-linking and polymerization by containing 0.14% by mole of diethylene glycol diallyl ether in straight chain cross-linked-type, was added and dispersed under stirring for 2 hours. Into the obtained dispersed solution, 4.5 ml of 17% sodium hydroxide was added to obtain an aqueous solution of 1% by weight neutralized polyacrylic acid (CLPAH$_{0.3}$Na$_{0.8}$-01).

Slurry for producing an electrode was prepared similarly as in Comparative Example 3, except for using said solution instead of the aqueous solution of 1% by weight polyacrylic acid, to produce the electrode for a lithium cell. The obtained electrode was named as the CLPAH$_{0.3}$Na$_{0.7}$-07 electrode.

Example 18 Producing of an Electrode for a Lithium Cell Using, as a Binder, Cross-Linked Polyacrylic Acid with Degree of Neutralization of 90%

Into 230 mg of water, 2.3 g of cross-linked polyacrylic acid, obtained by cross-linking and polymerization by containing 0.14% by mole of diethylene glycol diallyl ether in straight chain cross-linked-type, was added and dispersed under stirring for 2 hours. Into the obtained dispersed solution, 5.7 ml of 17% sodium hydroxide was added to obtain an aqueous solution of 1% by weight neutralized polyacrylic acid (CLPAH$_{0.1}$Na$_{0.9}$-01).

Slurry for producing an electrode was prepared similarly as in Comparative Example 3, except for using said solution instead of the aqueous solution of 1% by weight polyacrylic acid, and the electrode obtained by producing the electrode for a lithium cell was referred to as the CLPAH$_{0.1}$Na$_{0.9}$-07 electrode.

Experiment Example 16 Charge-Discharge Test Using CLPAH$_{0.3}$Na$_{0.7}$-07 and CLPAH$_{0.1}$Na$_{0.9}$-07 Electrodes A constant current charge-discharge test was performed similarly as in Experiment Example 4, except for using the CLPAH$_{0.3}$Na$_{0.7}$-07 and CLPAH$_{0.1}$Na$_{0.9}$-07 electrodes, as the electrode.

As for result of the initial charge-discharge and result of the 10$^{th}$ time charge-discharge using each electrode, charge-discharge capacity, coulombic efficiency and retention ratio thereof are shown in the following Table 7. It should be noted that, as reference, results of the CLPAH$_{0.2}$Na$_{0.8}$-07 electrode are shown together in Table 7.

Experiment Example 17 Viscosity Measurement of CLPAH$_{0.3}$Na$_{0.7}$-07 and CLPAH$_{0.1}$Na$_{0.9}$-07 Slurry Each of two kinds of polyacrylic acids (CLPAH$_{0.3}$Na$_{0.7}$-07 and CLPAH$_{0.1}$Na$_{0.9}$-07) was converted to 1% by weight polyacrylic acid slurry, to measure viscosity at 20° C. using a B-type viscometer (B8L, produced by Tokyo Keiki Co., Ltd.). Rotation speed was set at 60 rpm in measurement. The result thereof is shown in the following Table 8.

TABLE 8

| No. | Amount of cross-linking agent (mol %) | Neutralization degree | Viscosity 60 rpm (mPa · s) |
|---|---|---|---|
| CLPAH0.3Na0.7-07 | 0.14 | 70 | 250 |
| CLPAH0.2Na0.8-07 | 0.14 | 80 | 272 |
| CLPAH0.1Na0.9-07 | 0.14 | 90 | 220 |

It was found that there is no big change of viscosity, although it was some difference, depending on degree of neutralization.

The invention claimed is:

1. A binder for a lithium cell comprising polyacrylic acid cross-linked by a cross-linking agent selected from the compounds described in the following general formulae [1], [2] and [4] to [13] and the polymer described in the following general formula [14], provided that the one which includes a functional group-containing vinylidene fluoride-based polymer is excluded;

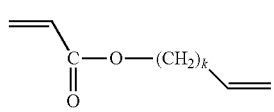

[1]

wherein k represents an integer of 1 to 6,

TABLE 7

| | | Initial charge-discharge | | | 10$^{th}$ time charge-discharge | | | |
|---|---|---|---|---|---|---|---|---|
| No. | Neutralization degree | Charging capacity (mAh/g) | Discharging capacity (mAh/g) | coulombic efficiency % | Charging capacity (mAh/g) | Discharging capacity (mAh/g) | coulombic efficiency % | Retention rate % |
| CLPAH0.3Na0.7-07 | 70% | 1453 | 1100 | 75.7 | 1083 | 1048 | 96.8 | 95.3 |
| CLPAH0.2Na0.8-07 | 80% | 1446 | 1112 | 76.9 | 1094 | 1063 | 97.2 | 95.7 |
| CLPAH0.1Na0.9-07 | 90% | 1476 | 1122 | 76.0 | 1084 | 1051 | 97.0 | 93.7 |

From the results of Table 7, the initial discharge capacity and discharge capacity or retention ratio at the 10$^{th}$ cycle showed similar behavior not depending on degree of neutralization. Among them, the result in the case of degree of neutralization of 80% showed the slightly highest value. Accordingly, it was found that good electrical characteristics can be obtained, as long as it is a cross-linked PAH having degree of neutralization of 70 to 90%.

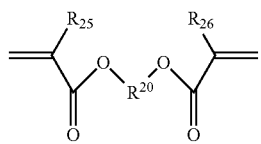

[2]

wherein $R^{25}$ and $R^{26}$ each independently represent a hydrogen atom or a methyl group, $R^{20}$ represents an alkylene group having 1 to 20 carbon atoms, a group represented by the following general formula [2-1],

 [2-1]

wherein $R^{17}$ represents an alkylene group having 1 to 6 carbon atoms, r represents an integer of 1 to 6, or the group represented by the following general formula [2-2]

 [2-2]

wherein $R^{18}$ and $R^{19}$ each independently represent an alkylene group having 1 to 6 carbon atoms, t represents an integer of 1 to 12,

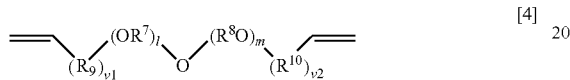 [4]

wherein $R^7$ to $R^{10}$ each independently represent an alkylene group having 1 to 6 carbon atoms, 1 represents an integer of 1 to 6, m represents an integer of 0 to 6, v1 and v2 each independently represent an integer of 0 or 1,

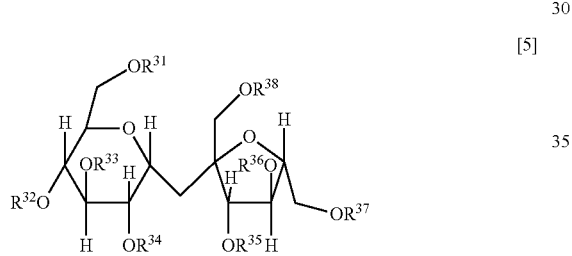 [5]

wherein $R^{31}$ to $R^{38}$ each independently represent a hydrogen atom, a vinyl group or a vinylketone group, and at least two or more groups thereof are a vinyl group or a vinylketone group,

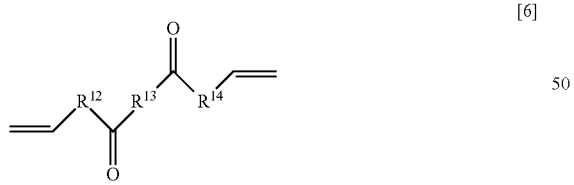 [6]

wherein $R^{12}$ to $R^{14}$ each independently represent an alkylene group having carbon 1 to 6 atoms,

 [7]

wherein $Ar^1$ represents an aryl group having 6 to 10 carbon atoms, $R^{15}$ represents an alkylene group having 1 to 6 carbon atoms, q represents an integer of 2 to 4,

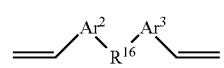 [8]

wherein $Ar^2$ and $Ar^3$ each independently represent an arylene group having 6 to 10 carbon atoms, $R^{16}$ represents an alkylene group having 1 to 6 carbon atoms,

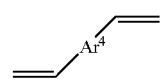 [9]

wherein $Ar^4$ represents an arylene group having 6 to 10 carbon atoms,

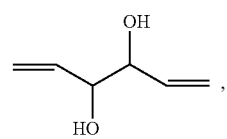 [10-1]

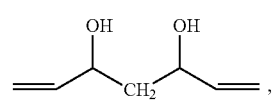 [10-2]

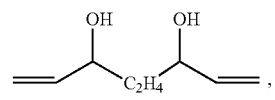 [10-3]

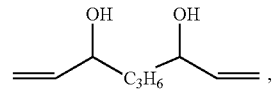 [10-4]

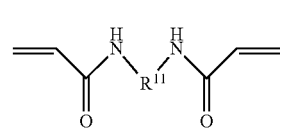 [11]

wherein, $R^{11}$ represents an alkylene group having 1 to 6 carbon atoms,

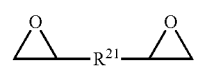 [12]

wherein $R^{21}$ represents an alkylene group having 1 to 6 carbon atoms which has or does not have a substituent, an arylene group having 6 to 10 carbon atoms which has or does not have a substituent, or a group represented by the following general formula [12-A]

 [12-A]

wherein $R^{35}$ represents an alkyl group having 1 to 6 carbon atoms, $R^{36}$ represents an alkylene group having 1 to 6 carbon atoms, $Ar^5$ represents an arylene group having 6 to 10 carbon atoms which may have b pieces of $R^{35}$ as substituents, b represents an integer of 0 to 4, or the group represented by the following general formula [12-B]

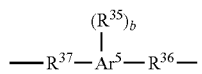

[12-B]

wherein $R^{37}$ represents an alkylene group having 1 to 6 carbon atoms, $R^{35}$, $R^{36}$, $Ar^5$ and b are the same as described above,

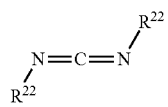

[13]

wherein $R^{22}$ each independently represents an alkyl group having 1 to 6 carbon atoms which has or does not have a substituent, an aryl group having 6 to 10 carbon atoms which has or does not have a substituent, or the group represented by the following general formula [13-A]

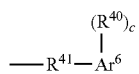

[13-A]

wherein $R^{40}$ represents an alkyl group having 1 to 6 carbon atoms, $R^{41}$ represents an alkylene group having 1 to 6 carbon atoms, $Ar^6$ represents an arylene group having 6 to 10 carbon atoms which have c pieces of $R^{40}$ as substituents, c represents an integer of 0 to 5,

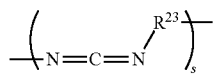

[14]

wherein $R^{23}$ represents an alkylene group having 1 to 6 carbon atoms which has or does not have a substituent, an arylene group having 6 to 10 carbon atoms which has or does not have a substituent, or a group represented by the following general formula [14-A] or [14-B]

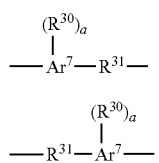

[14-A]

[14-B]

wherein $R^{30}$ represents an alkyl group having 1 to 6 carbon atoms, $R^{31}$ represents an alkylene group having 1 to 6 carbon atoms, $Ar^7$ represents an arylene group having 6 to 10 carbon atoms which may have a pieces of $R^{30}$ as substituents, a represents an integer of 0 to 4, or the group following general formula [14-C]

[14-C]

wherein $R^{32}$ represents an alkylene group having 1 to 6 carbon atoms, $R^{30}$, $R^{31}$, $Ar^7$, and a are the same as described above, and s represents an integer of 10 to 10000.

2. The binder according to claim 1, wherein the cross-linked polyacrylic acid is the neutralized one.

3. The binder according to claim 1, wherein the cross-linked polyacrylic acid is the neutralized one with sodium hydroxide.

4. The binder according to claim 1, wherein a cross-linking agent is a compound represented by the general formula [2], the general formula [4], the general formula [9], the formulae [10-1] to [10-4], or the general formula [11], or a polymer described in the general formula [14].

5. The binder according to claim 1, wherein a cross-linking agent is a compound described in the general formula [2], the general formula [4], or the formulae [10-1] to [10-4].

6. The binder according to claim 1, wherein viscosity of the cross-linked polyacrylic acid is 30 to 10000 mPa·S under 60 rpm of a rotational viscometer, or 10000 to 450000 mPa·S under 0.6 rpm of a rotational viscometer, provided that as viscosity measured in a dispersed solution of the cross-linked polyacrylic acid in water in a concentration of 1% by weight.

7. A composition for producing an electrode of a lithium cell comprising 1) an active material containing silicon, 2) a conductive assistant, and 3) a cross-linked-type polyacrylic acid, provided that the one containing a functional group-containing vinylidene fluoride-based polymer is excluded, wherein the cross-linked-type polyacrylic acid is the polyacrylic acid cross-liked by a cross-linking agent selected from the compounds described in the following general formulae [1], [2] and [4] to [13] and the polymer represented by the general formula [14]:

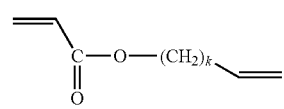

[1]

wherein k represents an integer of 1 to 6,

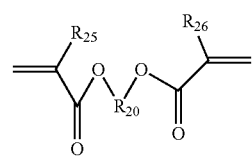

[2]

wherein $R^{25}$ and $R^{26}$ each independently represent a hydrogen atom or a methyl group, $R^{20}$ represents an alkylene group having 1 to 20 carbon atoms, and a group represented by the following general formula [2-1],

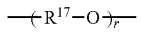
[2-1]

where $R^{17}$ represents an alkylene group having 1 to 6 carbon atoms, r represents an integer of 1 to 6, or the group represented by the following general formula [2-2]

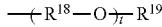
[2-2]

wherein $R^{18}$ and $R^{19}$ each independently represent an alkylene group having 1 to 6 carbon atoms, t represents an integer of 1 to 12,

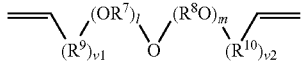
[4]

wherein $R^7$ to $R^{10}$ each independently represent an alkylene group having 1 to 6, v1 and v2 each independently represents an integer of 0 or 1,

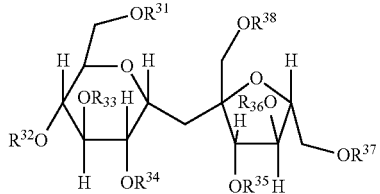
[5]

wherein $R^{31}$ to $R^{38}$ each independently represent a hydrogen atom or a vinyl group, and at least two or more groups thereof are a vinyl group.

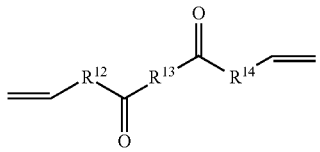
[6]

wherein $R^{12}$ to $R^{14}$ each independently represent an alkylene group having 1 to 6 carbon atoms,

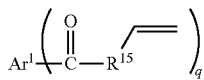
[7]

wherein $Ar^1$ represents an aryl group having 6 to 10 carbon atoms, $R^{15}$ represents alkylene group having 1 to 6 carbon atoms, q represents an integer of 2 to 4,

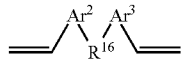
[8]

wherein $Ar^2$ and $Ar^3$ each independently represent an arylene group having 6 to 10 carbon atoms, $R^{16}$ represents an alkylene group having 1 to 6 carbon atoms,

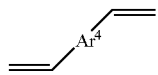
[9]

wherein $Ar^4$ represents an arylene group having 6 to 10 carbon atoms,

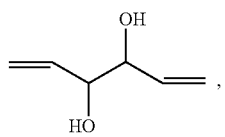
[10-1]

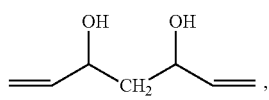
[10-2]

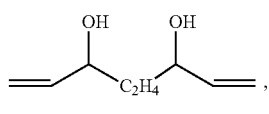
[10-3]

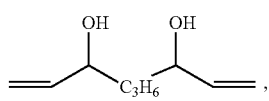
[10-4]

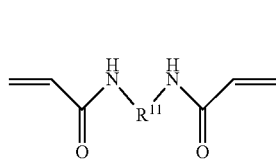
[11]

wherein, $R^{11}$ represents an alkylene group having 1 to 6 carbon atoms,

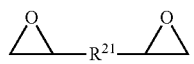
[12]

wherein $R^{21}$ represents an alkylene group having 1 to 6 carbon atoms which has or does not have a substituent, an arylene group having 6 to 10 carbon atoms which has or does not have a substituent, or a group represented by the following general formula [12-A]

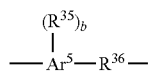
[12-A]

wherein $R^{35}$ represents an alkyl group having 1 to 6 carbon atoms, $R^{36}$ represents an alkyl group having 1 to 6 carbon atoms, $Ar^5$ represents an arylene group having 6 to 10 carbon atoms which may have b pieces of $R^{35}$ as substituents, b represents an integer of 0 to 4, or the group represented by the following general formula [12-B]

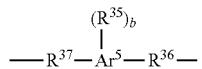
[12-B]

wherein $R^{37}$ represents an alkylene group having 1 to 6 carbon atoms, $R^{35}$, $R^{36}$, $Ar^5$ and b are the same as described above,

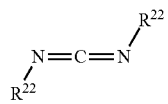
[13]

wherein $R^{22}$ each independently represents an alkyl group having 1 to 6 carbon atoms which has or does not have a substituent, an aryl group having 6 to 10 carbon atoms which has or does not have a substituent, or the group represented by the following general formula [13-A]

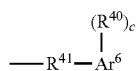
[13-A]

wherein $R^{40}$ represents an alkyl group having 1 to 6 carbon atoms, $R^{41}$ represents an alkylene group having 1 to 6 carbon atoms, $Ar^6$ represents an arylene group having 6 to 10 carbon atoms which have c pieces of $R^{40}$ as substituents, c represents an integer of 0 to 5,

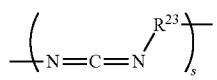
[14]

wherein $R^{23}$ represents an alkylene group having 1 to 6 carbon atoms which has or does not have a substituent, an arylene group having 6 to 10 carbon atoms which has or does not have a substituent, or a group represented by the following general formula [14-A] or [14-B]

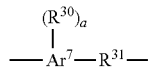
[14-A]

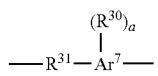
[14-B]

wherein $R^{30}$ represents an alkyl group having 1 to 6 carbon atoms, $R^{31}$ represents an alkylene group having 1 to 6 carbon atoms, $Ar^7$ represents an arylene group having 6 to 10 carbon atoms which may have a pieces of $R^{30}$ as substituents, a represents an integer of 0 to 4, or the group following general formula [14-C]

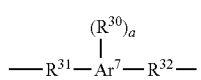
[14-C]

wherein $R^{32}$ represents an alkylene group having 1 to 6 carbon atoms, $R^{30}$, $R^{31}$, $Ar^7$, and a are the same as described above, and s represents an integer of 10 to 10000.

8. The composition according to claim 7, wherein the active material containing silicon is the one comprising silicon or silicon and carbon.

9. The composition according to claim 7, wherein the electrode is a negative electrode.

10. The composition according to claim 7, wherein the cross-linked-type polyacrylic acid is the neutralized one.

11. The composition according to claim 7, wherein the cross-linked polyacrylic acid is the neutralized one with sodium hydroxide.

12. The composition according to claim 7, wherein the cross-linking agent is a compound described in the general formula [2], the general formula [4], the general formula [9], the formulae the general formula [9], the formulae [10-1] to [10-4], or the general formula [11], or a polymer described in the general formula [14].

13. The composition according to claim 7, wherein the cross-linking agent is a compound described in the general formula [2], the general formula [4], or the formulae [10-1] to [10-4].

14. The composition according to claim 7, wherein viscosity of the cross-linked polyacrylic acid is 30 to 10000 mPa•S under 60 rpm of a rotational viscometer, and 10000 to 450000 mPa•S under 0.6 rpm of rotational viscometer, provided that as viscosity measured in a dispersed solution of the cross-linked polyacrylic acid in water in a concentration of 1% by weight.

15. An electrode for lithium cell having 1) an active material containing silicon, a 2) conductive assistant, 3) a cross-linked-type polyacrylic acid, and 4) a current collector, provided that the one containing a functional group-containing vinylidene fluoride-based polymer is excluded, wherein the cross-linked-type polyacrylic acid is the polyacrylic acid cross-liked by a cross-linking agent selected from the compounds described in the following general formulae [1], [2] and [4] to [13] and the polymer represented by the general formula [14]:

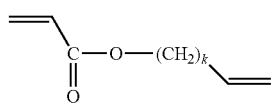
[1]

wherein k represents an integer of 1 to 6,

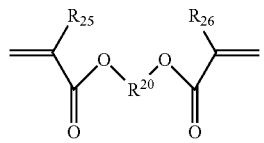  [2]

wherein $R^{25}$ and $R^{\sim}$ each independently represent a hydrogen atom or a methyl group, $R^{20}$ represents an alkylene group having 1 to 20 carbon atoms, and a group represented by the following general formula [2-1],

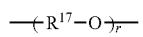  [2-1]

wherein $R^{17}$ represents an alkylene group having 1 to 6 carbon atoms, r represents an integer of 1 to 6, or the group represented by the following general formula [2-2]

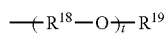  [2-2]

wherein $R^{18}$ and $R^{19}$ each independently represent an alkylene group having 1 to 6 carbon atoms, t represents an integer of 1 to 12,

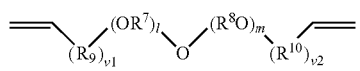  [4]

wherein $R^7$ to $R^{10}$ each independently represent an alkylene group having 1 to 6 carbon atoms, l represents an integer of 1 to 6, m represents an integer of 0 to 6, v1 and v2 each independently represents an integer of 0 or 1,

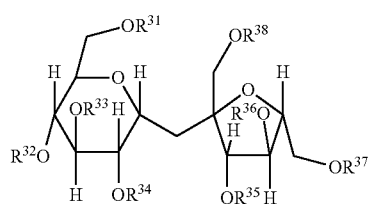  [5]

wherein $R^{31}$ to $R^{38}$ each independently represent a hydrogen atom or a vinyl group, and at least two or more groups thereof are a vinyl group,

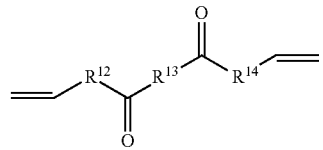  [6]

wherein $R^{12}$ to $R^{14}$ each independently represent an alkylene group having 1 to 6 carbon atoms,

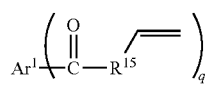  [7]

wherein $Ar^1$ represents an aryl group having 6 to 10 carbon atoms, $R^{15}$ represents an alkylene group having 1 to 6 carbon atoms, q represents an integer of 2 to 4,

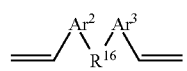  [8]

wherein $Ar^2$ and $Ar^3$ each independently represent an arylene group having 6 to 10 carbon atoms, $R^{16}$ represents an alkylene group having 1 to 6 carbon atoms,

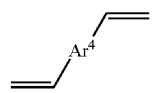  [9]

wherein $Ar^4$ represents an arylene group having 6 to 10 carbon atoms,

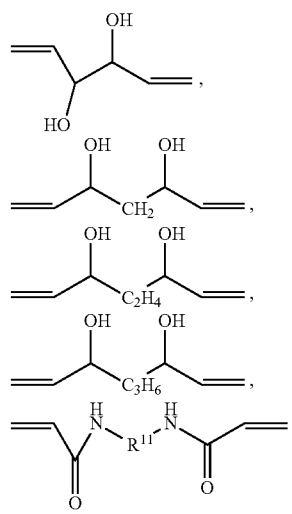

wherein, $R^{11}$ represents an alkylene group having 1 to 6 carbon atoms,

[12]

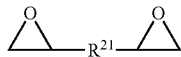

wherein $R^{21}$ represents an alkylene group having 1 to 6 carbon atoms which has or does not have a substituent, an arylene group having 6 to 10 carbon atoms which has or does not have a substituent, or a group represented by the following general formula [12-A]

[12-A]

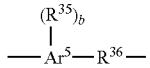

wherein $R^{35}$ represents an alkyl group having 1 to 6 carbon atoms, $R^{36}$ represents an alkyl group having 1 to 6 carbon atoms, $Ar^5$ represents an arylene group having 6 to 10 carbon atoms which may have b pieces of $R^{35}$ as substituents, b represents an integer of 0 to 4, or the group represented by the following general formula [12-B]

[12-B]

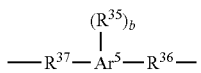

wherein $R^{37}$ represents an alkylene group having 1 to 6 carbon atoms, $R^{35}$, $R^{36}$, $Ar^5$ and b are the same as described above,

[13]

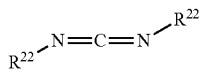

wherein R22 each independently represents an alkyl group having 1 to 6 carbon atoms which has or does not have a substituent, an aryl group having 6 to 10 carbon atoms which has or does not have a substituent, or the group represented by the following general formula [13-A]

[13-A]

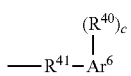

wherein $R^{40}$ represents an alkyl group having 1 to 6 carbon atoms, $R^{41}$ represents an alkylene group having 1 to 6 carbon atoms, $Ar^6$ represents an arylene group having 6 to 10 carbon atoms which have c pieces of $R^{40}$ as substituents, c represents an integer of 0 to 5,

[14]

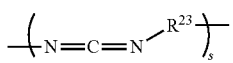

wherein $R^{23}$ represents an alkylene group having 1 to 6 carbon atoms which has or does not have a substituent, an arylene group having 6 to 10 carbon atoms which has or does not have a substituent, or a group represented by the following general formula [14-A] or [14-B]

[14-A]

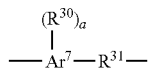

[14-B]

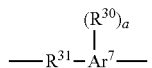

wherein $R^{30}$ represents an alkyl group having 1 to 6 carbon atoms, $R^{31}$ represents an alkylene group having 1 to 6 carbon atoms, $Ar^7$ represents an arylene group having 6 to 10 carbon atoms which may have a pieces of $R^{30}$ as substituents, a represents an integer of 0 to 4, or the group following general formula [14-C]

[14-C]

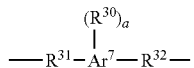

wherein $R^{32}$ represents an alkylene group having 1 to 6 carbon atoms, $R^{30}$, $R^{31}$, $Ar^7$, and a are the same as described above, and s represents an integer of 10 to 10000.

16. The electrode according to claim 15, wherein the active material containing silicon is the one comprising silicon or silicon and carbon.

17. The electrode according to claim 15, wherein the electrode is a negative electrode.

18. The electrode to claim 15, wherein the cross-linked polyacrylic acid is the neutralized one.

19. The electrode according to claim 15, wherein the cross-linked polyacrylic acid is the neutralized one with sodium hydroxide.

20. The electrode according to claim 15, wherein the cross-linking agent is a compound described in the general formula [2], the general formula [4], the general formula [9], formula [10-1]to [10-4], or the general formula [11], or a polymer described in the general formula [14].

21. The electrode according to claim 15, wherein the cross-linking agent is compound described in the general formula [2], the general formula [4]or the formulae [10-1]to [10-4].

22. The electrode according to claim 15, wherein viscosity of the cross-linked polyacrylic acid is 30 to 10000 mPa•S under 60 rpm of a rotational viscometer, and 10000 to 450000 mPa•S under 0.6 rpm of a rotational viscometer, provided that as viscosity measured in a dispersed solution of the cross-linked polyacrylic acid in water in a concentration of 1 % by weight.

\* \* \* \* \*